United States Patent
Saylor et al.

(10) Patent No.: US 6,895,084 B1
(45) Date of Patent: May 17, 2005

(54) SYSTEM AND METHOD FOR GENERATING VOICE PAGES WITH INCLUDED AUDIO FILES FOR USE IN A VOICE PAGE DELIVERY SYSTEM

(75) Inventors: Michael J. Saylor, McLean, VA (US); Steven S Trundle, Falls Church, VA (US); Michael X. Zirngibl, Washington, DC (US); Steven R. Brown, Alexandria, VA (US); Anurag Patnaik, Arlingon, VA (US); David A. Garr, Washington, DC (US); Benjamin M. Lindsey, Fairfax, VA (US); Josh Mahowald, Washington, DC (US); Zeynap Inanoglu, Washington, DC (US)

(73) Assignee: MicroStrategy, Inc., McLean, VA (US)

( * ) Notice: Subject to any disclaimer, the term of this patent is extended or adjusted under 35 U.S.C. 154(b) by 441 days.

(21) Appl. No.: 09/952,015

(22) Filed: Sep. 14, 2001

Related U.S. Application Data

(63) Continuation-in-part of application No. 09/480,994, filed on Jan. 11, 2000, now Pat. No. 6,792,086.
(60) Provisional application No. 60/150,602, filed on Aug. 26, 1999, and provisional application No. 60/150,354, filed on Aug. 24, 1999.

(51) Int. Cl.[7] .............................................. H04M 1/65
(52) U.S. Cl. ................................ 379/88.22; 379/88.13
(58) Field of Search ............................ 379/67.1, 88.11, 379/88.13, 88.14, 88.16, 88.17, 88.18, 88.22; 707/1, 10; 709/218, 219

(56) References Cited

U.S. PATENT DOCUMENTS

| | | | |
|---|---|---|---|
| 4,059,732 A | 11/1977 | Hayden et al. |
| 4,355,207 A | 10/1982 | Curtin |
| 4,742,516 A | 5/1988 | Yamaguchi |
| 4,761,807 A | 8/1988 | Matthews et al. |
| 4,932,021 A | 6/1990 | Moody |

(Continued)

OTHER PUBLICATIONS

Lisa Ammerman, Voice Portals Promise a Hands–Free Internet Future, Feb. 2001.

Wireless Week, Brad Smith, "Need An Answer? Just Ask", Jun. 26, 2000, pp. 1–2, <http://www.wirelessweek.com/news/june00/sev626.htm>.

(Continued)

*Primary Examiner*—Scott L. Weaver
(74) *Attorney, Agent, or Firm*—Hunton & Williams LLP

(57) ABSTRACT

A content provider system for enabling content providers to create voice pages with audio files included for use in a network for voice page delivery through which subscribers request a voice page and a voice page server system delivers the voice page audibly to the subscriber. A content provider selects a voice page into which the audio file is to be incorporated, selects the audio file and the content provider system then transfers the audio file to a voice page server system which generates a voice page with the audio file included using XML-based tags designated for audio files. The audio files are uploaded from a number of user devices including a telephony device, a web-based system and a PDA.

30 Claims, 49 Drawing Sheets

U.S. PATENT DOCUMENTS

| | | | |
|---|---|---|---|
| 5,134,647 A | | 7/1992 | Pugh et al. |
| 5,216,603 A | | 6/1993 | Flores et al. |
| 5,243,643 A | | 9/1993 | Sattar et al. |
| 5,251,251 A | | 10/1993 | Barber et al. |
| 5,283,731 A | | 2/1994 | Lalonde et al. |
| 5,687,220 A | | 11/1997 | Finnigan |
| 5,825,856 A | | 10/1998 | Porter et al. |
| 5,828,732 A | | 10/1998 | Gow |
| 5,838,906 A | * | 11/1998 | Doyle et al. ................. 709/202 |
| 5,884,262 A | * | 3/1999 | Wise et al. ............... 704/270.1 |
| 5,901,214 A | | 5/1999 | Shaffer et al. |
| 5,915,001 A | | 6/1999 | Uppaluru |
| 5,923,736 A | | 7/1999 | Shachar |
| 5,924,070 A | | 7/1999 | Ittycheriah et al. |
| 5,926,526 A | | 7/1999 | Rapaport et al. |
| 5,937,390 A | | 8/1999 | Hyodo |
| 5,945,989 A | | 8/1999 | Freishtat et al. |
| 5,953,392 A | * | 9/1999 | Rhie et al. ................ 379/88.13 |
| 5,963,626 A | | 10/1999 | Nabkel |
| 6,081,782 A | | 6/2000 | Rabin |
| 6,311,182 B1 | * | 10/2001 | Colbath et al. ................. 707/6 |
| 6,335,928 B1 | * | 1/2002 | Herrmann et al. .......... 370/352 |
| 6,338,085 B1 | * | 1/2002 | Ramaswamy ............... 709/217 |
| 6,349,132 B1 | * | 2/2002 | Wesemann et al. ...... 379/88.17 |
| 6,356,903 B1 | * | 3/2002 | Baxter et al. ................. 707/10 |
| 6,418,199 B1 | * | 7/2002 | Perrone .................... 379/88.01 |
| 6,456,699 B1 | * | 9/2002 | Burg et al. .............. 379/88.17 |
| 6,493,673 B1 | * | 12/2002 | Ladd et al. .............. 704/275 |
| 6,510,417 B1 | * | 1/2003 | Woods et al. ............... 704/275 |
| 6,529,586 B1 | * | 3/2003 | Elvins et al. ............. 379/88.13 |
| 6,577,713 B1 | * | 6/2003 | Peterson et al. ......... 379/88.22 |
| 6,587,822 B2 | * | 7/2003 | Brown et al. ............... 704/275 |
| 6,604,075 B1 | * | 8/2003 | Brown et al. ............ 704/270.1 |
| 6,606,374 B1 | * | 8/2003 | Rokoff et al. ............ 379/88.16 |
| 6,606,611 B1 | * | 8/2003 | Khan ........................... 706/10 |
| 6,654,784 B1 | * | 11/2003 | Wei ............................ 709/203 |
| 2001/0033564 A1 | * | 10/2001 | Hickman .................... 370/352 |

* cited by examiner

V-PAGE CONFIGURATION 1004    1006

NAME: SUNFLOWERS    FORMAT: VML

1008 — ☒ ENABLE PER MINUTE CHARGE    1009    1012
CREDIT PER MINUTE [ 2 ]    VISITOR AUTHENTICATION

1010 — ☐ ENABLE RESALE
RESALE RATE: [ 2 ]    1014 — [ NEXT ]
1011

1024
DIALOG 1    [MODIFY DIALOG]
1022    [REMOVE DIALOG]
1026
1020

1030  1034  1032
DIALOG NAME: [DETAILS]  [ADD CHILD]    1036
DIALOG TYPE: [TEXT]    [HEAR AUDIO]
[RECORD AUDIO]  [WRITE TEXT] — 1040
1038    1042
CONTENT LOCATION: [http://www.smithsonian.org/~sunfl]
1028

| CHILD NAME | DTMF | VOICE |
|---|---|---|
| BUY POSTERS | 1 | POSTER |
| MORE INFORMATION | 2 | MORE |

1044

| LINK NAME | DTMF | VOICE |
|---|---|---|
| WATER LILIES | 1233 | WATER LILIES |
| HARVEST | 1235 | HARVEST |
| METAMORPHOSIS | 1239 | METAMORPHOSIS |

1046

☐ ENABLE DIALOG SECURITY
1048

FIG. 10B

| | My Voice Diary 2904 | | | | | |
|---|---|---|---|---|---|---|
| | Date / Time | Duration | Description | | | |
| 2902 | 7/25/2000 8:00 AM | 2'15" | Fly Market Desk 2906 | 2908 ✗ | PLAY | 2910 |
| | 7/27/2000 9:05 AM | 0'25" | New Feature Note | ✗ | PLAY | |
| | 7/28/2000 6:35 PM | 3'06" | Default Description | ✗ | PLAY | |

| Save | Reset | Cancel |
|---|---|---|
| 2912 | 2914 | 2916 |

FIG. 29

```
<TML>
<DIALOG name="Person">
        <SOUND source="intro_sound.vox" alt="introduction melody"/>
        <SOUND source="greeting.vox" alt="recorded greeting"/>
</DIALOG>
</TML>
```

FIG. 30A

```
<TML>
<DIALOG name="Person">
     <INPUT>
            <SPEECH>Entering DTMF numbers.</SPEECH>
            <GETNUMBER type="fixed" length="2" filter="response() ge 10 and response() le 20" store="num=response()" next="accept">Enter a number between 10 and 20.</GETNUMBER>
     </INPUT>
</DIALOG>

<DIALOG name="accept">
      <SPEECH>You entered \e[num].</SPEECH>
</DIALOG>

</TML>
```

FIG. 30B

```
<TML>
<DIALOG name="Person">
    <INPUT grammar="fruits">
        <SPEECH>Do you want apples or oranges?</SPEECH>
        <OPTION filter="apples" next="A"/>
        <OPTION filter="oranges" next="B"/>
    </INPUT>
</DIALOG>

<DIALOG name="A">
    <SPEECH>You chose apples.</SPEECH>
</DIALOG>

<DIALOG name="B"
    <SPEECH>You chose oranges.</SPEECH>
<DIALOG>

</TML>
```

FIG. 30C

```
<TML>
<DIALOG name="Person">
    <INPUT grammar="zipcode">
        <SPEECH>What is your zipcode?</SPEECH>
        <GETNUMBER type="fixed" length="5" store="zip=response()" next="accept"/>
        <ERROR>I did not understand.</ERROR>
    </INPUT>
</DIALOG>

<DIALOG name="accept">
    <SPEECH>Your zipcode is \e[zip].</SPEECH>
</DIALOG>

</TML>
```

FIG. 30D

```
<TML>
<DIALOG name="Person">
    <SPEECH>Call Transfer Demonstration.</SPEECH>
    </INPUT>
        <OPTION next="transfer">Press \f to transfer the call.</OPTION>
    </INPUT>
</DIALOG>

<DIALOG name="transfer">
    <TRANSFER-CALL dial="7038989800" transfer-type="0" detect-mode="1"
exitDTMF="*99" exitWord="angel"/>
</DIALOG>

</TML>
```

SYSTEM AND METHOD FOR GENERATING VOICE PAGES WITH INCLUDED AUDIO FILES FOR USE IN A VOICE PAGE DELIVERY SYSTEM

RELATED APPLICATIONS

This application is a continuation-in-part of U.S. application Ser. No. 09/480,994 entitled "Voice Network Access Provider System and Method," filed Jan. 11, 2000, now U.S. Pat. No. 6,792,086 which claims priority to U.S. Provisional Patent Application Nos. 60/150,354 and 60/150,602 filed on Aug. 24, 1999 and Aug. 26, 1999, respectively, both having the title "Voice Network Access Provider System and Method."

FIELD OF THE INVENTION

This invention relates to a content provider system for enabling content providers to create voice pages with audio files included for use in a network for voice page delivery through which subscribers request a voice page and a voice page server system delivers the voice page audibly to the subscriber. The invention further relates to a system wherein a content provider selects a voice page into which the audio file is to be incorporated, selects the audio file and the content provider system then transfers the audio file to a voice page server system which generates a voice page with the audio file included using XML-based tags designated for audio files.

BACKGROUND OF THE INVENTION

Information is most useful when it is delivered to the right person at the right time. Delivery of the right information to the right person has been a problem that many businesses have attempted to solve over the years. Indeed, an entire industry of decision support technology exists to deliver information to members of a business based on massive amounts of data collected about the businesses. The World Wide Web and the Internet have provided an avenue for information delivery, but current Web-based systems still fail to adequately deliver the right information at the right time. One of the major problems with the World Wide Web is the requirement to utilize a computer and web-browser to access its contents. Although penetration of computers throughout the world has increased, that penetration is far from making information readily available to everyone wherever they happen to be.

Moreover, most computer users connect to the Web through a land line. Most users therefore do not have access to Web content when they are away from a land line. Although technology is being developed to enable World Wide Web access through other mediums, such as web-enabled personal digital assistants, for example, such technology require users to purchase new equipment to access this technology. Given the sparse penetration of personal digital assistants already, this technology does not satisfy the need for delivery of timely information.

Therefore, existing systems do not provide a readily available medium for delivery of the right information at the right time or a system for delivering that information. These and other drawbacks exist with current systems.

SUMMARY OF THE INVENTION

The present invention relates to various enhancements, improvements and elaboration on the embodiments described in the parent applications. To provide a framework for discussing the inventions described herein, the following terms should be understood as described:

VPage—a VPage should be understood as a voice page that has content and structure to enable delivery through automated systems to human recipients. The VPage may comprise a particular "page" of content that can be delivered to a user via phone or other delivery device, preferably to enable the user to hear the content.

VCode—a VCode should be understood as a data string that references a single VPage unambiguously.

VBook—a VBook should be understood as a collection of one or more VPages.

VSite—a VSite should be understood as a VSite (e.g., a voice site) that has an address within a network of VPages and that contains at least one VPage.

Speech Link—a speech link should be understood as a reference within a VPage to other content in a voice network that may be activated when a user speaks an associated keyword.

VName—a VName should be understood as a keyword, phrase, or other speakable name associated with a VPage.

The improvements described herein include an improved content creation tool for enabling simpler creation of VPages, a voice pad functionality for storing and organizing voice recordings, call transfer from a VPage to a voice recording system, a financial transaction processing system for use in completing telephone-based transactions through VPages, a system for enabling content providers to record audio in place of text-to-speech for VPages in the system, use of speech links through grammar modification to enable voice-based option selection, provision of a directory of VPages to enable subscribers to access VPages, a file transfer module that enables automatic delivery of electronic files, and a sound file upload module that enables content providers to upload sound files for inclusion in VPages.

In particular, one aspect of the invention relates to a VPage content creation tool that enables users to create, modify, edit and update VPages that are then stored and made available to users of a VPage delivery system. As described in detail below, VPages may be made available in a VPage delivery system through one or more methods, including association of the VPage to a VCode. A VCode may be understood to be a code that is assigned to the VPage or collection of VPages. A user may access the content corresponding to the VCode by entering the VCode through an interactive communications device, such as a wireless or wireline telephone. Also, VCodes may be input through verbal descriptions which are then associated with the desired VCode and corresponding pages or pages of content. A voice-to-text, natural language engine, and/or best fit correspondence engine may be used to interpret verbal descriptions to determine which VCode and corresponding page of content to present to the user. Other methods of accessing VPages are described below.

The present invention provides a content creation functionality to enable users to create content in pages to form VPages, provide links between VPages, upload and store files within the pages, and perform many other VPage related tasks.

In one embodiment, participants in the system may be permitted to create voice content to be presented in VPages through a VPage creation module that provides a user interface through which VPages may be created. That module may be accessible over the Internet (World Wide Web) or over a telephone network. The voice content that a user may create may comprise structured VPages including audio, dialogs, menus, and links and may be stored in a variety of formats as well. The voice content may be stored as a XML-based voice file (e.g. TML or Voice XML), that references sound and text files. In this embodiment, participation is made easier by enabling users to call a VPage creation module via a telephone or log into a VPage creation module via the Internet and through a series of menus, create a VPage.

In the web-based module, a content provider is provided an interface through which the content provider may access and create content for all pages, sites and related links stored for that content provider. An entry interface view may present an overview of all views within the content creation interface to aid the content provider in navigation within the functions provided. The interface may then present a domain selection option to enable the content provider to select the domain to which the VPage to be create, edited or modified belongs and then a domain overview view is presented. Within that view, the content provider is able to select an existing VPage to edit or modify or select to create a new VPage. Within a VPage, the user can add or edit text, incorporate telephone-recorded content, upload sound files, add or modify links to other VPages, create question dialogs and message dialogs that enable listeners of the VPage to provide information for transactions, subscriptions, etc.

A telephony-based module is provided that enables a content provider connecting over a telephony or other voice-providing system to record audio (e.g., voice, sound files, music, etc.) content to be stored as part of the content of a voice-page or provided for other uses. A content provider may access the telephony-based module to record voice or other audio for use in a VPage. In an embodiment in which the recorded content is to be incorporated with a VPage, the content provider is presented a menu to provide the content to associate with an existing VPage or a new VPage. When the user then visits the web-based interface, the user is able to select the recorded audio content to be included and used in a desired VPage.

The telephone-based recording module may also be used for general recording of voice-based thoughts from a content provider. This functionality serves as a voice-based recording pad (e.g., under the trademark VoicePad by MicroStrategy). Content providers using the voice-based recording functionality may utilize this feature as a traveling Dictaphone, recording thoughts and notes wherever the user is and allowing those thoughts to be accessed remotely for other purposes, such as incorporation into VPages.

Also, a module may be provided that allows the content provider to create a VPage solely from the telephony module. In this embodiment, the user records his or her voice for the module. That VPage is then be stored by the VNAP or other system for access by users of the network. For example, the VPage creation module may ask a VPage creator to input the name of the VPage, and the user is then prompted to speak the name. Next, the VPage creator may ask the user to input the subject (e.g., from a topic in a directory of VPages) of the VPage and the user is then prompted to speak the subject. Then the VPage creator may ask the user to input the body of the VPage and the user may then record the body. Prompts may then be provided to provide links to other VPages and requests for other content.

As part of the content creation, a content provider is provided with the functionality also to upload sound files for use in the VPage through selection of the file and then some file transfer mechanism. The user may then listen to the uploaded sound file to hear how that sound file will be presented to listeners of the VPage. The files may then be incorporated into VPages for presentation.

In addition, as part of content creation, a content provider may select audible words or sounds to be used to select links or other actions within a VPage. In so doing, the content creation module adds the selected words to a grammar file associated with a voice recognition system incorporated in the system. The grammar file may be used for the selected VPage only, for all VPages in the VBook or domain with which the VPage is associated, for all VPages provided by that content provider, or selected VPages chosen by the content provider or automatically chosen by the content creation module. Accordingly, as part of the content creation module, a content provider is enabled to select grammar to activate a link or other action within a VPage.

Additionally, as part of the content creation module, a content provider may select to record the content provider's own voice to replace text in the VPage that would otherwise be interpreted by a text-to-speech conversion engine. For example, in addition to the main content of a VPage, the content provider may also desire to have his or her own voice read the message associated with instructions, read the options to respond to the instruction, read the various inputs to be provided in a question or message dialog page or any other text in the system that would otherwise be interpreted by a text-to-speech engine. To provide this functionality, a voice-recording module is provided as part of the content creation module. This voice-recording module enables the user to select any text portion in a VPage, record voice content and then have that voice content saved to be generated with the VPage.

The content creation tool may enable content providers to specify various targets in response to the options selected to link the subscriber from that VPage. The targets available may include another VPage, call transfer to a specified telephone number, file transfer to enable the subscriber to receive a file electronically, or directly into a phone-mail or voice-mail box specified. These targets provide greater functionality and flexibility in the system.

The content creation tool may also enable content providers to list the VPage or collection of VPages in a VPage directory. The VPage directory is then accessible by subscribers to the system to find and locate desired VPages of interest. Content providers may be assessed a fee for placement of the VPage in the directory based on various fee arrangements.

Further, a payment processing module may be provided that enables subscribers to interact with transaction processing systems provided in VPages without having to provide payment identifiers such as credit card information, check information and the like. Instead, a payment processing system may provide separate non-payment identification information that the subscriber provides to pay for a transaction. The network then obtains verification from the payment processing system and executes the transaction. Payment is then made between the payment processing system and the network and/or the content provider with which the transaction occurred.

For context, this content creation module is to be used in an overall VPage system in which a VPage can consist of any grouping of content that is stored at a single location. A VPage contains both voice content and a means of structuring it. Voice content may be stored in any format. One possible format is an audio file. Another is a text file, the content of which may be subsequently converted to audio via a text to speech (TTS) engine. A VPage may reference content stored in other locations. In one implementation, VPages may be stored as files on a server's filesystem. In another, they may be records in a database. In one implementation, they may be stored in an XML-based format such as TML (see appendix) or VoiceXML.

VCodes may also be assigned to collections of related VPages. These collections of one or more VPages are referred to herein as VBooks. Each VPage or VBook is stored on a particular server. If multiple servers are used, each server may be assigned a VCode portion to identify the server. If servers are located in different locations or are operated by different voice network access providers, VNAPs, another VCode portion may be used to designate the server location. A VPage may contain other VCodes or other links that may be presented to a user to enable the user to link from an initial VPage to another. For example, the first page of a VBook may provide an indication of other VPages in that VBook that are accessible by entering the appropriate VCode (or other input). Also, when a user accesses one or more VPages, the VPage may provide a voice menu to a user with numbers associates with each menu item to enable a user to access other VPages (in that VBook or otherwise) or other choices. Also, the user may be permitted to use verbal commands to select options within a VPage. Again, voice-to-text, natural language, and best-fit modules may be used to interpret the user's verbal option request and act upon the request accordingly. According to another embodiment, a VPage or VBook may enable a user to be transferred to another VBook, another VNAP, or a VAdvertisement (as described below), among other things.

VCodes provide a means for addressing voice content. A VCode may be any data string that references unambiguously a single VPage. It can take on any of a number of forms. In one implementation, a VCode may be a string of DTMF values (values on a telephone keypad: 1, 2, 3, . . . 0, #,*). In another, a VCode may be a spoken word or series of words (an automatic speech recognition (ASR) engine may be used here to interpret user input). A VCode may be in any of a number of other formats, provided it unambiguously references a single VPage.

A VCode may be a simple numeric code or an alphanumeric code (including symbols such as # and *) or any other code that may be entered via a keypad of a phone or other interactive communications device or through voice recognition technology now or in the future. For example, but without limitation, the VCode may be a seven digit number. Each unique VCode corresponds to a VPage, a VBook, or in other embodiments, other levels of information relating to a VPage or VBook (e.g., where the VBook or VPage is stored, the "provider of the content," or other information). For example, different levels of sophistication may be used for a VCode.

A VCode may comprise one or more fields. A VCode with more than one field will be referred to as a multi-level VCode. A multi-level scheme may be used to specify various aspects of the referenced VPage. For example, a VPage stored as a file on a file server may have a VCode with one field to specify host on which the VPage resides, another to specify its directory, and another to specify its name. The fields of such a multi-level VCode can take on any of a number of forms (DTMF, speech signals, etc.) and be concatenated using any of a number of schemes (in a multi-level DTMF VCode, the fields may be separated by a "*").

It should be noted that multiple VCodes in multiple formats may refer to the same VPage. Such a scheme may be used to allow a single page to be referenced by an easy-to-remember DTMF string (SMITHSONIAN*AIRSPACE# on the telephone keypad, e.g.), and easy-to-type DTMF string (149#), and an easy-to-say text string ("the Smithsonian air and space museum").

According to one embodiment, the VCode comprises at least two parts—a VBook identifier portion and a VPage identifier portion, with the portions separated by a separation character (e.g., the * key of a telephone keypad). For example, the Smithsonian Museum may have a VBook of VPages for its displays. The Smithsonian VBook number may be 38367 and Monet's Water Lillies painting may have a VPage number of 789. To access the Smithsonian's Monet Water Lillies VPage, the user would enter 38367*789 (VBook * VPage). Also, Van Gogh's Sunflowers painting may have a VPage code of 790. The user may enter 38367*790 to access the voice information corresponding to that painting.

According to another embodiment of the present invention, a VCode may comprise multiple portions, at least one of which may correspond to a predetermined category. For example, VPages may be categorized by content type (e.g., sports, television, retail, museum, etc.), content provider type (e.g., individual, company, organization, government), size (e.g., large, medium, small), cost (e.g., premium, discount, regular), and other methods of categorization. For example, an individual VPage may be assigned 463*123456, where 463 corresponds to an individual VPage and 123456 is the code assigned to the specific individual's page.

If the user desires, it is also possible for the user to simply input the VBook number, whereby the system may prompt the user for a VPage identifier. Also, when the user is finished with one VPage from a VBook, the user may move to another VPage within that VBook by inputting only the VBook identifier (instead of having to input the VBook and VPage combination again). Other VCode schemes could include a portion that identifies a VCode provider or VNAP to identify a VNAP on whose server a VBook or VPage resides and/or a content provider identifier portion to identify a content provider whose content is being provided. For convenience of reference, a VCode with two or more portions will be referred to as a multi-level VCode. Each portion of a multilevel VCode may be separated by a separation character (e.g., the * key). Alternatively, different separation characters can be used to designate different portions of a VCode. Other VCode schemes may be used.

Another aspect of the invention relates to a VCode registration system. VCode registration, according to one embodiment of the invention, enables a central system for registration of VCodes or portions of VCodes. For example, if many companies provide content that is accessible through a VNAP, each company may have assigned to it one or more codes to identify that company. That company identifier code may be a portion of a multi-level VCode that permits users to access that company's content via a VNAP. The registration system preferably stores information identifying where that company's content is stored, so that a VNAP can retrieve such content when requested by a user. Other aspects of the VCode registration system are described below.

According to one embodiment, a VCode registry resides at the VNAP (or in communication with the VNAP). When a user enters a VCode, the VCode registry is checked to determine where the content corresponding to the VCode is stored. The VCode registry returns the address of the content for use by the VNAP to retrieve the requested content. If the VCode is a multi-level VCode, the VCode registry can resolve the various portions of the VCode to identify the content the user is requesting and its location.

Another aspect of the invention relates to storing content that may be retrieved via telephone, preferably so that the user may hear the content. The content may be stored in various formats. One convenient format for storage of certain content is a sound file format. In other cases, content may be stored in other formats. For example, content may be stored as text. In this case, when the text is retrieved, it may be passed through a text-to-speech engine to create synthesized sound for the user to hear. The content is preferably stored as separate VPages. Preferably, whenever content is stored, a VCode or multi-level VCode is assigned to it, and the VCode and any other information necessary to retrieve the content is stored in one or more registries.

According to one embodiment, content may be created by a VNAP. Thus, a single organization may both create the content and make it available to users via a VCode system. However, it may be desirable for a VNAP to encourage others to create and/or update content for the VNAP. In this case the creator of content will be referred to as a content provider, although it should be understood that a VNAP may also be a content provider as that term is used. For various reasons, including those detailed below, it may be desirable for content providers to register with a VNAP. Various procedures and protocols may be established by a VNAP to govern the posting of content to the VNAP's VCode system. Various mechanisms by which content may be posted are detailed below.

One embodiment of the invention relates to a system and method for enabling users to use these novel VCodes to selectively access stored content via a telephone device. Based on information made available to the user, the user calls in to a VNAP and enters a VCode corresponding to the desired content. The VNAP locates the requested content (e.g., by referring to the registry) retrieves the content (e.g., the VPage or VBook) and provides the content to the user via the user's phone, enabling the user to hear the content. In some cases, the VNAP may also provide text for display on the user's phone, or other output to a wireless access protocol device.

A user may access a VNAP by dialing a central number for the VNAP. As detailed below the number may by a local number, a long distance number, an 800, 888, 877 (or equivalent) number, (e.g., 1-800-TALKNET, 1-800-VNET411, 1-888-88-VOICE), a 900 (or equivalent) number, or in some cases may be some other combination of keys. For example, a VNAP may arrange with one, several or even all wireless network providers to enable its customers to contact the VNAP by dialing "*V" or some other easily remembered combination of characters, such as #VN, 311 or #VOICE. Also, wireless phones or other devices may be provided with a special key or input to directly access a VNAP. Also, through arrangements with the telephone company, landline telephones may access the system through a code like (*V, for example) as well. Also, a direct link on certain phones may be provided upon picking up the handset.

Also, it may be desired to enable each VSite or VPage to have its own phone number. In such cases, by dialing the specified phone number, the network may retrieve a VPage specified and may be able to use automatic number identification to automatically retrieve VPages and incorporate the user's preferences. The system may charge a higher hosting fee for providing a separate access number. Also, even though a separate number is provided, the network into which the user dials may be a common interface. In the specific number situation, however, the VPage creator may be able to restrict the VPages to which the use transfers.

For example, a bank, Bank A, may provide a VSite for customers as part of a large VNAP network. If a user accesses Bank A's VSite by navigating there through the VNAP, the user may, through the VNAP, also navigate to competitor, Bank B. If, however, the user accesses Bank A's VSite through a specific number assigned to Bank A, the VNAP may allow Bank A to specify that users not be able to transfer to Bank B.

According to one embodiment, the following business method may be implemented. A VNAP coordinates with a VCode display host for the host to display a sign or other indicator of a VCode, preferably for an object, attraction or subject associated with a display host location. Preferably, the display comprises the VCode, a brief description of the content available for that VCode and a central number (or other directions) for contacting the VNAP. Upon seeing such a display of interest, a user places a phone call to the central number for the VNAP, and when prompted enters the VCode of interest. The VNAP provides the user with content via the user's phone, preferably audible content corresponding to the selected VCode.

The VNAP may charge the user a fee for the content. The VNAP may bill the user in any of a number of ways as described herein. According to one embodiment, the VNAP shares a portion of the fee with one or more of the display host(s), the content provider(s) and phone network(s) over which the phone call is made. According to another embodiment, the VNAP pays a set fee to the VCode display host entity. The VCode display host may also be the content provider and therefore, may receive a share proportionally to its contribution to the system.

One example of this embodiment is as follows. The VCode display host entity may be a museum. One or more exhibits at the museum may have a VCode displayed in association therewith, along with the central number for the VNAP. If the user desires to obtain more information about the exhibit, the user dials the central number to connect to the VNAP, and when prompted, enters the VCode for that exhibit. The VNAP in turn retrieves content associated with the entered VCode and plays it for the user over the user's phone. The VNAP charges the user a fee (e.g., per call, per code, per minute or otherwise). The revenue derived from a VCode linked to the museum is recorded by the VNAP and a predetermined portion of that revenue may be paid to the museum. This method is beneficial for several reasons. The visitors benefit because their experience can be enhanced by receiving additional information for selected exhibits. The museum benefits because its patrons are provided additional benefits without cost to the museum, and in fact, the museum may obtain additional revenue from fee sharing with the VNAP. The VNAP benefits by collecting revenue for the service it provides. The VNAP and/or museum may also benefit in other ways.

For example, according to another embodiment, the VCode system may be used to enable a user to request a transaction. For example, the museum or other organization may offer souvenirs and other products or services that can be ordered via telephone by use of a VCode or in connection with use of a VCode. For example, a VCode may be assigned to a particular transaction (e.g., the purchase of a souvenir associated with an exhibit). The VCode may be displayed in proximity to the exhibit (or elsewhere). The user may call the central number and, when prompted, may enter the VCode to indicate the desire to execute the transaction associated with the VCode. If necessary, the VNAP may collect other information from the user to complete the transaction.

According to another embodiment, if a user calls the central number and enters a VCode corresponding to a request for content, the VNAP may inform the user of available transactions during the call. For example, if a user calls a VNAP and enters a VCode associated with information or other content pertaining to an exhibit, the VNAP may provide the user with a voice menu that informs the user of related information, services or transactions. For example, if the exhibit is an art exhibit, the user may call a central number and enter a VCode to find out more information about a particular painting. One piece of information provided may be the artist's name. According to one embodiment, the user may be given a menu option that enables the user to purchase a book or other article pertaining to that artist. The user may purchase that book by entering a number or other input as specified in the menu.

Various fee generating and billing methodologies may be implemented. According to one option, the central number to the VNAP may be a 900 number (or similar number) so that the user is charged based on the duration of the call. According to another option, the VNAP charges the user based on the time of the call (e.g., by the minute, in six minute intervals, by the hour, etc.), on a per call basis, on a per VCode basis or on a subscription basis. For example, a VNAP may set up a service that enables a user to pay a flat fee (e.g., monthly) for limited or unlimited access to content via VCodes. If a fee is charged on a per VCode basis, different fees may be charged for different VCodes. To facilitate this model, credits may be sold by the system, wherein different VCodes may cost a different number of credits. By charging based on credits, consumers may be charged different amounts based on their purchasing history. The per unit cost may be reduced for users who use the system more. Also, by charging in credits, the actual cost is not presented as part of the consumers' purchase.

Additionally, the VNAP may charge users for calling into the VNAP and may also charge VCode providers for access to its users. The VNAP then works as an information broker, taking a commission from both sellers and buyers of that information.

According to one business model, the VNAP may make the call free to encourage users to call. In this case, the VNAP may provide general or basic information for free but once the user is connected to the VNAP, offer "premium" VCodes corresponding to more detailed or valuable information, transactions or other fee generating mechanisms. Also, if the calls are free to users, the VNAP may generate revenues by charging the VPage providers a fee for providing their information on the VNAP. The VPage providers may include vendors, manufacturers or agents, for example, to build VPages about the items that they are marketing to consumers. For example, products may be labeled with a VCode so consumers may find more information about the product prior to a purchase.

As another method of generating revenue in this system, the VNAP may also charge advertisers for including their advertisement content with VPages. The advertising revenue may be kept by the VNAP or distributed to the various VCode providers with whose pages the advertisements were associated.

As detailed below, one such fee generating mechanism may be to encourage the user to be transferred to another VPage, VBook, VAdvertisement, or other "location," whereby the VNAP is paid a fee for such transfer. According to one business model, a referral fee may be paid to the VNAP and/or content provider for referring a user to another VPage, VBook, VAdvertisement or VNAP.

One or more VPages may contain advertisements that are delivered to a user's phone (e.g., a voice ad). A VAdvertisement may comprise a portion or a complete VPage that advertises a product or service using voice. That VAd may provide the user with the option to purchase a good or service during the interface. The VAd may be selected based on the content requested by the user. Providers of VAds may be charged to have that VAd referenced or included in a VPage. The VAd provider may pay the VNAP, the VPage content provider or both. The VAd may be played for each or selected users upon accessing the VNAP central number or at other times. The charge may be a flat fee for a period of time, a fee for each user for whom the VAd is played or otherwise. The VAd provider may make that payment as a flat fee or based on any transactions that take place as a result of the VAdvertisement.

In the case where transactions are provided, transaction processing may be performed by the VNAP or the VNAP may transfer the call to another transaction processor. The transaction processor may be an operator, an automated system, or some combination of the two that guides the user through the transaction process (e.g., with a voice menu prompting the user to enter input via the keypad of the user's phone or otherwise).

In one embodiment, the user may be able to register with the VNAP and provide certain information, for example, name, address, billing information, phone number, etc. Other information such as personal preferences, demographics and pyschographic data may be provided during the registration process or subsequently accumulated by the VNAP. This registration and other information may be used in a variety of ways. For example, the user's phone number (or phone numbers) may be used in connection with a caller ID or similar service to identify the user each time the user calls in. This may enable the VNAP to accumulate a transaction history for the user. The transaction histories for each user may be stored by the VNAP in a data warehouse or other convenient storage system. This registration information also facilitates the ability to conduct transactions (for example, the purchase of goods) via the VNAP. If the VNAP identifies a user based on a caller ID (or other mechanism), and the VNAP has a profile for the user including address and credit card information (among other things), transactions may be conducted without requiring a user to enter all of this information for each transaction. If desired, security codes or passwords may be used to provide extra protection for the user and VNAP. Also, voice print authentication may be used to ensure the identity of a caller, particularly for high cost usages of the system.

According to at least one embodiment, the content of a VPage is preferably an XML-based voice content file (e.g., TML or VoiceXML) that may be interpreted by a XML-based voice content interpreter and played for the user via the user's phone. As discussed below, XML-based voice content files are structured to provide call flow. According to another embodiment, a VNAP may also maintain an index of information or other content that is available corresponding to a VCode. For example, a VNAP may store XML-based voice content VPages, each having a corresponding VCode and may also store an index of other information (in other formats), where selected index entries may be provided to the user (e.g., via a voice menu). If the user is interested in one of the indexed entries, the VNAP retrieves the information corresponding to the selected indexed entry and provide it to the user via the user's phone. For example, the VNAP may pass the information through a text-to-speech engine to create a sound file and play the sound file for the user via the user's phone. Alternatively, or in addition thereto, text or other content may be displayed on or output to the user's phone or other terminal device. Dynamic VPage generation may also be provided where VPage content is generated on the fly from other content.

In one example, the other information may correspond to information available via the World Wide Web. The index may be created by the VNAP by using standard indexing techniques or bots that search the web for content related to the content of stored VPages. Real-time searches may be done by a VNAP during a user's call to provide current information related to the VCode entered by the user based on keywords associated with the VCode. This aspect of the invention has several advantages. One advantage is that for many topics relating to content of a VPage, it would be costly and require a lot of storage to convert each "hit" from a web search to a sound file. By using the technique described herein, only if a user desires access to other information beyond the stored sound file is it necessary to convert the other information to a sound file, which may be stored for subsequent use or not. Other databases may also be searched for related information or other content.

One example of how various individual features described above may be implemented is as follows. A tourist in Washington, D.C. visits the Washington Monument. The person desires to learn more information about the Washington Monument. The user notices a sign posted next to the Washington Monument which indicates a VCode, and a central number that the person may call to find out more information about the Washington Monument. Accordingly, the person places a call with a wireless phone (e.g., by dialing a central number, such as an 800 number or *V on a wireless phone network to connect to the VNAP), enters the VCode and listens to the voice content from the VPage corresponding to the VCode. At convenient times, the VNAP may present the user with a menu of additional options about or relating to the Washington Monument. The menu of options may include historical data about the Monument, how the Monument was constructed, the geographic location of the Monument, the weather forecast for the area around the Washington Monument, restaurants located near the Washington Monument, bus routes and schedules near the Washington Monument, rates for taxi cabs from the Washington Monument to another location, or any of a variety of other options. Additionally, transaction options may be provided by the VNAP. Specifically, the user may be given an option to purchase a miniature model of the Washington Monument, purchase tickets to take a guided tour of the Washington Monument, or pay to hear patriotic music while touring the monument. All of these options may be presented within a menu driven system by the VNAP based on the entry of the VCode. Because of the vast amount of information and options that may be provided, hierarchical or cascaded menus may be used.

In such a system, the National Park Service that allowed the VCode to be posted, the content provider that posted the content corresponding to the VCode(s) accessed and the VNAP may all receive a portion of any fees charged based on the user's access to the content.

According to another embodiment, a more interactive approach may be used. For example, the VPage corresponding to the Washington Monument VCode may provide the user with general information that relates to the Washington Monument. Then, the system may say "What else would you like to know about the Washington Monument?" The user could then input a voice response which is then translated using speech recognition, natural language query technology, and/or artificial intelligence to determine the best fit of the information that is available. For example, the user may say "I would like to purchase a miniature copy of the Washington Monument" and accordingly the user would be passed to the transaction processing system to perform that task. Similarly, the user may say "I am at the Washington Monument, how do I get to Arlington, Va.?" In response to that request, the VPage may transfer the user to a VPage providing directions from downtown Washington to Arlington, Va.

Also, multiple VPages may exist relating to a subject from different voice content providers. Therefore, a given object may have a number of different VCodes relating thereto. For example, Monet's Water Lillies may have a VPage in the Smithsonian but may also have a VPage from the British Museum with different content. In the Smithsonian, the Smithsonian's Water Lillies VCode may be displayed, but in an art book published by the British Museum, the British Museum's VCode may be displayed. The VPages may also link to one another to provide different perspectives on the same subject. One example may be VPages about a new movie wherein different newspapers provide a different movie review for a particular movie. An advertisement for the movie may list several of the VCodes of the VPages from different newspapers that reviewed the movie and stored that review as a VPage on that newspaper's VBook.

An overview of the system architecture for enabling a VCode system according to the various embodiments described above, and other embodiments will now be summarized. In a basic embodiment, the system comprises user telephony devices connectable over a communications network to a VCode provider (VNAP) that provides voice content over the communications network to the user, based on a VCode assigned to that content by a VCode registration system. The user system comprises a telephony device (e.g., a wireless phone) for enabling the user to input voice and/or push button input (DTMF) and to receive voice content through the speaker portion of the phone or other telephony device. Other types of devices for input and output may also be used as the user system.

The user connects to the VNAP over a communications network, such as a telephone and/or wireless telephone network or the Internet, to the VNAP by dialing a predetermined telephone number. Any suitable communications network may be used in addition to and/or alternatively to the telephone networks and any mechanism for connecting may be used for that communications network.

The VNAP receives the telephone call from the user, prompts the user for a VCode corresponding to desired information, and then delivers that desired information. The VNAP may comprise a number of modules to accomplish this functionality. According to one embodiment, users call into a call center to access VPages using a VCode. The call center processes a request through a voice browser module that uses speech recognition and text to speech modules to interpret user requests for additional VPages or transactions. Once speech is received, a XML-based voice content interpreter reviews the XML-based voice content VPage being accessed to determine an appropriate response. The interpreter passes the request to a voice server which provides security, personalization, content retrieval and billing modules to operate a safe and effective VPage retrieval and delivery system. In another embodiment, the VNAP may comprise a call center for interfacing with the communications network. An incoming call is received by the call center which may identify the user and prompt the user for authentication information. Once the user is authenticated, the user inputs information about the desired page. The user supplies the requested inputs, including the VCode corresponding to the desired content.

As used herein, the term VCode should be understood to refer to an alphanumeric identifier. The term Vname may be used to refer to a verbal identifier that may be used to request voice content through a voice input system of the present invention. Throughout this specification, if the term VCode is used, it should be understood that that VCode may be input through entry of the VCode or verbal communication of a corresponding VName. Also, the VCode and corresponding VName may be the same in some embodiments of the present invention.

The VCode is provided to a VCode identifier module to identify the VPage corresponding to the VCode and to determine where that VPage is located. The VCode identifier module determines the VPage requested and then passes the identification of the desired page to a VPage retrieval module. The VCode retrieval module accesses a VPage database in communication with the VNAP to retrieve the VPage. That VPage is then passed to a VPage execution module and VPage menu module. The VPage execution module executes the VPage in conjunction with a voice output module and optionally a voice personalization module. The voice output module generates audible output from the VPage under control of the VPage execution module and passes the audible output to the call center to relay it over the communications network to the requesting user.

The VPage menu module presents menu options to the user as part of the VPage execution and controls what information is presented in the menu. As such, the user may respond to the menus presented with a choice. The choice received from the user's telephony device is passed by the call center to the choice interpretation module which cooperates with the VPage menu module to determine the content or transaction processing that the user desires. If a transaction is desired, then the user's transaction request is passed to a transaction processing module which may cooperate with a transaction processing system to process the request. Additionally, the VNAP provides a billing module for tracking the user's activity on the VNAP for use in billing and allocation of fees collected from the user for use of the system. Also, the VNAP may have a preregistration and personalization module for enabling the user to preregister with the VNAP for purposes of setting up an account and for indicating how content requested is preferred to be delivered to that particular user. A telephone number identification system (such as a caller ID system) may be used to determine the user's identity to effectuate the selected personalizations or a user may be prompted for a password/code during the call, upon which the pre-registered personalization features may be used by the VNAP during the call session.

That module may also be responsible for authentication, which may differ by VNAP and/or VCode. Authentication may comprise caller identification and may also involve password input. Voice print identification may also be used. Authentication may be set by subscribed users and content providers for specific VPages. For example, if a content provider creates a VPage with several transactions, the content provider may want to authenticate callers with called identification and password authentication to make sure that the transactions are secure. If a user and content provider have both set up authentications, then the authentication module may select between the two, such as by selecting the most secure method.

A registration system is also provided in communication with and/or as part of the VNAP to enable the VNAP to register each VPage or VBook and have a VCode assigned thereto. Users may then input the assigned VCode to request that particular VPage and may be displayed in association with the subject of the VPage. The registration system may have a database that stores correspondence between a VPage and VCode and other information as desired. A specific VCode naming convention may be used by the registration system as described herein.

According to another embodiment, the VPages provided as content may be provided by content providers. The content providers may download the voice content to be included in a VPage through HTTP, email, direct link, FTP or any other data delivery method. The content providers may provide the information as voice files, text files, or TML/VoiceXML (Telecaster Markup Language/VoiceXML Language)) coded files (described below) or any other format that may be used to generate audio output.

The VNAP may further connect to a VCode display host system which displays VCodes associated with content subjects. The VNAP may forward payment of fees to the VCode display host system based on access by users to the VNAP from VCodes posted by the VCode display host system, or based on other agreed fee sharing arrangements.

According to another embodiment of the invention, the system may comprise a plurality of VNAPs connected over a network. Therefore, VPages may be provided at each VNAP and may be accessed by users that call into another VNAP due to the unique VCode assigned to each VPage.

According to another embodiment of the invention, one or more VNAPs may connect over a communications network to one or more VPage server systems. The VPage server systems may host one or more VPages and one or more VBook. The VPage server may thus store and serve VPage information to users directly or through the VNAP. In this embodiment, when the user requests a VCode from a VNAP, the VNAP determines through the VCode identifier module whether the VPage corresponding to the VCode is hosted by a VPage server at that VNAP or by another VNAP. If the VPage is maintained by another VNAP, the VNAP connects to the other VNAP over the communications network, requests the VPage corresponding to the VCode and executes the VPage according to the above description. Because VPages may be added and revised frequently, the VCode identifier module may cooperate with a VCode resolution system that accesses a global registration system to determine the VPage and VNAP corresponding to a requested VCode.

Each VPage server may host one or more VPages or VBooks and may comprise a database system that stores each VPage or VBook. Additionally, transaction processing hosts may store transaction information in other databases.

Each VPage server may comprise a plurality of modules for performing this functionality. Specifically, the VPage server may serve identified pages over the communications network to the VNAP requesting them. Also, a VPage storage engine may be provided for storing VPages in the associated database system when received from a content provider. A VPage translation system may be provided to convert text files to voice files for storage as voice files or for delivery to users and may perform other translation functions as desired. An email/FTP processing system may be provided by the VPage server to receive email and FTP downloads of content from content providers for storage in the database and inclusion in one or more VPages. Also, a voice-to-text system may be provided to convert voice files to text, if desired. A voice recording system may also be provided to enable content providers to directly record voice content for storage and inclusion in VPages. Also, a TML engine may be provided for creating, compiling and storing TML files that are to be stored and served by that VPage server. This and other system architectures may comprise a voice network access system that connects these components to provide a community of users that are connected to a community of content providers through one or more VNAPs.

Other objects and advantages of the invention will be apparent to one of ordinary skill in the art upon reviewing the detailed description of the invention.

BRIEF DESCRIPTION OF THE DRAWINGS

FIG. 10 depicts example screen displays of a graphical user interface for configuring a VPage according to an embodiment of the present invention.

FIG. 29 depicts an embodiment of an interface for enabling a subscriber to access and manage voice recordings in a voice diary according to an embodiment of the present invention.

FIGS. 30(a)–(e) depict example TML scripts created by a content creation tool according to an embodiment of the present invention.

FIG. 44 depicts a view through which a user may create a message voice page according to an embodiment of the present invention.

DETAILED DESCRIPTION OF THE INVENTION

A system for providing voice-based content is described in detail herein, including various improvements and enhancements to the embodiments described in the parent application. The various improvements are described first and then the system in which those improvements and enhancements may be used are described. It should be appreciated that many of the concepts described are also described in the parent application, with more specific embodiments provided herein.

One enhancement relates to a content creation module that enables content providers a convenient and user-friendly interface through which to create content to be stored in VPages. Various examples of embodiments of overall systems in which this content creation module may be employed are provided in greater detail below. In particular, VPages may be created and stored to allow audible content delivery to users that allow the users to navigate between various VPages and engage in transactions over a voice-enabled system.

To provide this voice-based content, VPages may preferably be stored by a VPage delivery system in a markup language format (e.g., TML or VoiceXML). To allow a wide variety of content providers to be able to create these markup-language format VPages, an interface is provided that provides easy-to-use screens and views through which the user selects content. The content creation tool then translates the input into the desired format so that the content provider need not know the markup language to be able to create VPages.

Although described in more detail below, a content creation module 65 may be provided within an overall server system that may be accessed by content providers over a network such as the Internet using any Internet-access device as shown in greater detail in FIG. 3 and described below. Content creation module 65 may present views to content providers to enable them to input content and instructions to be stored in association with VPages that content provider selects to make available to subscribers of the system.

Figure 20:
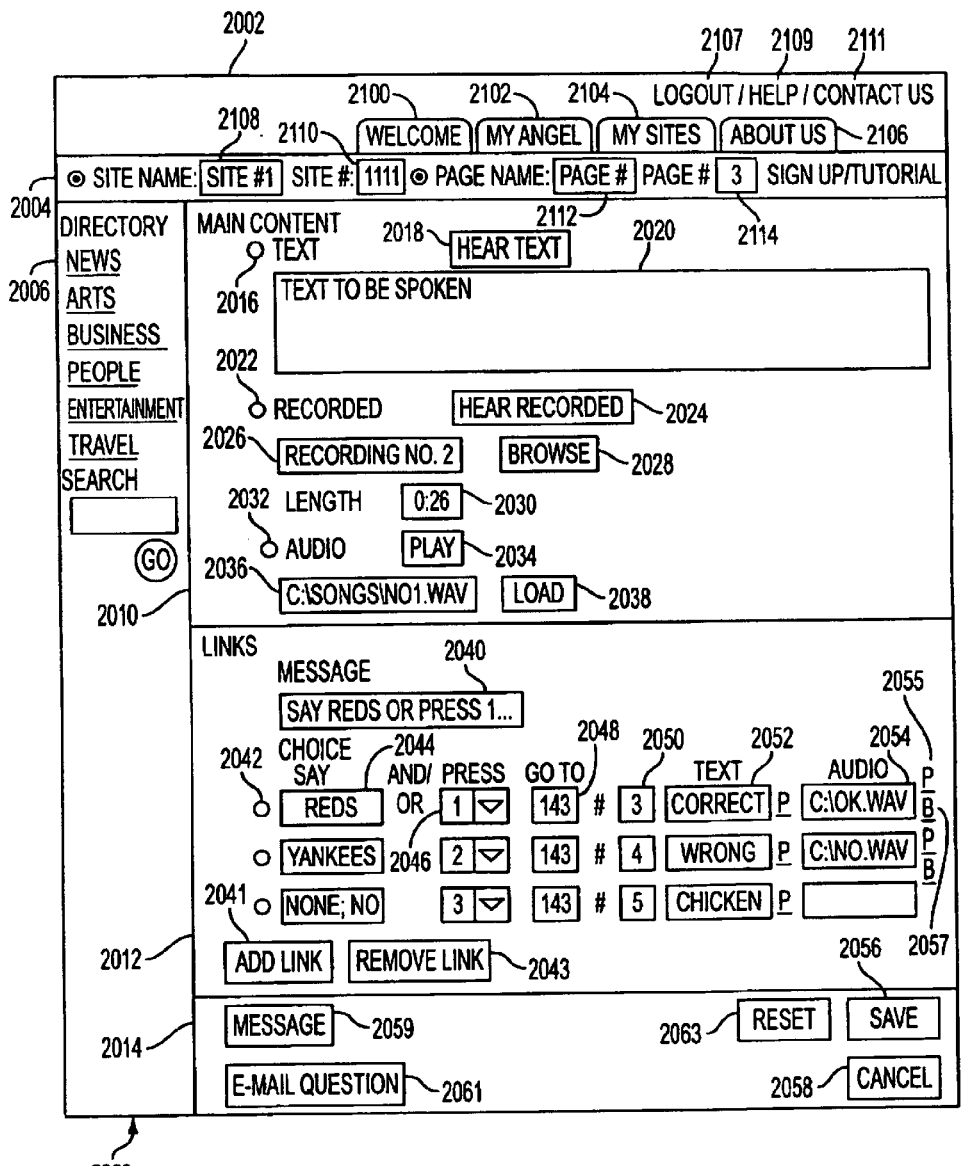
FIG. 20 depicts an example view from an on-line content creation module according to an embodiment of the present invention.

In general, a content provider may log-in to the server system and may be presented with an overview such as a view 2000 depicted in FIG. 20. The overall view may comprise peripheral links and content to provide a common user-friendly environment for the content provider.

As depicted in FIG. 20, according to one embodiment, the peripheral portions of an interface 20 may comprise a navigation bar 2002, a site and page information panel 2004 and a directory panel 2006. Navigation bar 2002 may comprise various tabs and links to enable navigation within the overall content provider site. For example, a welcome tab 2100 provides a link to a welcome screen presented by the overall system. A home page link 2102 may be provided to transfer the user to a web-based home page provided by the system. For example, as shown in FIG. 20, the system may operate under the name My Angel, as provided by the assignee of this invention. The content provider may personalize its home page on the system.

Additionally, a profile tab 2104 enables (e.g., My Sites in FIG. 20) the content provider to access general profile information about that particular content provider's interaction with the system, including various financial information, address and payment information, billing information, user name and password, and other personal information. Content providers may use this profile information to determine and monitor interaction by subscribers with VPages provided by that content provider. An information tab 2106 may link content providers to information about the system (e.g., the Angel system provided by the assignee of this invention) and how to engage in certain activities. Further, other links including a log out link 2107, a help link 2109, and a contact link 2111 may also provide those functionalities.

As part of profile tab 2104, the user may select a site and page to update, modify or create. As shown, a site and page information panel 2004 may be provided that enables the user to select the site name in box 2108, site number in box 2110, page name in box 2112, and page number in box 2114. Upon selection of an appropriate and valid site name, number and page name and number, the content creation module 65 is initiated to present the views in panels 2010, 2012, and 2014.

Main content panel 2010 may comprise a content input panel for the creation of content for a VPage. As described below, VPages, or VPages, may comprise various varieties, including a message type VPage and a question type VPage. A message type VPage may provide voice-based content to users and allow them to link to other pages, link to various transactions or perform some other activity. A question type VPage may interact with the subscribers to obtain information as part of a transaction or other event undertaken by the system. To select the type of VPage being created or modified, main tool bar 2014 may comprise two buttons or inputs for a memo type (button 2059) or a question type (button 2061).

Figure 40:
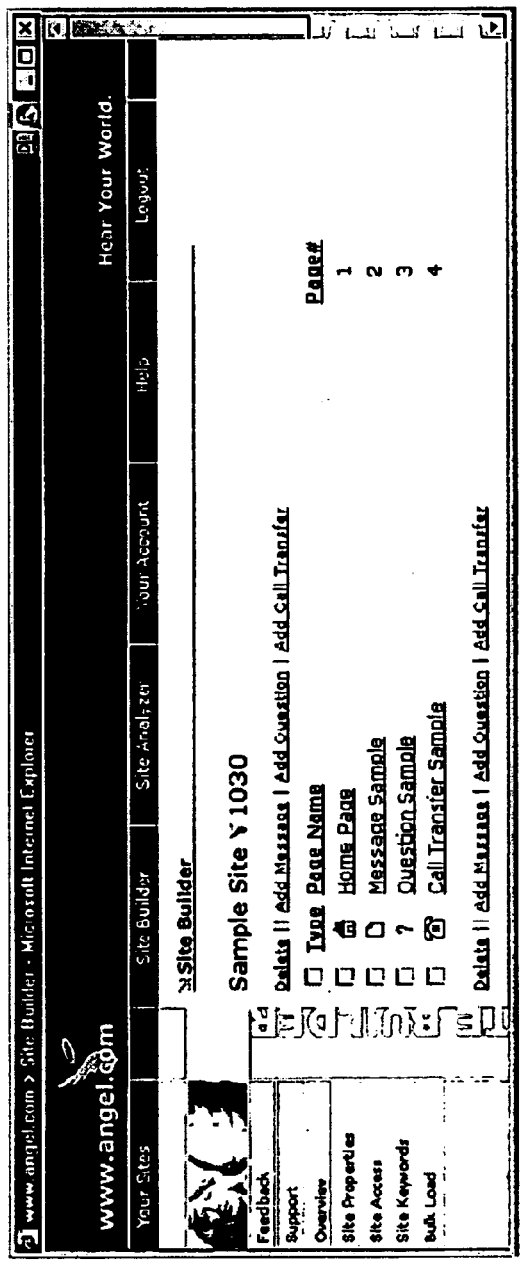
FIG. 40 depicts a view through which a user may build a Vsite, including addition of message VPages, question VPages, and Call Transfer VPages according to an embodiment of the present invention.

As described in more detail below, a message type of VPage may provide sub-elements that enable call transfer, file transfer, sound file upload and others set forth herein. In another embodiment of the present invention, the system enables administrative level and/or page creation users to define VPage types. In this manner, new VPage types may be added and interpreted by the system without rewriting code to handle those types. For example, the following VPage types may be Call Transfer VPages, File Transfer VPages, Calendar VPages, Transaction VPages, and Chat Board VPages. An example of enabling the user to select from message type, question type and call transfer type is illustrated in FIG. 40.

Additionally, main tool bar 2014 may comprise a save button 2056, a cancel button 2058, and a reset button 2063. Save button 2056 stores the VPage as either a new page or in place of previously stored page that has been modified. Cancel button 2058 cancels the input that has been initiated and returns the content provider to a main interface. Reset button 2063 erases the input that has been performed on the particular VPage to allow the content provider to start fresh.

For a message type VPage, panels 2010 and 2012 are presented as depicted in FIG. 20. Panel 2010 may comprise one or more portions, such as the three separate portions presented: a text portion 2016, a record portion 2022, and an audio upload portion 2032. Through these various portions, a content provider is permitted to determine the type of content to be presented to a listener when listening to the VPage being created or edited. Specially, the VPage may comprise text that is read using a text to speech conversion engine, may comprise recorded voice content generated by the content provider or some other individual, and may comprise various types of sound files or other audio content to be played or listened to by the subscriber (including multiple sound files). Although FIG. 20 depicts only a single instance of content in each of the various portions, it should be appreciated that multiple portions of each type may be presented. For example, a content provider may desire to have two or more text entries, five recorded entries, and three audio entries as one example of the many combinations available to the content provider through the content creation tool of the present invention.

Text portion 2016 may comprise two different sections, including a text input portion 2020 and a hear text button 2018. To enable the content provider to be able to understand the way in which text will be represented by the text to voice system of the VPage delivery system, the user may select hear text button 2018 which activates the text to speech conversion engine and provides that engine with the text input in box 2020. Input into text box 2020 may be through any method, including direct input, cutting and pasting, and file insertion techniques.

In some instances, VPage content providers may desire to have the text of a VPage read through another person's voice rather than the text-to-speech engine. Rather than or in addition to presenting text that is converted to speech by a text to speech engine, a recorded file may be input into the VPage. Recorded section 2022 therefore provides a file input section 2026, a browse button 2028, a length display area 2030, and a hear recorded button 2024. In particular, a file to be displayed may be selected through box 2026. To assist the user in locating recorded files, browse button 2028 may be activated where upon the content creation module initiates a file browsing module located on either the server system or the content provider's system to locate recorded content to include in the VPage.

According to one embodiment of the present invention, the content creation module 65 may also comprise a telephone-based component. This telephone-based component enables content providers to dial in using any available telephony device to record voice to be saved by the server system to be made available for selection by a recorded portion 2022 in any of the VPages associated with that content provider. Additionally, other methods of recording content to be stored at the server system may be provided, including use of a microphone at the content provider's system that may then be recorded over the network connection to the content creation module 65.

Figure 27:
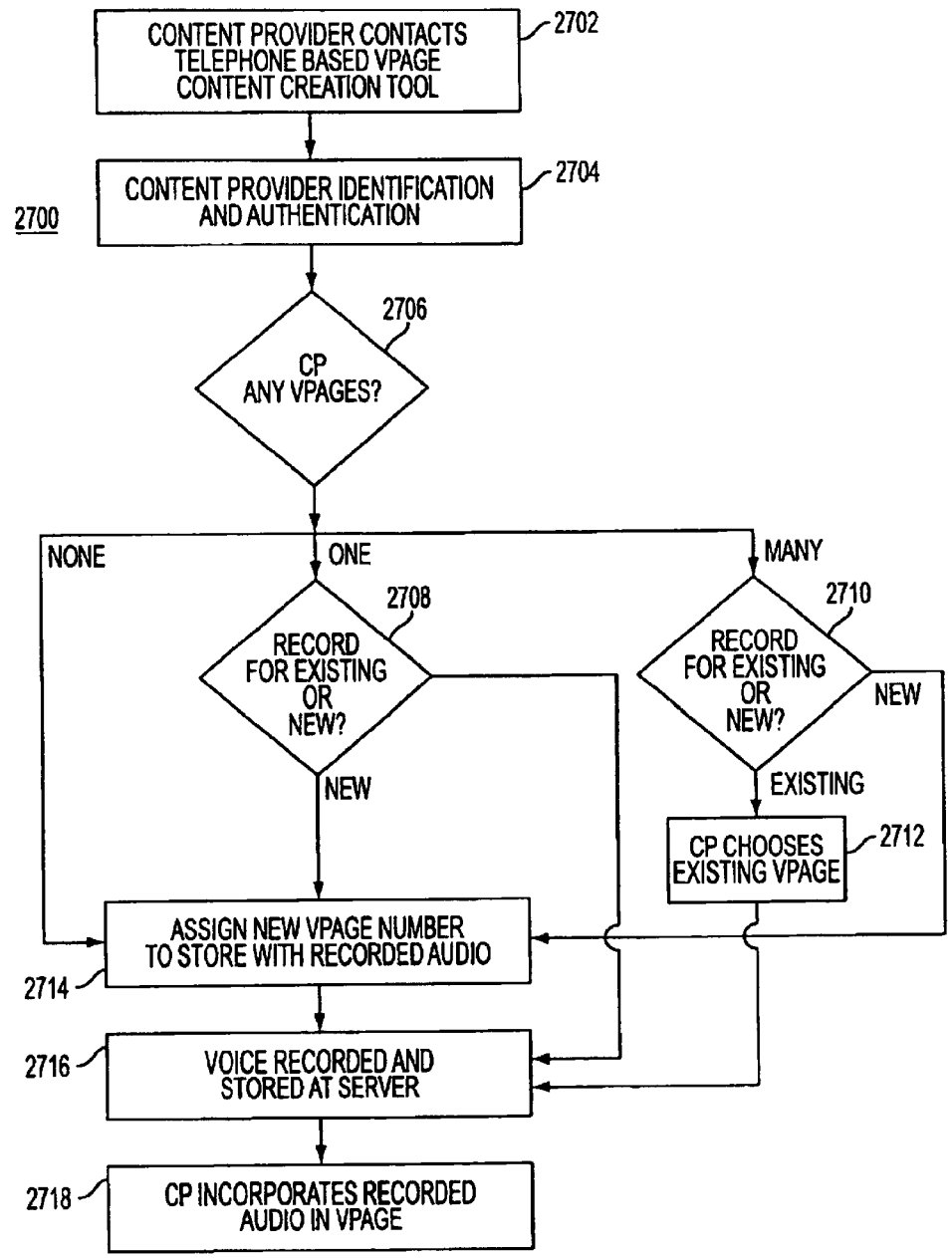
FIG. 27 depicts a flow diagram of a method for telephone-based content creation according to an embodiment of the present invention.

The telephone-based content creation portion may be referred to as a telephone-based content creation tool. This component allows content creators to create recorded audio. An access number may be provided by the system through which content creators dial in. Upon dialing into a number, the content provider is then presented with a telephone-based interface to guide the content provider in creating recorded audio. An embodiment of a methodology through which a content provider may create telephone based audio is depicted in FIG. 27 through method 2700. As shown, a first step 2702 may involve the content provider contacting a telephone based VPage content creation tool, such as through a 1-800 number or other access number may be provided to the content providers to dial into a server based system to create voice-based content. Additionally, the content telephone based content creation tool may be accessed over the Internet using Internet telephony or any other way of transmitting voice-based data from a content provider system to the server where the content will be stored and subsequently made available to be incorporated in VPages through content creation module 65.

Upon entry of the telephone based VPage content creation tool, in step 2704, the content provider may be prompted to provide identification and authentication information. Such information may comprise a user name and password that are spoken, PIN numbers through the DTMF keys on a telephone, or any other method commonly known for authenticating a user over a telephony based device. Within the telephone based content creation tool, it should be understood that common functions may be provided to allow the content provider to navigate within the system. For example, use of certain keys may prompt certain actions. For example, depression of the star key may quit the tool to stop further input of information. Further to return to the main menu, the zero key may be depressed, and to start over, the number associated with the letter N may be input. Other variations may also be provided as one of ordinary skill in the art would appreciate.

In step 2705, the content provider may be prompted to select the VSite for which the content is to be created, if the content provider has more than one VSite.

Also, as part of the system, help may be provided to enable the user to hear instructions on how to create and modify a VPage. Next, in step 2706, the system determines whether or not that particular content provider has any VPages currently stored and accessible in the system. If there are none, then the system progresses to step 2714 to assign a new VPage number under which this particular recording is stored. If the content provider has only a single page, then in step 2708, the system prompts the content provider to determine whether the content provider would like to have the recording stored for the existing page or new page. If a new page, then again step 2714 is performed and if not, then the system progresses to the voice recording in step 2716. If the content provider has multiple pages stored on the system, then in step 2710 the telephone based content creation tool prompts the content provider to determine whether the recording to be done should be stored for an existing VPage or a new VPage. If it is for an existing VPage, then in step 2712, the content provider is prompted to select from the available VPages stored by the system and then the system progresses to step 2716. In step 2716, the system prompts the content provider to begin recording a voice-based recording. When the content provider is done recording, he or she may so indicate by pausing for a predetermined period of time, or by depressing the pound key twice, for example. Other methodologies by which a content provider indicates the termination of a recording may also be used as appreciated by one of ordinary skill in the art.

Upon completion of the recording, the content provider may be permitted the opportunity to hear the recording to re-record and/or approve the recording. Once the content provider has approved the recording, the server system stores the recording in association with the VPage identified, either by selection of an existing VPage or by the new VPage identifier selected by the system. Then, in step 2718, the content provider may incorporate the recorded content in the existing VPage through the use of content creation tool 65. It should also be appreciated that the telephone based interface may enable the automatic input of the recorded content into an existing VPage upon prompts to the content provider.

Main content portion 2010 may also allow for the upload of audio files to be played as part of a VPage. As shown in FIG. 20, an audio portion 2032 may be provided that comprises a play button 2034 to allow the content provider to play a selected audio file to be able to determine how it will sound to a subscriber. Additionally, an audio file selection portion 2036 and a load button 2038 may be provided. The interface may enable a content provider to select a sound file stored on the content provider system and input that file's identifier and location in section 2036. Functionality for enabling the content provider to browse for the file may also be provided. Although shown as a WAV file, other types of audio files may also be uploaded, such as MP3 files, WAV files, real audio files, or any other type of sound based electronic file. When the content provider has selected the desired file, the content provider may then select the load button 2038, which automatically uploads the file from the content provider system to a server system and stores it in association with the desired and selected VPage. This methodology provides greater flexibility for VPage content creators. For example, suppose a department store decides to create a set of VPages, one each for every item offered for sale in the store. That department store may decide to hire audio talent to speak about those items and record information in a particular file format to be uploaded to serve as a VPage. The VPage may then provide functionality to allow the subscribers accessing the VPage to make purchases or engage in other activities associated with the item. In another example, suppose a disc jockey desires to showcase his musical talents. The disc jockey may then create a series of music clips in a particular electronic file format and upload those clips into one or more VPages that may be accessed by subscribers. Subscribers who are shopping for a disc jockey may then access that disc jockey's VPage and listen to the various clips that the disc jockey has selected to highlight his or her talent.

According to one embodiment of the present invention, it may be desirable to use a single file format for output to subscribers to allow the system to be more uniform, such as the WAV file type. Content providers may then either upload that file type, or the content creation tool may have an automatic file translation mechanism that translates other audio file formats into .WAV file format. Additionally, the system may set limits on the size of the file to avoid overloading the database with large audio file types. Other parameters about the file types may be specified by the system to create greater uniformity. For example, the WAV file may be limited to a sampling rate between 4 kilohertz and 96 kilohertz with a bit per second of 8 or 16 and may be either stereophonic or monaural. Although described as desirable, it should be appreciated that the system may also provide content providers with greater flexibility and allow them to store any type of file or any size of file that they so desire. As part of this flexibility, the server system may decide to charge the VPage content creator based on the type of file, size of the file, sampling rate, or any other file attribute. The amount charged may also be based on the size of the file, the length of time it has been stored, or some combination of these factors and the other factors mentioned above. Play button 2034 allows the content provider to play the uploaded file to determine how it sounds on the system.

Figure 22:
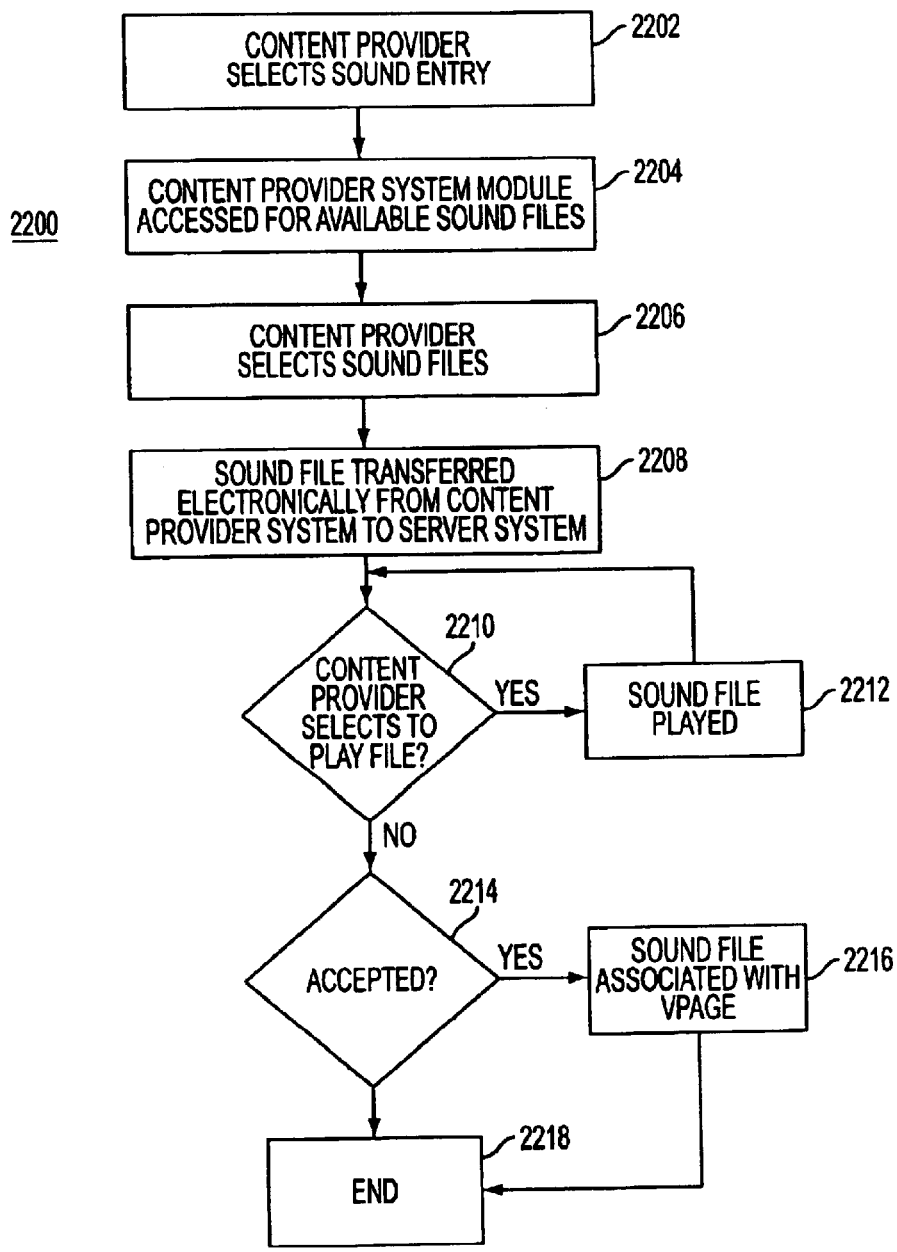
FIG. 22 depicts a flow diagram of a method of uploading sound files into a VPage according to an embodiment of the present invention.

This process for uploading sound files is depicted in FIG. 22 as method 2200. In particular, one embodiment of a method for uploading a sound file from a content provider system to a server system to be stored in association with a VPage may first involve step 2202. In this step, the content provider selects to upload an audio/sound file. In step 2204, the content provider system module is accessed for available sound file stored on that system. In step 2206, the content provider selects a particular sound file to be uploaded. In step 2208, the sound file is transferred electronically from the content provider system to the server system. In step 2210, the system determines whether the content provider has selected to play the file through selection of play button 2034. If so, the sound file is played in step 2212 and the system circles back to determine whether the play button is pressed again. If not, and the content provider moves onto another activity, then in step 2214 the system determines that the content provider has accepted the sound file in which case in step 2216, the sound file is associated with the VPage to be presented as part of this VPage.

Referring to FIG. 20, a links portion 2012 may also be provided for a memo type of VPage. Links portion 2012 enables the content provider to select one or more messages for voice output to describe the choices and a plurality of choices to which the subscriber may transfer. The choices may transfer the subscriber to another VPage within the network, including a transfer to a question type of VPage to engage in a transaction or perform some other action, or a transfer of the subscriber to a specified telephone number using a call transfer as described below. As shown, a message portion. 2040 may be provided to allow the content provider to create the text for a message to be output via text to speech conversion to the subscriber upon conclusion of the main content portion of the VPage. Next, various choices 2042 may be presented. To add or remove choices, buttons 2041 and 2044 may be presented. For each choice, at least one option format is provided to enable the subscriber to select the option. The options may include a DTMF selection from a telephony device as depicted in input section 2046, or may comprise a speech enabled link as depicted in section 2044. Speech links are described in detail below. Additionally, for each choice, there may be a "go to" reference associated with the particular choice, whereupon selection of the option associated with the choice, the user is transferred to that particular "go to" reference. In this embodiment, the "go to" reference provided is a VPage wherein the site number is depicted in site portion 2048 and the VPage is depicted in page portion 2050.

Additionally, according to one embodiment, for each choice, the content provider has the option of presenting a message to be relayed to the subscriber upon selection of that particular choice as the subscriber is being transferred to the "go to" reference. In one embodiment, the message may be either text or audio and may be input in text box 2052 or audio box 2054. For each of these boxes, a play link 2055 may be provided whereupon the content creator can play the actual text through a text to speech conversion or hear the audio that is generated in association with that particular choice. To enable the content provider to select the audio, a browse link 2057 may be provided if that particular input type is selected. The link portion enables the VPage content creator to create a navigational structure for subscribers to use that particular VPage.

Figure 21:
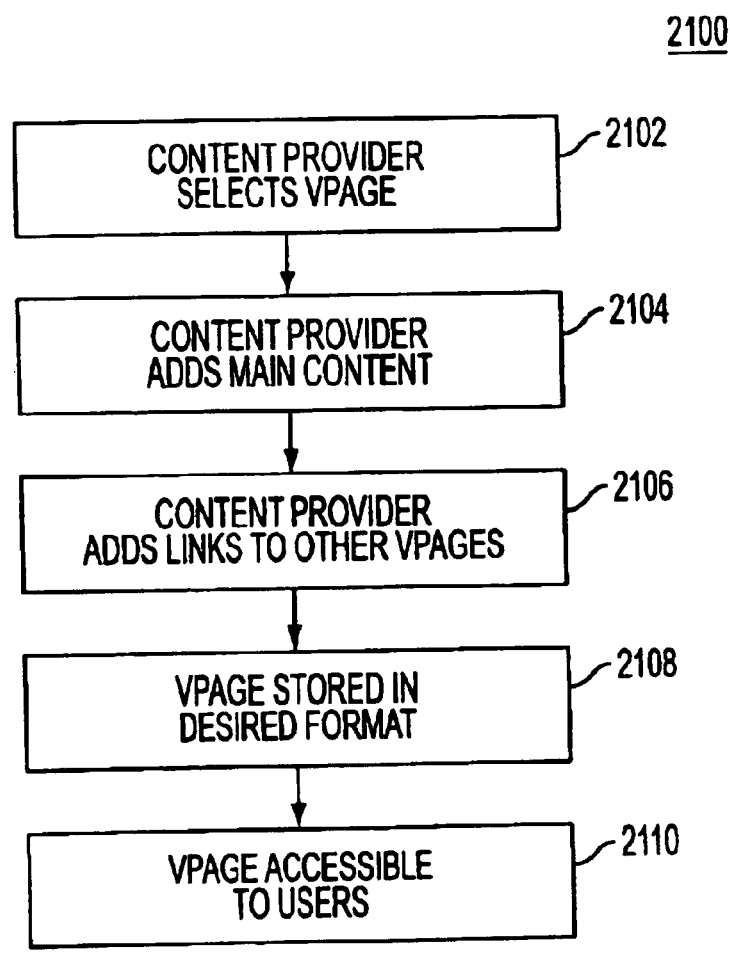
FIG. 21 depicts a flow diagram of a method of creating and storing content according to an embodiment of the present invention.

The overall flow of input for a memo type of VPage as described above is summarized in FIG. 21 through method 2100. Through this method, in a first step 2102, the content provider selects a VPage to either create or edit through the portion 2004. Next, in step 2104, the content provider adds to the main content through main content portion 2010. Next, the content provider in step 2106 adds links to other VPages or other references through link section 2012. It should be appreciated, however, that steps 2104 and 2106 may be done interactively and in separate order, because order is not necessarily important to the completion of those two tasks. When the content provider is satisfied with the main content information and the link information, in step 2108, the user may select save button 2056 to store the VPage in the desired format.

As described above, VPages may be stored by the system in a markup language format, such as TML or some other version of XML. Content creator module 65 thus translates the corresponding inputs into that particular markup language format through direct reference of the content in the interface to a particular tag in the language. For example, TML provides a text tag (now called "speech") whereupon any text input in section 2020 is created at a VPage surrounded by speech tags to indicate to the TML parsing engine when that VPage is parsed that this particular text is to be converted to speech and presented to the subscriber. Similarly, TML creates a tag for audio content whereupon the information in portions 2026 and/or 2036 are input into a VPage in TML format surrounded by the appropriate audio or sound tag. Similarly, TML may convert the messages inputs to speech tagged entries with the information from section 2040. The options are converted to option tagged entries as well. Examples of TML portions created for these inputs to the interface are shown in FIG. 30. FIG. 30(*a*) depicts an example of a TML code for output of a sound file wherein the sound file is a .VOX sound file type. FIG. 30(*b*) is an example of a TML script for gathering DTMF base numbers in response to an input query. FIG. 30(*c*) is an example of a script for receiving speech enabled link responses wherein the choices here in the grammar are apples and oranges. FIG. 30(*d*) is an example of a TML script wherein either speech or DTMF may be posed in response to a particular query to provide the link. FIG. 30(*e*) is a TML script example for a call transfer to transfer a subscriber from an active VPage directly into a telephone number of voice mail system. Call transfer is described in greater detail below.

Accordingly, the interface structure presented in view 2000 relates to the format of the markup language in which the VPage is to be stored to assist in easier translation of content input by a content provider to a VPage to be stored by the system. If other markup languages are used, the input format in the interface may vary according to the types of tags available by that particular markup language. Once the VPage has been stored in the proper format in step 2108, then in step 2110, the system makes that page available by subscribers upon selection of that particular VPage as described in detail below.

Figure 2:
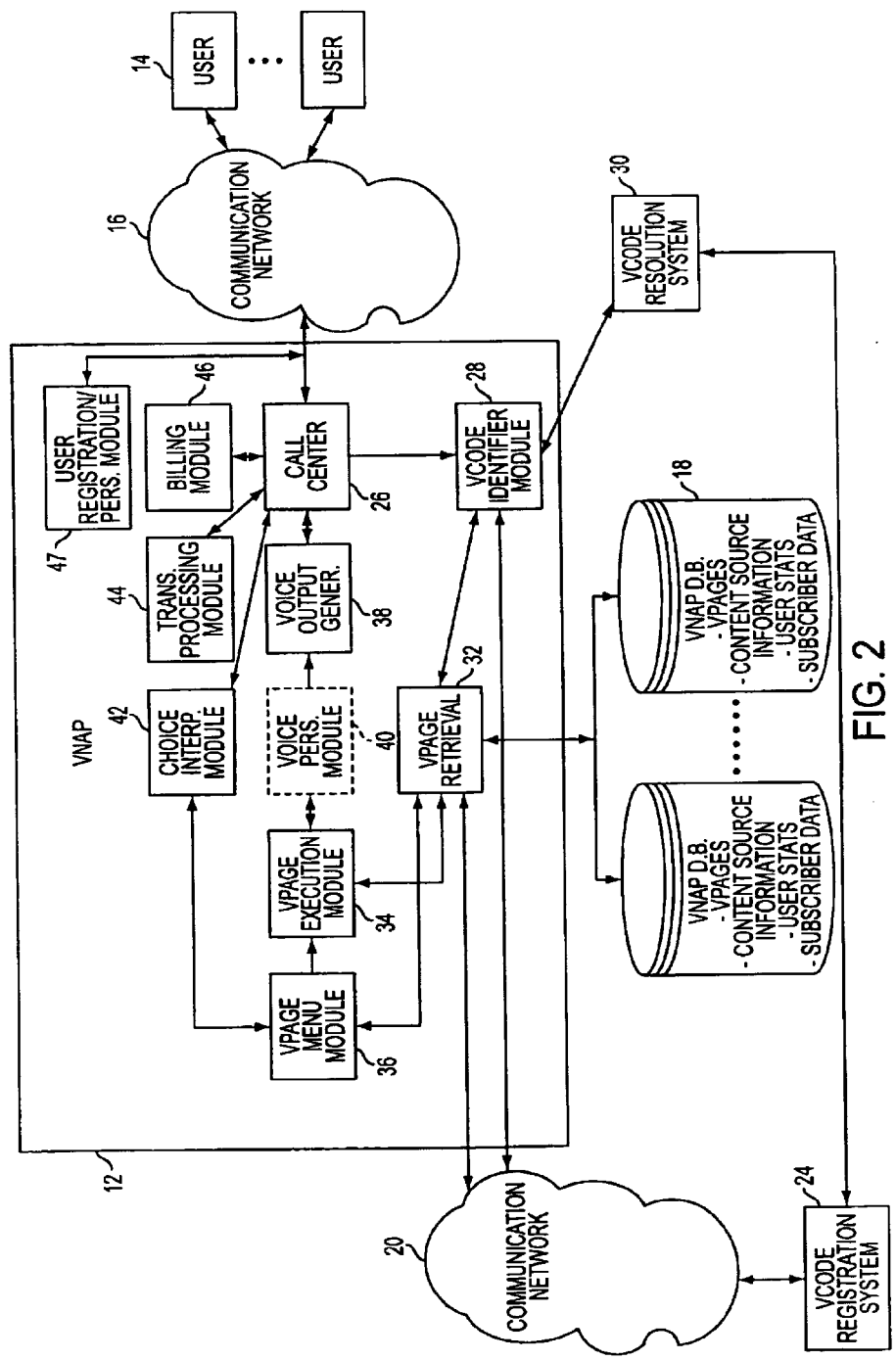
FIG. 2 depicts a more detailed diagram of the VNAP architecture for use in a VCode system according to an embodiment of the invention.
Figure 23:
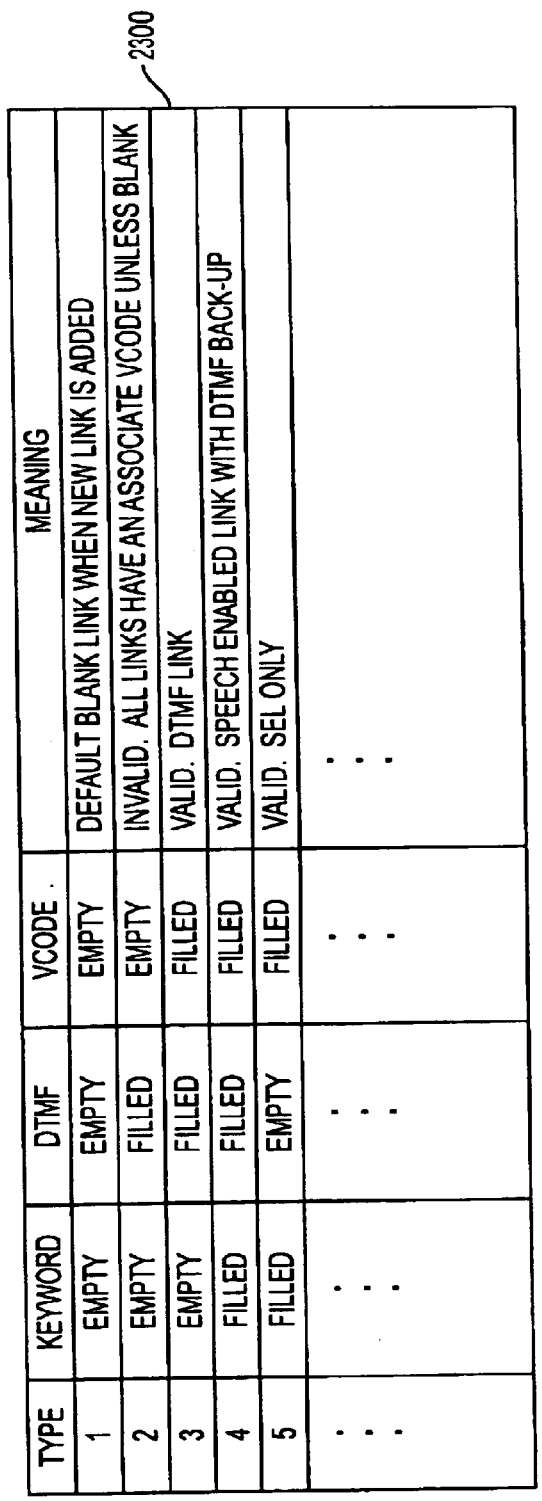
FIG. 23 depicts a table representing functionality of DTMF-based and speech links for use in a VPage system according to an embodiment of the present invention.

As described above, the system may permit a variety of input formats to select one of the options corresponding to a link. As shown in FIG. 2, a numerical input may be provided in section 2046 or a speech enabled link may be provided in section 2044. In a situation where both types of input options are available, the system may provide for content providers to input one or the other, or both. FIG. 23 depicts a table indicating one embodiment of an interpretation table provided for various input options. As shown, there may be five different types of combinations when a key word or speech enabled link is provided in a DTMF or numeric input mechanism is provided. Additionally, for each option, a "go to" reference may be required to indicate where to transfer the subscriber upon selection of that particular choice. Accordingly, for each option type, there may be three parameters: a key word or speech enabled link input, a DTMF or numeric input, and a VCode or "go to" input.

Figure 25:
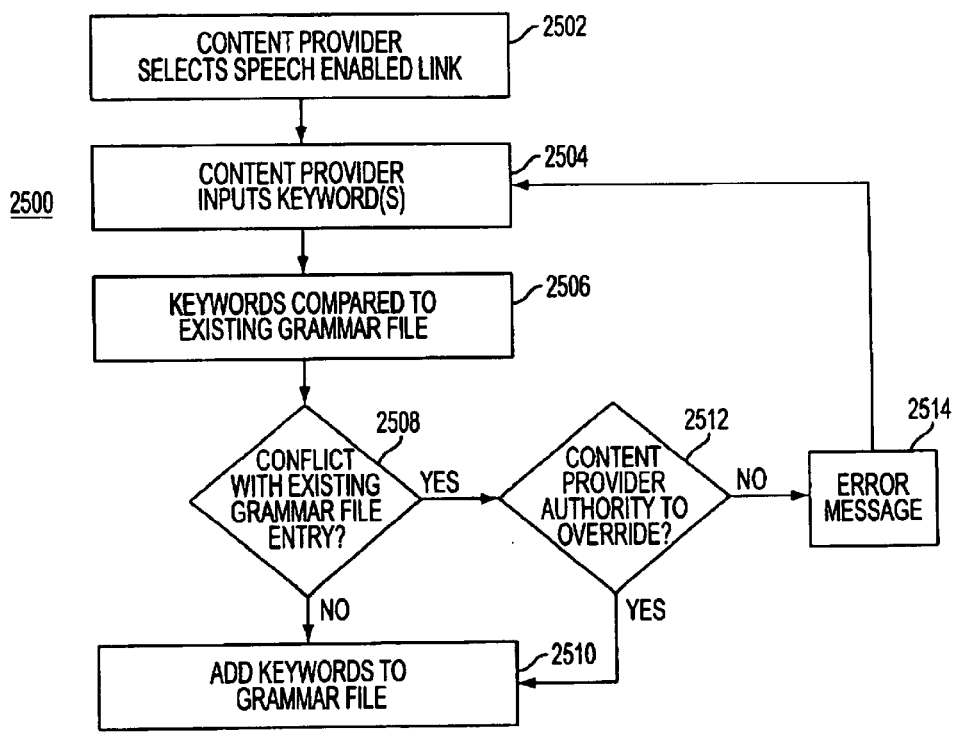
FIG. 25 depicts a flow diagram of a method of speech enabled link creation according to an embodiment of the present invention.

With these three inputs, five different types of choices may be recognized and interpreted by the system. The first type is one in which no key word, DTMF or VCode is input, indicating that the default blank link has been selected. This describes the situation which the link has been newly created. For storage, there may be four different types of links. In one type of link, if the VCode is empty, it is an invalid link because all links may be required to be associated with the VCode or some other transfer to which the subscriber is transferred upon selection of the choice. If upon saving a particular choice, the key word input is empty but the DTMF input and VCode are filled, this is a valid DTMF type of link. If, however, all three are filled (key word, DTMF, and VCode), then it is a valid speech enabled link with DTMF back up. If the key word is filled, but the DTMF is empty, and the VCode is provided, this is a valid speech enabled link input. The system saves this choice into a database. The process for creating speech links is provided and shown specifically with reference to FIG. 25.

Speech links operate through the use of grammar and grammar interpretation engines, such as the embodiments described with reference to FIG. 17. To utilize speech links, therefore, the key word input by the content provider is added to a grammar page usable by the grammar interpretation module to interpret the choices selected by subscribers. Process 2500 provides various steps for this to occur. First in step 2502, the content provider selects a speech enabled link by inputting text into the speech enabled link portion of section 2044, for example. Then the content provider inputs key words into that particular field in step 2504. It should be appreciated that whereas one key word may be input as shown, it is also possible to input a combination or a plurality of different key words to allow the user to select a particular choice. For example, in asking a subscriber the name of their favorite baseball team, it may be possible to allow the subscriber to indicate the team by city, nickname, or another slang name. For example, for the Cincinnati Reds, the key words Cincinnati, Reds, and Cincy may be provided to allow a variety of choices instead of a single term. Next, in step 2506, the key words are compared to existing grammar files active for that particular VPage.

In using speech links, it is possible to use a variety of different processes related to the grammar files. For example, a single grammar file may be usable for the entire system of VPages accessible by a subscriber. Various different files may be usable by a particular subscriber. For example, it may be desirable to provide a uniform command scheme and reserve key words associated with that command scheme to avoid confusion. To allow a subscriber to navigate within the system, certain key words like back, forward, stop, home, and others may be reserved that allow certain functionality to occur within the VPage network.

Also, a grammar file may be associated for each particular subscriber or VPage content provider as desired. Also, each particular VPage may have its own grammar file that is usable in combination with the overall grammar file and other grammar files as well.

According to a preferred embodiment of the present invention, four levels of grammar may be active for any particular page. These grammar entries may operate in a hierarchical fashion such that words are resolved against grammar entries first at the highest level and then on down to lower level grammars.

The highest level is preferably system-wide navigation commands (e.g., home, go to, back, next, stop, pause, volume, etc.). The next level may be a VName/VSite direct access terms. For this level, the terms used to directly access a VSite by its VName are recognized. For example, the VName of Cincinnati Reds may be assigned to a VSite about that baseball team. That term may be placed in the second level grammar hierarchy to enable that term to be resolved to have the system initiate the corresponding VSite.

The next level down may be VSite specific commands. These commands may relate to navigation within a VSite or other commands that have meaning within that particular VSite. The fourth level down may then be VPage specific commands. These may be commands that apply for a VPage being accessed by a user.

By using levels of priority, the grammar system is able to resolve potentially conflicting terms by choosing a term from the higher level.

One of the advantages of using different levels is the ability to select levels for customizing dedicated site access. As described in the summary of the invention, in one embodiment, VSites may provide dedicated access to its VSite, such as through a specified phone number. The same VSite may also be accessible through a VNAP access number or other general access techniques. When a user accesses a VSite through the dedicated site access technique, certain command levels may be disabled, such as the Vname/VSite level commands. This may enable the VSite to be self-contained such that the user is not able to transfer to Vpages of competition, for example, as in the Bank example in the summary.

It may also be desired to enable a VSite to disable certain commands within a selected level, but not all commands in that level. For example the VSite may disable the commands that would transfer the user to a competitor's VSite, but not to affiliates' VSites.

In addition, as part of providing dedicated site access, the system of the present invention may provide different error handling routines depending on whether the user accesses the VSite via the dedicated site technique or other general access techniques. These error handling techniques are what the system uses when the user issues a command that it does not know how to interpret. The VSite owner may specify for dedicated site access that one error handling routine be used whereas general access users may be handled differently.

To avoid confusion between terms, it may be desirable in step 2506 to compare the input key words with key words in existing grammar files available for that particular. VPage. If in step 2508 a conflict with an existing grammar file entry is found, then in step 2512 the system may enable the content provider to override the particular entry in the grammar file. Therefore, the system checks in step 2512 whether that particular content provider has authorization to take that action. If not, then an error message may be generated in step 2514, cycling the system back to step 2508 to allow the content provider to choose a different key word for that particular choice. If the content provider has authorization to override or there is no conflict with existing grammar file entries, then the key word is added to the particular grammar file associated with that particular VPage. As described above, the key word may also be added to other grammar files as appropriate. Once this key word has been added to the grammar file, it is then available to be interpreted by voice the recognition system, such as the one described through FIG. 17, to enable subscribers to navigate within the various files in the VPage system.

Use of speech enable links is empowering for subscribers so that they do not have to utilize a keypad. For example, some users may connect using a telephone in which inputting numbers is inconvenient, such as phones that have the numeric portion within the handset. Therefore, it is easier and more intuitive to allow subscribers to navigate pages that are linked by key words. Given the chance to specify links by key words, content providers are able to create more flexible applications and subscribers find it easier and more pleasant to use the VPage network. A couple of examples of the way in which these speech links may be used include the following: Joey, a content provider, has created a VPage about the NFL. In one of his VPages he asks, "what is your favorite NFL team?" By inputting speech links corresponding to the various NFL teams, subscribers that access that VPage may then be transferred to a VPage personalized to the specific favorite teams selected. In another example, a realty company may like perspective home buyers to be able to browse a particular VPage about a property and to transfer to a live agent to answer their questions about that particular property.

Interpretation of speech links may occur as follows: Subscriber has listened to the content of VPage with speech links. After a small, configurable pause (the pause may be the same for all VPages, but may be configurable by a system administrator), the option description text is read out by the system. The system pauses and listens for a key press or a key word. If nothing is said or pressed, the system may time-out. If something is typed through a key press then the system attempts to find the match for the DTMF or numeric input. If something is spoken, the system attempts to match the key word to either a global command key word or a key word input for one of the options for one of the speech links. Once a match is found, the link corresponding to the match is followed. It may be desirable to allow subscribers to say or press a DTMF key, to say a key word, or press a DTMF key at any time while in a particular VPage. Therefore, links are functional at all times, not just after the message indicating the available choices. This is advantageous for users who are frequent visitors to a particular VPage to allow them to navigate more quickly within the various VPages available.

In one embodiment, if both a key press and a word are said at the same time, it may desirable to allow one (e.g., DTMF entry) to take precedence, so that the system knows which to accept. If a subscriber says a key word, and it is not recognized, an error message may be generated to the user to allow them to give a second repeat of the key word or use the DTMF input instead.

The present invention also provides for a target of a particular option to comprise several different target types including the following: a VPage transfer target which transfers the subscriber to a selected VPage, a call transfer target which transfers the subscriber to a telephone number or to a voice mail system with that telephone number, or to select automatic file transfer of a particular file directly to the subscriber.

Figure 24:
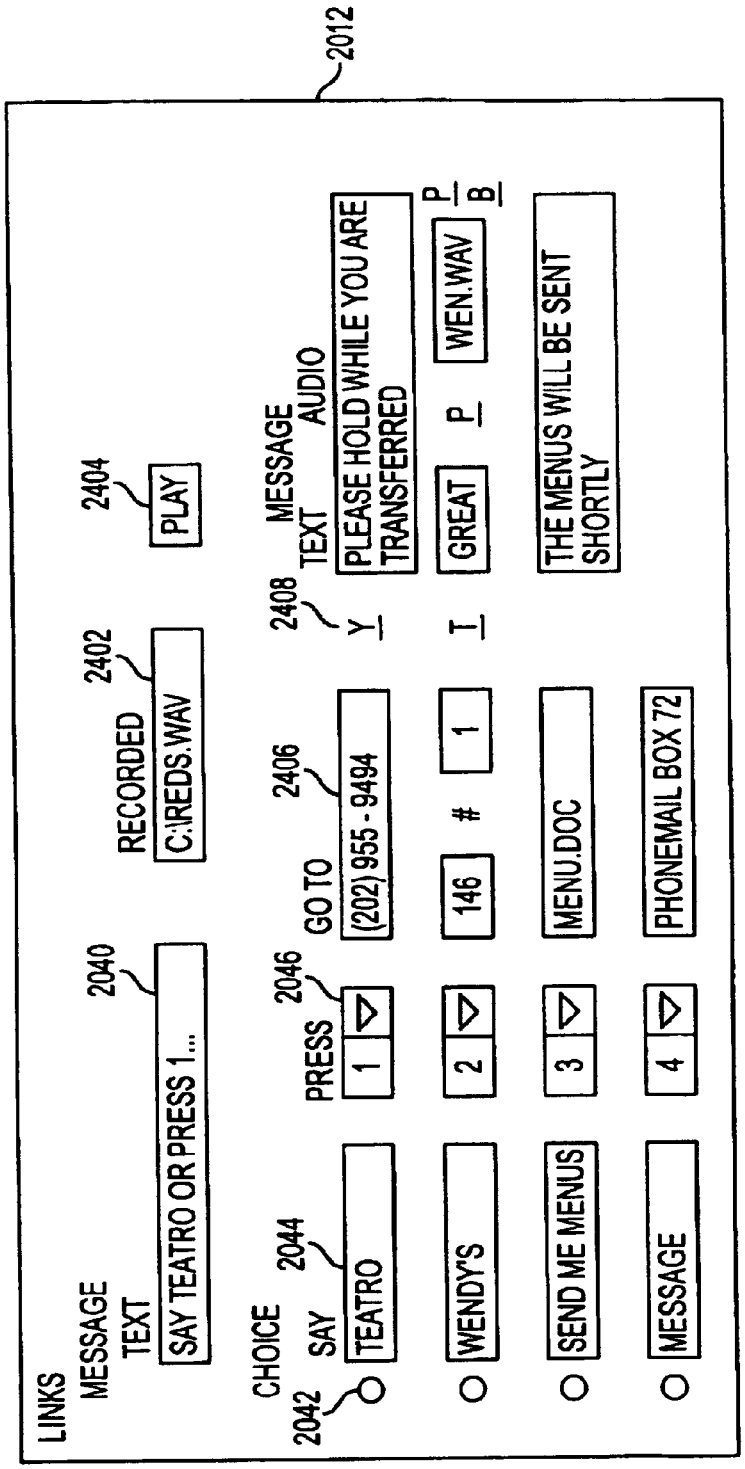
FIG. 24 depicts a links input portion of a view form a content creation module according to an embodiment of the present invention.
Figure 28:
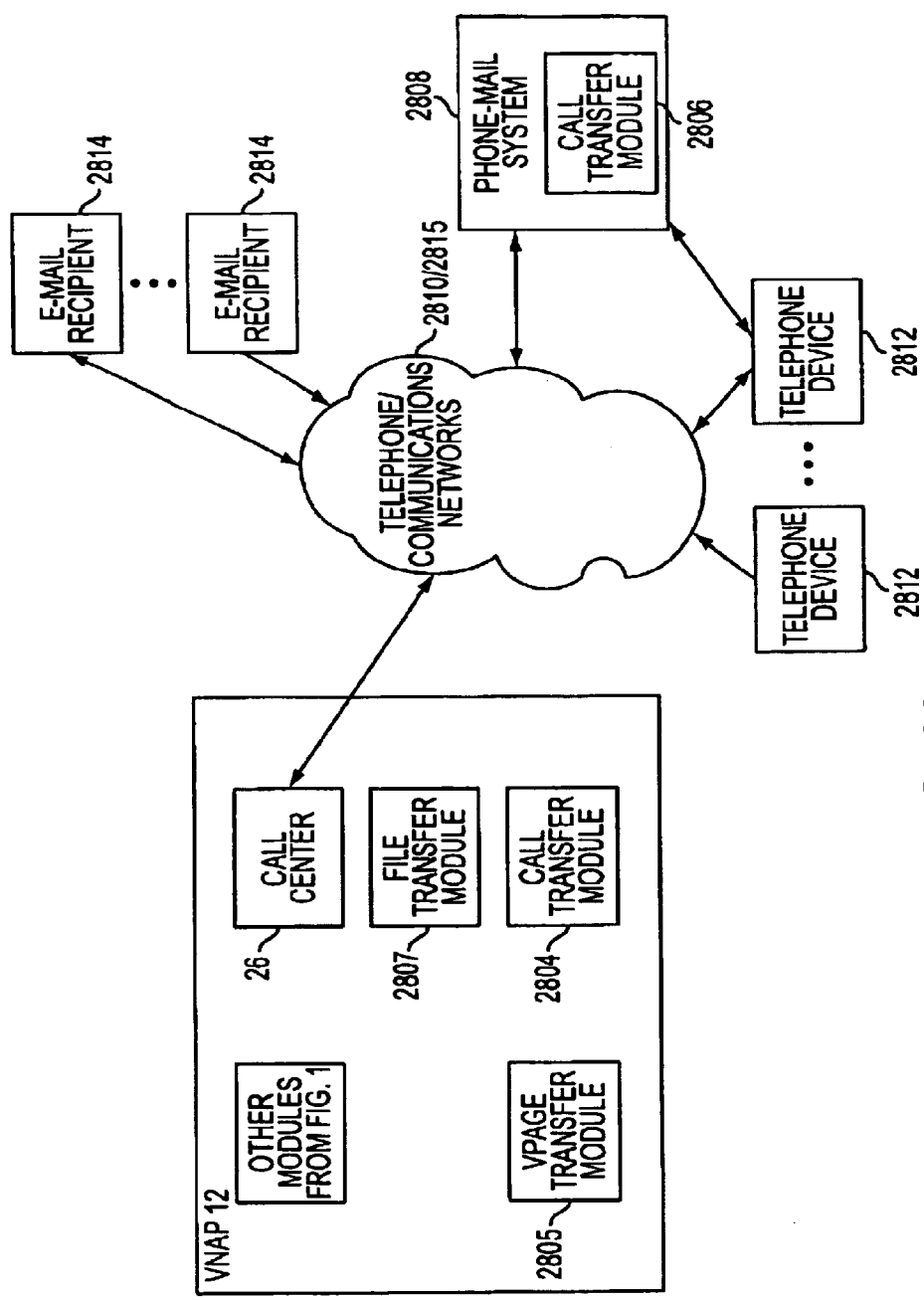
FIG. 28 depicts a system that enables call transfer from a VPage to a phone mail system according to an embodiment of the present invention.

FIG. 24 illustrates a linked portion that provides four different types of targets to the various choices within the linked section. The first one depicted shows a call transfer choice wherein the "go to" column indicates the number to which the subscriber is to be transferred. When the subscriber selects this particular choice, as shown in FIG. 28, VNAP 12 may initiate a call transfer module 2804 to automatically transfer the subscriber from the current VPage to the telephone number selected, such as by dialing that telephone number and transferring the user from the VPage interaction system to that particular phone number. In this case, the subscriber is transferred out of the VPage network and its functionality. Optionally, the system may transfer through a conference feature wherein the subscriber is able to cancel call transfer if no human user answers the telephone at that particular number to, thus, transfer back to the VPage network.

The second choice in FIG. 24 shows the standard VPage transfer option in which the particular VPages in the network is specified where upon selection by a subscriber of this option choice results in subscriber transfer to the designated VPage. The third choice indicates a file transfer option choice. Selection of this option causes VNAP 12 to initiate file transfer module 2807 (see FIG. 28) to transfer the selected file type to the subscriber using personal profile information about that subscriber. For example, a particular recipient address may be provided for file transfer, such as an e-mail address, an FTP address, or any other place where an electronic file may be transferred. It is also possible that if the subscriber profile does not include information where a file may be received, the system may obtain a destination where the subscribe wants the information to be transferred, such as through a question type of VPages as described in detail below.

This option type is useful for many different examples. For example, suppose a user has a personal VPage where one of the options is to allow the subscriber to have a copy of the person's resume transferred. This type of VPage may be useful if, for example, a directory of VPages relating to employment. The VPage system, thus, may serve as a browsable employee database where each potential employee has his or her own VPage with information about the potential employee and the ability to receive a resume, if desired.

Figure 1:
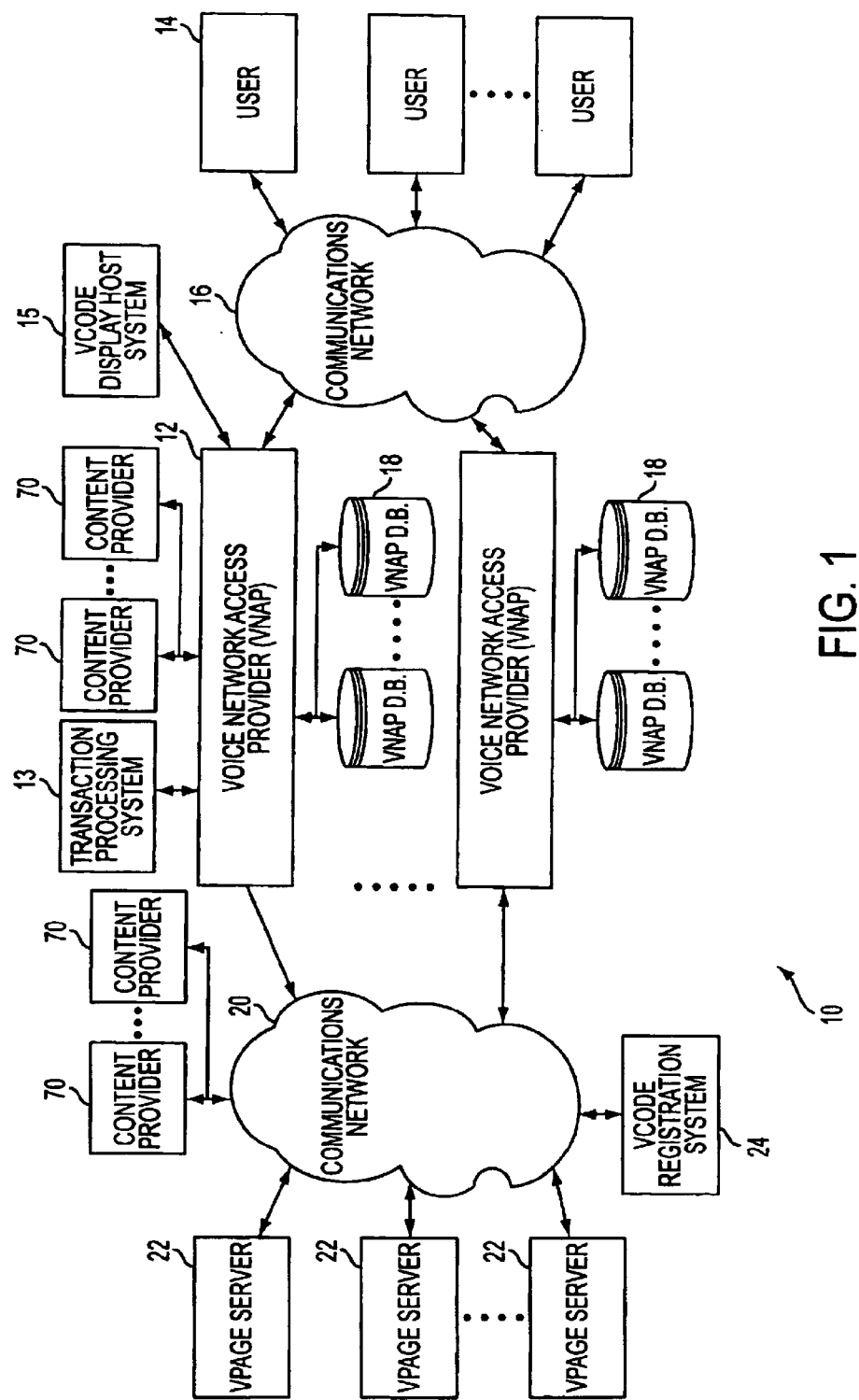
FIG. 1 depicts a schematic diagram of a VCode system according to an embodiment of the invention.

The fourth choice in FIG. 24 may specify particular voice mailbox number. To provide the functionality of a transfer directly to a telephone number or to a voice mail or phone mail box, the system of FIG. 1 (described in greater detail below) may further be connected as shown in FIG. 28. VNAP 12 may be connected to one or more telephone networks 2810, which may be connected to one or more phone mail systems 2808 and one or more telephony device systems 2812. VNAP 12 may also be connected to one or more networks 2815 which connect the VNAP to one or more e-mail recipients 2814.

In one embodiment, network 2815 may comprise the Internet or other e-mail accessible transfer systems. VNAP 12 may thus comprise a file transfer module 2807, a VPage transfer module 2805, and a call transfer module 2804. When a subscriber connected to VNAP 12 desires a call transfer, as selected through one of the call transfer type links, call transfer module 2804 connects the subscriber (e.g., voice over IP or over the telephone network) to the selected telephony device 2812 by placing that telephone call and transferring the subscriber directly to the telephone device such that the connection is made between the subscriber directly to the telephony device over the telephone network 2810. If, however, the user selects a transfer directly to phone mail, then call transfer module 2804 connects over telephone network 2810 to phone mail system 2806 to connect the user into a specified phone mail box. It should be appreciated that phone mail system may be accessed through specification of a particular telephone number and, if necessary, extension number. Accordingly, various users may access the messages stored in the voice mail system for that particular content provider through a telephony device 2812 connecting over the telephone network 2810 or by directly connecting the phone mail system through an internal telephone network. If a subscriber selects a file transfer type of target for an option, file transfer module 2807 connects over one of the other networks 2815 to a recipient 2814 such as an e-mail recipient or other electronic file transfer system such as FTP, etc.

In addition to enabling content providers to create a VPage that allows subscribers to transfer from a VPage to a phone mail, it is also possible to set up phone mail systems and other systems to allow for transfer from a particular phone mail system directly into a VPage. For example, it may be desirable for a small business to have a VPage associated therewith. Accordingly, when no one is available to answer the telephone at the particular business, a caller is automatically transferred into a VPage associated the business. Through the VPage, the caller may be able to make purchases over the telephone through a question type VPage. And also, the caller may be able to find more information about the products and services offered by that particular business received electronic files and perform other actions as described above.

Additionally, other messaging services may also be provided by the system. One such messaging format may comprise voice instant messaging. The key element is the notion of an intelligence voice box which allows subscribers to retrieve, send, and manage interactive voice messages sent by other subscribers to the network. Three other types of messaging services may be offered; web-to-voice, voice-to-voice, and voice-toe-mail. The web-to-voice feature allows content providers to send out voice links to the VSite they created with the content creation module. Recipient receive a message in their voice box with a specified message such as, "Hello, friends. I just created this great new VPage site with 150 new clips from Jerri Seinfeld's best Seinfeld episodes. Just say, 'go there' to check it out." With a simple speech command or telephonic input the recipient then accesses the VSite in the same manner he would normally, or may simply delete the message. This message may be accessible when the subscriber logs onto the VPage network whereupon the VPage network informs the subscriber that they have certain VPage messages. The subscriber could then choose to listen to the VPage messages, and if received from another content provider, may activate the link to go into the VPage corresponding to the link. The functionality provided allows the transfer of fully functional interactive voice services including links, text-to-speech, sound clips, etc. and not just plain messages to multiple users. Content providers are able to create a message, transmit it to a plurality of subscribers to the network, and attract attention to their particular VPage. Subscribers may choose to limit the types and categories of messages about VPages and may even sign up to receive information about certain types of VPages. A personal profile for the subscriber may include such information to allow the system determine which subscribers to receive which voice-to-web messages provided by content providers.

A voice-to-voice feature may also be provided whereupon anyone may send a brief voice message to any other member of the network through a simple three step process. First, the participant records the message over the telephone such as using the voice diary feature, selects recipients including individual users or a predefined buddy list and saying, "send." This message service is similar to traditional voice mail, but also allows for powerful multicast messaging (eliminating the need for the user to leave the same message multiple times) as well as its powerful interactive capabilities, e.g., all recipients can instantly respond by simply saying, "reply" without having to dial a new telephone number.

Also, voice-to-e-mail may be provided. The information recorded is sent to the e-mail address for the other subscribers or buddy list participants selected. In this case, the recorded sound file may be sent as a .WAV file attachment or some other form of sound file attachment to the electronic mail that is sent to the recipients.

Figure 26:
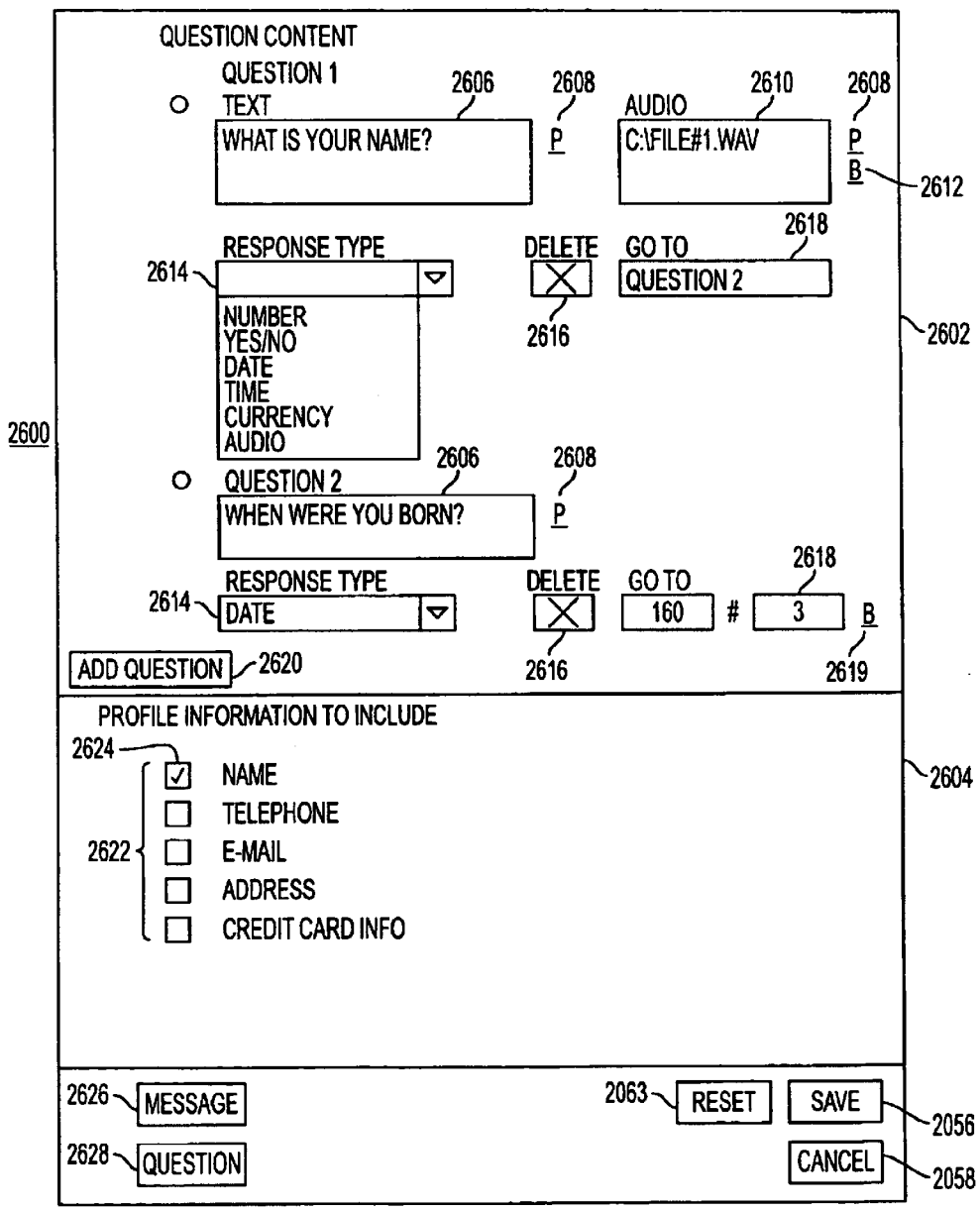
FIG. 26 depicts a view of a question input generated by a content creation module according to an embodiment of the present invention.

Referring back to FIG. 20, as described there may be multiple types of VPages. One type of VPage may be a question VPage which allows for the content provider to interact with subscribers to obtain information through various questions posed to the subscriber to allow them to create input of various types in response to those questions. In one embodiment, each question VPage may provide only a single question. FIG. 26 depicts an embodiment of a user interface activated by the system upon selection of question button 2628 by a content provider. Interface 2600 may contain multiple portions, including a question content portion 2602 and a profile information portion 2604. To reduce the number of questions asked of a particular subscriber, the content provider may specify in profile information portion 2604 those different fields within the user profile that may be automatically transferred upon completion by the subscriber of the question VPage. As shown in FIG. 26, a plurality of fields may be stored as part of the personal profile of subscribers to the system. Through check boxes 2624 or some other selection mechanism, the various profile fields shown as 2622 may be selected by the content provider, whereupon those fields are automatically transmitted to the content provider at the conclusion of the entry of the question VPage.

Specifically, when a subscriber opens a question type VPage, the system interacts with the subscriber to obtain any responses to the various questions posed. At the conclusion of that session, the answers are collected by the system and made available to the content provider through various transfer formats, such as automatic transfer via e-mail to the content provider. For example, if the VPage content provider is providing for transactions for purchases of items, upon completion of the question type VPage, the information may be automatically transferred to a transaction processing engine associated with the content provider to complete the transaction associated with the purchase of the item. In the question content portion 2602, various questions may be input by the content provider. To add a new question, button 2620 may be selected whereupon a new question may be added to the question content for this particular VPage.

For each question, a plurality of different portions may be provided to allow input of information relating the question to be asked to the subscriber. For example, text box 2606 may be provided to allow the content provider to specify the text to be read to the subscriber. A play link 2608 may be provided to allow the content provider to hear how that question will be read by the text input in text box 2606. In addition to or instead of, the content provider may prefer the question to be partly or completely read by an audio portion such as the content provider's own voice. Through audio portion 2610, the content provider may specify the file name of the audio to be read as part of question one. A play link 2608 may be provided as well as a browse link 2612 to enable the content provider to browse for and select the file to be input in box 2610.

Each question may also be specified as one of a variety of response types through a drop down box or other selection mechanism such as selection mechanism 2614. According to one embodiment of the present invention, the response types may include a number, a yes/no input, a date, a time, a currency, or audio recording. A delete box 2616 may also be provided to delete the particular question. Next, a target for the question may also be provided that indicates the next action to be taken by the system after a response is received to that particular question. The target may be specified in section 2618 and may comprise a next question, or a particular VPage, or any of the other targets specified by a message field as described above. Because the system is trained to accept either voice or numeric inputs (such as through DTMF inputting), it may be desired to specify certain parameters that are acceptable for the various response types. The number field may be specified by the user through input of various numbers through the keypad or DTMF followed by the pound sign. The number field may permit a variable linked response and, therefore, may prompt the user by saying, "please enter the number followed by the pound sign." The yes/no response type may prompt the user by saying, "to select 'yes' press 1 and to select 'no' press 2" with other results ending in an error. The date response type may result in the prompt for year, month and day.

To guide subscribers through inputting this information, a sequence may be provided as follows: requesting that the subscriber enter the 4-digit year, a 2-digit month, followed by the pound sign, and 2-digit day followed by the pound sign. At the end of this input, the day may be read back to the user to confirm that the day was input correctly. The time response type may result in a prompt for hours and minutes with the following occurring for that response type. First, the user may be prompted for am or pm through the input of the number corresponding to the letter "a" or "p" followed by the pound sign. Next the hour may be input through a 2-digit input followed by the pound sign. And the minutes may be input with a 2-digit input followed by the pound sign. At the conclusion of the response by the subscriber, the entered information may be read back to the subscriber to confirm through the input of "1" or to re-enter through the input of "2."

A currency response type may allow the subscriber to input value to be entered in dollars and cents. First the user may be prompted to provide the dollars followed by the pound sign and, next, the cents followed by the pound sign. The cents field may be prompted and validated to be a variable length of up to 2 digits. At the conclusion, again the input value may be read back to the subscriber to confirm through the input of "1" or to re-enter through the input of "2." For an audio response type, the system begins recording the information received from the subscriber as an audio file type.

The system may prompt the content provider to provide the audio input. Upon completion, the content provider may denote the end of the input by pressing a given key (e.g., the pound sign). The subscriber may then be provided a predetermined period of time to provide an audible response. When the user presses the selected key, the system may then confirm receipt of the message. It may be desirable to set a limit on the time of the message input by the subscriber, and, therefore, a predetermined time limit may be set. In this case, if the user exceeds the predetermined time period, the user may hear a message indicating that he has reached the time period and that the recording has stopped. The system then gives the user the option to confirm the message, listen to it again, or to re-record the response. When the subscriber has answered the questions on a page, the system sends an e-mail or other electronic transmission of the information with responses to the content provider or a specified recipient, such as a transaction processing system to buy a good or service. Response e-mails that contain audio file responses may include the audio file as an attachment in a .WAV format. The system may create the message of the e-mail such that the body indicates the presence of each response and specifies the title of the attached files if any.

To allow the content provider to more easily determine targets for a particular question, a browse button 2619 may be provided to allow them to monitor an index of available VPages for which that particular question VPage may link at the conclusion of the answer to a particular question. A confirmation message may also be added to a particular questions VPage that is read at the conclusion of all responses to a particular question VPage (e.g., "thanks! we will book your reservation").

As mentioned above, the profile portion allows the content provider to select the fields to include within the concluded question session from the available profile. It should be appreciated that some subscribers may limit the fields that are automatically transmitted to a content provider and may indicate as such to the creation of their user profile. If a user has selected a particular field to be private, then the e-mail that has been transmitted to the content provider will not include that information and will indicate that the information of the selected profile field was designated private by that particular subscriber. If certain information is required by a content provider from the profile (e.g., the credit card information), then during the question session with the subscriber, the subscriber may be prompted to verify authorization to release that information as required information to complete a particular question VPage.

Another feature of the present invention comprises the voice diary functionality as described above. Specifically, recordation of telephone based voice content from a particular content provider as described above. The system may provide functionality to save these voice recordings in a voice diary database set aside for a particular content provider or other subscriber of the system. Accordingly, the system offers to subscribers and content providers the possibility to record voice messages and to manage a voice diary thus created. Access to a given voice diary may be limited to the creator of the diary. Unlike VPages, other members of the network may be screened from listening to the voice created. A diary may contain several diary entries, each of which may be thought of as a distinct audio clip. The subscriber, thus, may have a limit on the number of diary entries he can save or may be charged based on the size of entries in the voice diary. A diary entry may have a description, which may be created when the voice recording occurs, or later through a web based interface to change the default such as, message one, message two, message three, etc. In this embodiment, a subscriber may be someone who subscribes to the network either through a web interface or via a call center. The subscriber, thus, interacts with the network through several behaviors. The subscriber may browse the network, create content on the network, and thus be a content provider.

The system provides functionality to allow callers to record voice messages via phone, browse voice messages via phone, play voice messages via the phone, and delete voice messages via the phone. Additionally, the callers may edit voice messages such as the description of the voice message via the web site, play voice messages via the web site, and delete voice messages via the web site.

A subscriber may call into the network and choose to make a new diary entry. When he does so, the system asks the subscriber to start recording and when done, exit the system. For example, John Doe meets somebody and that person gives John his name and telephone number. John does not have a pen and paper and does not have PDA. After the person walks away, John calls into the network and makes a new diary entry. John speaks into the phone all of the information he wants to remember then hangs up.

John may then go back and play the information through either the phone or the web. Any previous entry may made available so long as it does not exceed a predetermined limit of messages and hasn't been deleted previously. On the telephone, this is done by going through a list of all diary entries and playing each one in succession or skipping over certain messages. On the web, the subscriber can choose amongst diary entries and by selecting one receives a WAV file that he can play on his computer. Specifically, John, upon arriving at his office, calls into the network and chooses to play his diary entries. John finds the message from before about the person's contact information and records this information into the computer. John may then delete this voice diary information or save it for later access via phone or web. Subscribers can, thus, with multiple messages, browse through the various diary entries and choose actions with respect to the various diary entries. Suppose John Doe has a busy day at a convention and has many thoughts recorded for himself, such as "try out new software product by Microstrategy" and "read new reference book on XML." The next day, John may then call into the network, go through the diary entries, and play them one by one. He is able to skip over the ones he does not want to hear and go to previous messages to listen to them again.

Through a web interface, descriptions may be typed in and associated with various diary entries to allow the subscriber to remember what that particular diary entry is about more specifically. For example, suppose John has multiple diary entries, some he desires to keep for posterity and diary entries which are only valid for a short period of time. When he goes to the network web site, he may listen to the various entries and enter descriptions of the entries. This can be used later on so that he can make decisions as to which ones to keep and which ones to delete.

As described in greater detail below, the present invention also relates to a system in which a plurality of different VPages are collected and made available to subscribers of a system to enable them to find information and content about topics and subject matters of which they are interested. To facilitate location of related VPages, each VPage may be assigned a particular VCode which may be displayed in proximity to various items about which the pages relate. Additionally, it is another feature of the present invention to provide a directory of VPages to allow subscribers to locate content and voice codes through a common interface system. As part of this system, the present invention may organize VPages into one or more directories which have categories, subcategories, and further sub-categories as desired to organize the VPages into a fashion that is easy to navigate to find information of interest. The organization of categories and sub-categories may be referred to herein as a topology or other terminology to indicate a hierarchical structure of topics.

Figure 38:
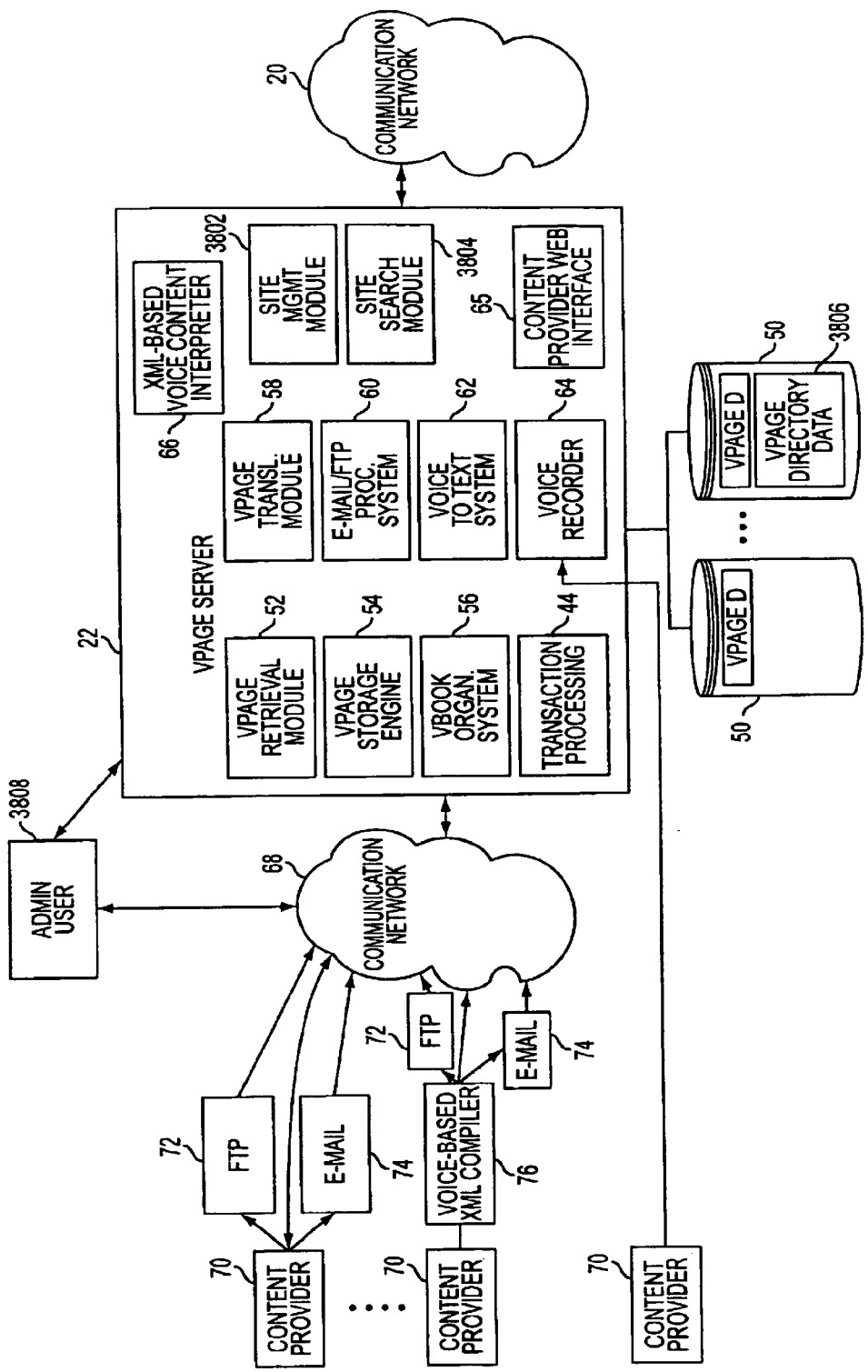
FIG. 38 depicts a system for creating content and organizing VPages into a VPage Director according to an embodiment of the invention.

It should be appreciated that VPages may be categorized in one or more categories, depending on the relevance of a particular category. For example, a particular VPage may relate to both restaurant information and museum information, such as a VPage relating to a museum restaurant. Accordingly, VPage server systems 22 may provide modularity to perform and enable content providers to select the categories in which their VPages are to be placed through a VPage site management module 3802 as depicted in FIG. 38. FIG. 38 is similar to FIG. 3 with the addition of site management module 3802, site search module 3804, and connection to the VPage server and through communication network 68 by an administrative user 3808, and the addition of VPage directory data 3806 contained in database systems 50. Site management module 3802 enables content providers to select the categories in which their VPages are to be placed. Site search module 3804 provides functionality to enable the search for VPages based on key words or other more specific parameters as described below.

It should be appreciated that in addition to content providers, administrative level users 3808 may connect to VPage server systems 22 to organize VPages into a directory. For example, content providers may contact an administration level user to request placement of a VPage into certain categories, and the administration user 3808 may perform that functionality on behalf of the content provider. In addition, as described below, placement of VPages in certain categories and for certain key words may be based on a fee by the VNAP system 12. Accordingly, if a fee is not paid, an administration level user 3808 may reorganize the VPage directory to remove VPages for which fees have not been paid. The fee arrangements with respect to placement of VPages in the directory and in association with key words is described in detail below.

Figure 39:
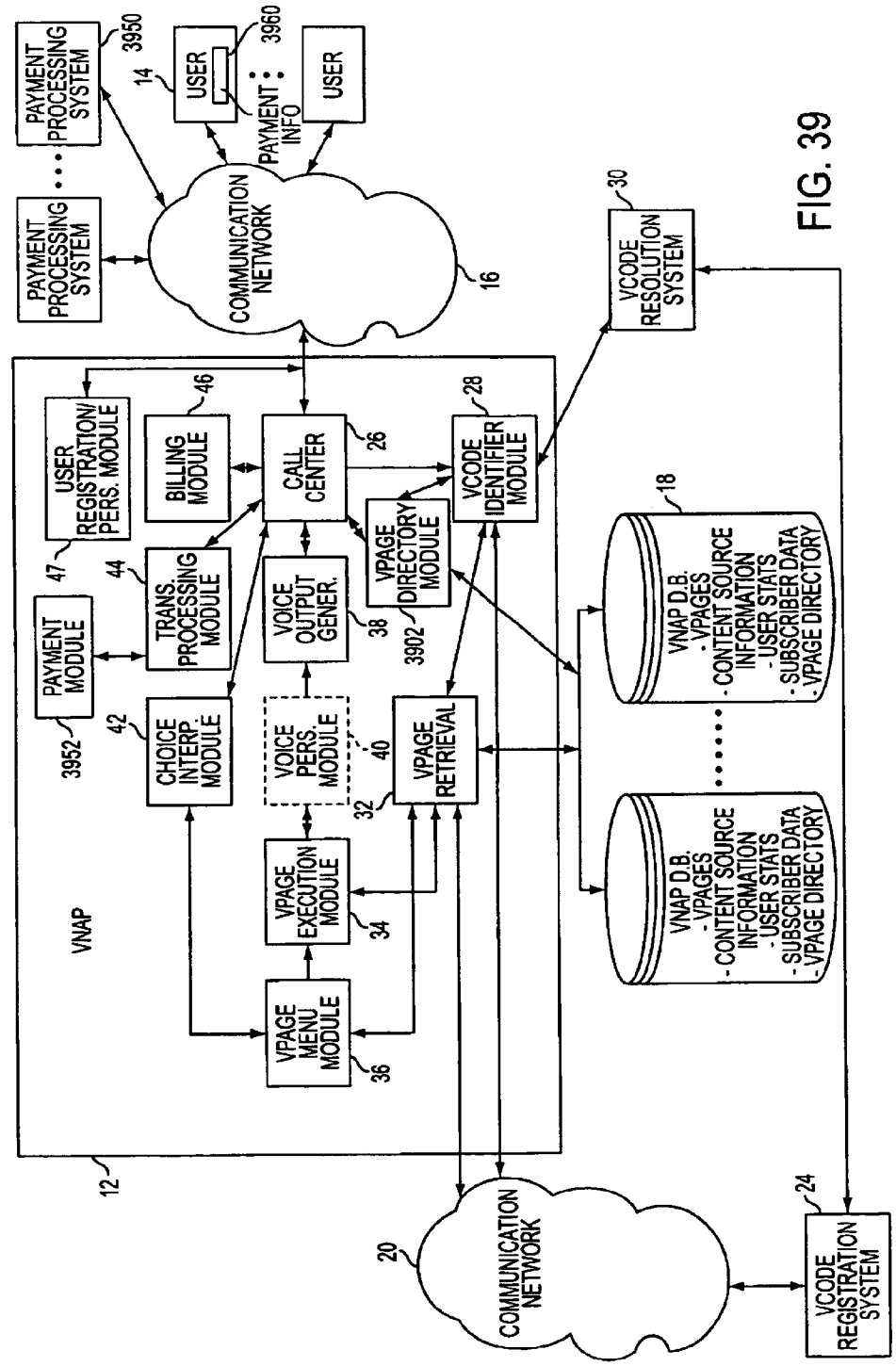
FIG. 39 depicts a VNAP architecture including functionality for processing VPage directory requests according to an embodiment of the invention.

In addition, VNAP 12 may be provided with a VPage directory module 3902 as shown in FIG. 39. VPage directory data may also be contained in database 18 which is accessible by the VPage directory module. VPage directory module 3902 is responsible for processing requests by subscribers to search for or access contents within the VPage directory to enable subscribers to identify VPages corresponding to topics or subjects of interest to them.

Figure 31:
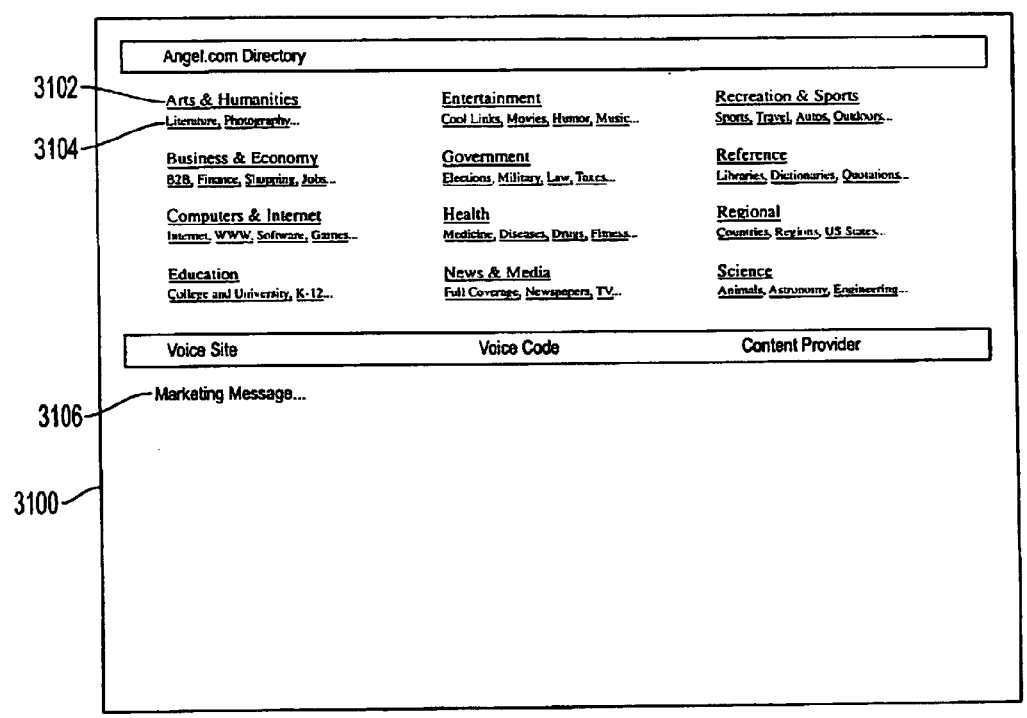
FIG. 31 depicts a view of a VPage/VBook directory according to an embodiment of the present invention.

To enable content providers to organize their VPages, a content provider interface system may be provided via the web or telephone. An embodiment of a web based interface is depicted in FIG. 31 is provided by site management module 3802. As shown in FIG. 31, an interface 3100 may comprise a listing of a plurality of main topics 3102, with sub-topics 3104 displayed below that. Uses of hierarchy of topics within Internet environments is well known and the various combinations of these are hereby incorporated by reference as useable within the system to organize VPages. A marketing message or other information may be provided on 3106 until such time as the VPage content provider selects one of the topics or sub-topics.

Figure 32:
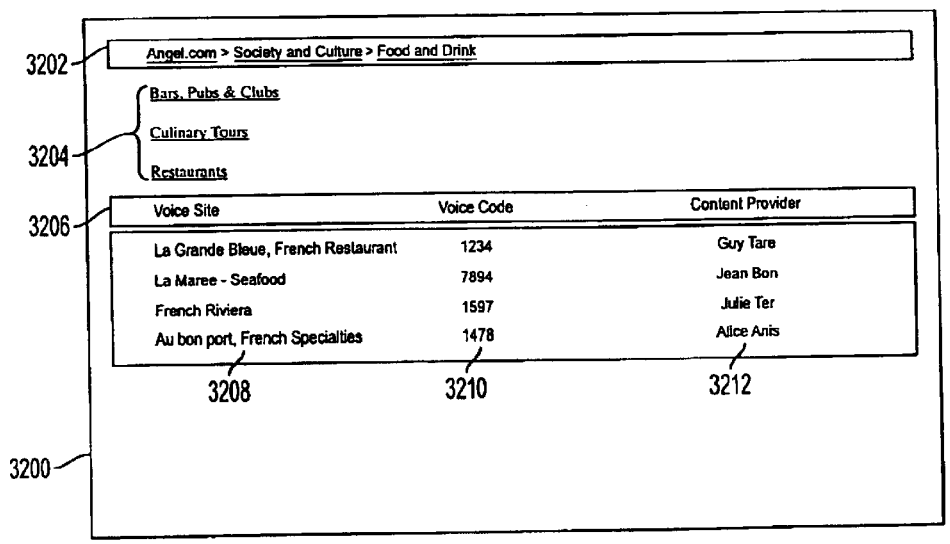
FIG. 32 depicts a view of a category listing generated form a VBook directory according to an embodiment of the present invention.

As shown in FIG. 32, upon selecting a topic and sub-topic listings of further subtopics as shown in 3204 in FIG. 32, a heading 3202 is provided that allows the content provider to navigate back or further through the topology. A VSite heading section 3206 provides information for the VPages from the subject including the VSite name in section 3208, the VCode in section 3210, and the name of the content provider in section 3212.

It should be appreciated that whereas the interfaces shown in FIGS. 31 and 32 comprise directory interfaces for use in a web embodiment, through the use of text to speech conversion, these or similar directories may be presented to subscribers over the web and via telephone to read out to the subscriber the contents of the directory. For example, as shown in FIG. 32, upon speaking or saying information to navigate down to the list of restaurants within the society and culture and food and drink category and subcategory, VPage directory module 3902 may pass information through the various components of VNAP 12 to speak choices for the various restaurants, VCodes and content providers depicted in FIG. 32. In one embodiment, the choices may be also presented with a numeric entry to enable the subscriber to select that VPage through the depressing of the number corresponding to it, or may simply allow the subscriber to speak the name or VCode to transfer to that particular VPage.

Figure 36:
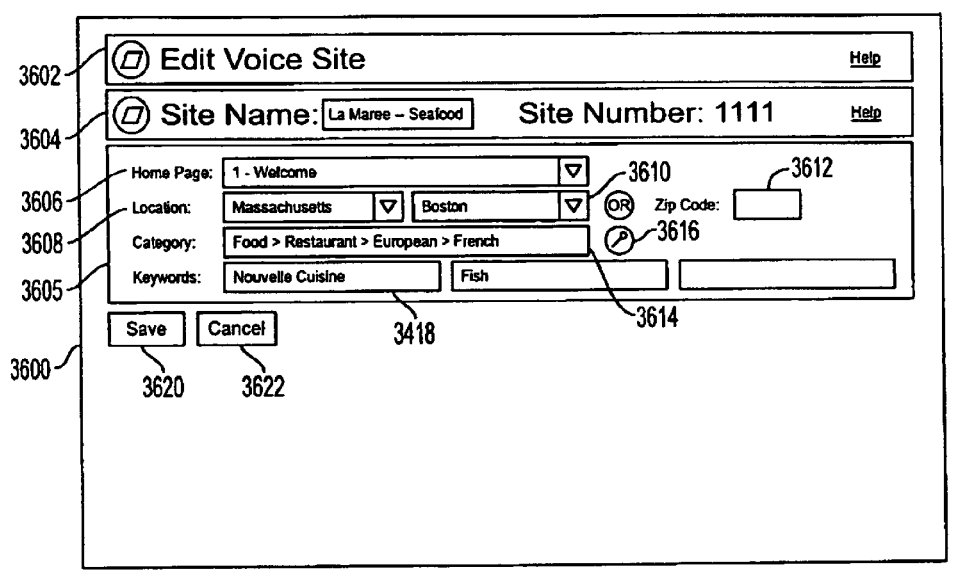
FIG. 36 depicts a VPage/VBook site placement interface according to an embodiment of the present invention.
Figure 37:
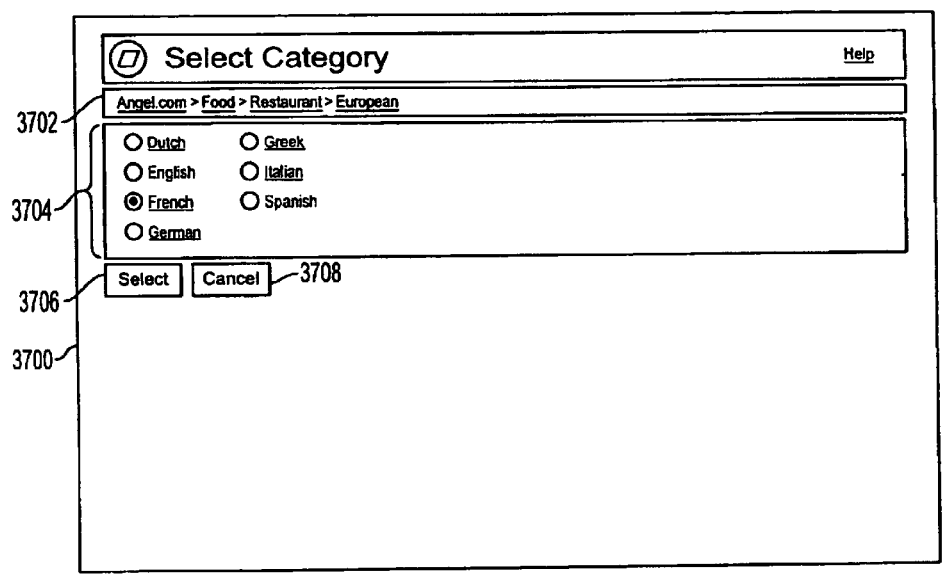
FIG. 37 depicts a category selection view for a VPage/VBook site placement interface according to an embodiment of the present invention.

To enable the content provider to organize VPages that they have created, interface 2000 as shown in FIG. 20 may also include the functionality to transfer to a VSite directory interface such as VSite directory interface 3600 depicted in FIG. 36. Interface 3600 may comprise a portion or all of the interface page depicted within a graphical user interface system. This interface may comprise a heading 3602 indicating that a VSite is being edited, a VSite identifier 3604 to enable the content provider to select the site name and site number to be edited, and a VPage specification portion 3605 that enables the content provider to select information about the particular site for purposes of categorization. Specifically, a home page selection portion 3606 may enable the content provider to select the home page for a particular site when a subscriber enters that particular VSite. Location modules 3608, 3610, and 3612 enable the content provider to select city, state, zip code or other location specific information about the content of the VSite. Additionally, the user may input the category or categories for which this VSite should be listed. To assist the content provider in determining the categories, a category selection module 3616 may be provided whereupon selection of the module, a separate category selection interface 3700 as shown in FIG. 37 may be presented to enable the content provider to navigate from the available categories and select the one or more categories to which the VSite is to be associated. Additionally, interface 3600 may provide for entry of one or more key words through key entry portions 3618. When the content provider is satisfied with the information provided, they may save the information through button 3620 or may cancel through button 3622.

It should also be appreciated that individual VPages within a VSite may be specifically categorized with separate key words and location information. For example, one VSite may relate to various golf courses whereas each VPage may relate to specific golf courses at different regions or different locales and therefore the location information may be specified separately. Accordingly, interface 3600 may provide a mechanism for selecting individual VPages within a VSite or VBook and specifying the information contained in portion 3605 for each different VPage within the VSite. It may be desirable to have a VSite have a default categorization but one or more of the VPages in that VSite have a separate categorization. The content provider, thus, may specify information for the VSite but then specifically select different categorizations and key word information for individual VPages.

Interface 3700 may provide heading information 3702 which enables the content provider to navigate up and down a topology and then selection portions 3704 to enable the content provider to select a particular sub-category within the higher level categories shown in heading 3702. When the content provider is happy with the selections, the user may enter or select button 3706 or if desired, may cancel this through button 3708.

Figure 33:
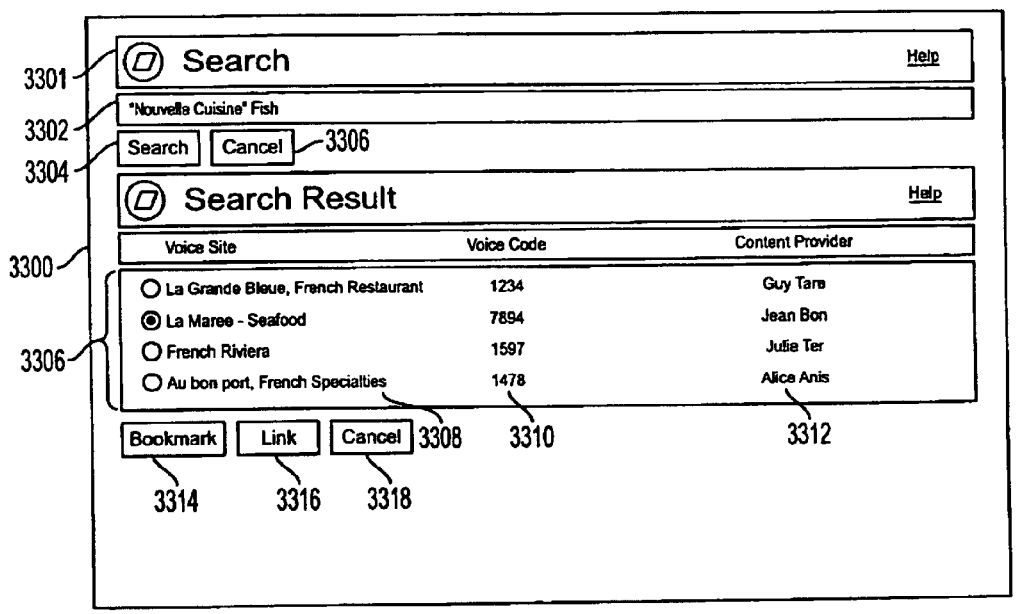
FIG. 33 depicts a view of a search and search result generated from a keyword search of a VPage/VBook directory according to an embodiment of the present invention.

FIG. 33 depicts an embodiment of an interface that may be presented either via Internet or through text to speech conversion to subscribers over the telephone to enable them to search for and locate VPages of interest. In this embodiment, a search heading 3301 indicates that a search is being provided and the text may be entered in portion 3302. Upon inputting text in section 3302, the subscriber may initiate a search though search button 3304, or may cancel the search through cancel button 3306. The results of the search may then be displayed in portion 3306 indicating the VSite name, VCode, and content provider that fall within or meet the terms of the key words specified. The name may be specified in the section 3308, the VCode in section 3310, and the content provider in section 3312.

It is also possible for subscribers to have bookmarked VPages or VSites that they desire to go to and may be easily accessible through the input of specific key words or numeric sequences. Bookmark module 3314 may be provided to add a selected VPage to the subscriber's bookmark list. In addition, link 3316 may be provided whereupon selection by the subscriber, the selected VPage is activated and activated for that particular subscriber. Cancel button 3318 may be provided to cancel the search and return to the previous menu. It should be appreciated that these buttons may also be activated through functionality and function keys as options within an active VPage as described above.

Figure 34:
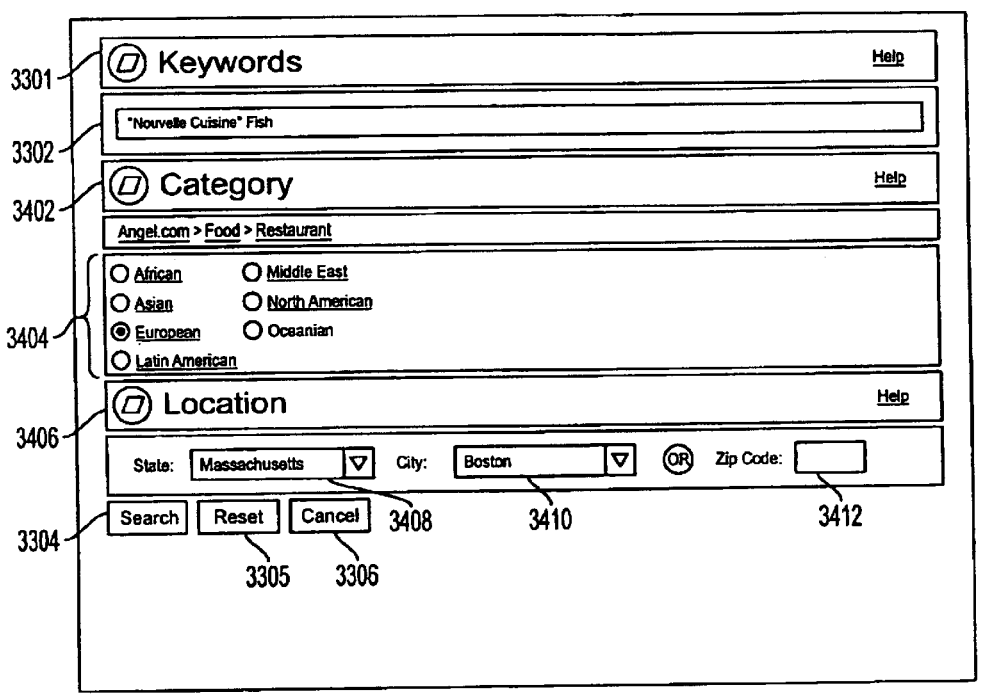
FIG. 34 depicts a view of a detailed search for VPages in a VPage/VBook directory according to an embodiment of the present invention.
Figure 35:
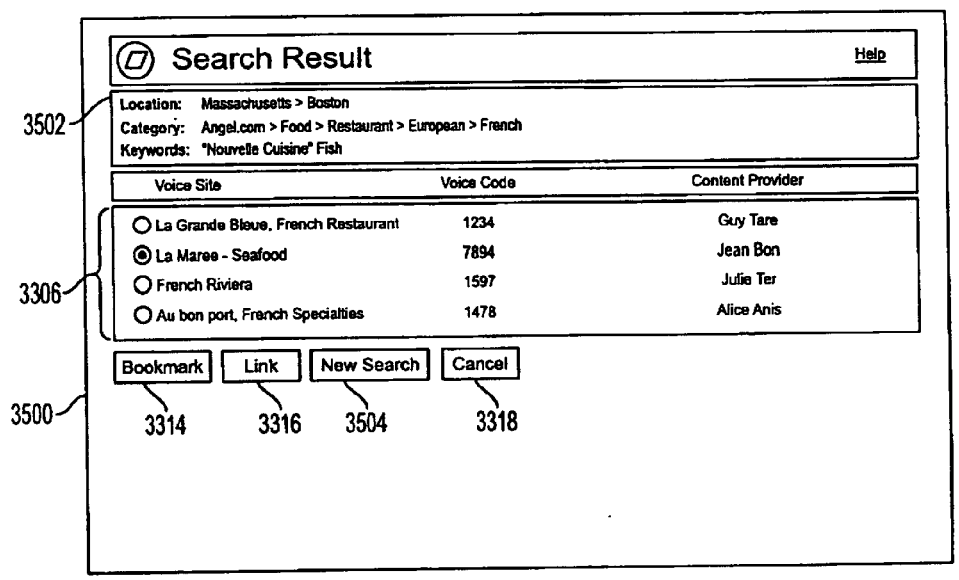
FIG. 35 depicts a view of a search result generated from a detailed search for VPages in a VPage/VBook directory according to an embodiment of the present invention.

It may also be desirable to provide a more detailed searching mechanism that includes more specific parameters, in addition to key words. An embodiment of a more specific search interface is shown in FIG. 34. In this embodiment, the subscriber may also specify categories and key words and locations in which to search. The category heading 3402 may be provided with selectable categories 3404. In addition, a heading for the location 3406 may be provided with drop down or other selectable boxes to select state information in section 3408, city information in section 3410, and/or zip code information in section 3412. A reset button 3305 may also be provided to enable the subscriber to clear the current entries to start afresh. Again, it should be appreciated that the depicted interface may also be realized through the use of text to speech conversion of the various fields within this interface to enable a subscriber to search for and identify VPages through a telephone based module in addition to the web based module embodiment shown in FIGS. 33 and 34. The results from the search of FIG. 34 may be presented in the second interface, such as 3500 in FIG. 35. The specific categories input are shown in heading 3502, with the search results shown in section 3306. Similarly, a new search button 3504 may be provided to enable the subscriber to engage in a second search.

Through the functionality described above, content providers are able to choose a location, one or more categories, and key words for their various VPages. The content provider's VPages are then listed in the results of subsequent searches on those parameters initiated by subscribers. For example, a real estate agent may create a VPage that showcases houses available in the Vienna, Virginia area and want to publish this collection of VPages. The real estate engine may then select Vienna and Virginia and/or the zip code for the various homes in the category real estate via the category selection interface and also select key words house, sell and rent. A subsequent search on those parameters then generates the real estate agent's VPages for subscribers.

It should also be appreciated that functionality may be provided to enable administration level users to manage the directory of VPages to create new categories, rename categories, move categories, and delete categories.

In addition, the VSite directory module may provide functionality that indicates VPages that have been added since the particular subscriber's last visit or since a predetermined period of time and/or select most popular VPages. A database system may be maintained that keeps track of the most requested VPages to retrieve for the most popular and the most popular may be specified by category, sub-category, etc. The most recently added VPages may be based on a predetermined period of time since the subscriber's last visit or may be within a predetermined period of time, such as three days. A specific embodiment of how the system may be operable is described below.

For example, suppose a caller initiates a call to Angel.com, a specific embodiment of the systems above. The caller may then say directory, or go to the global commands menu by pressing the zero button on the caller's telephone. From the global commands menu, a choice may be presented to the caller to go to the directory. The system may then request that the caller identify the category that the caller would like to browse, and after a small pause, the system plays a file where a human voice reads out all of the categories at the top level of the directory. Before, during, and after the categories have been read out, the system listens for user response. The response should be matched against a grammar defined as the set of all sub-categories in the present category. If the caller wants to browse a category, he may simply say its name, or input a numeric input indicated as corresponding to that sub-category. If the caller wishes to be told what sites are available in the current category, the caller may say "sites" or some other indicating word. Upon input of sites, the caller is forwarded to a page describing all of the available sites. For example, the VPages within a particular category may be read out to the following passage: "Five sites were found. The Redskins' official site by Brad Johnson, choose your favorite Redskin by Daryl Green, . . . etc."

While a site is being read, and during the small pause that follows, the site being read is the current site. The caller can say visit to be transferred to that site. If he says back, he should be returned to the directory to the point where the caller left off. The caller can say description to hear current site description information. If the caller in the sites page says categories, the caller should be forwarded to the category page where the site resides. If a caller says up in either the sites or category page, the caller may be taken to the parent category of the current category or to the parent category of the category to which the current site belongs. If the current category is the top category, then the up command may hold the caller in the current category.

These commands for browsing also may have a DTMF or numeric input equivalent. Subscribers should also be able to access categories by saying the directory tree down to that particular category, such as sports, tennis, Wimbledon. Subscribers may also find categories by key words by saying the key words in which he is interested. The system then performs a search on these key words and returns only the categories that match. The categories are read out to the subscriber and a small pause between categories may be presented whereby the subscriber can select one of the categories by saying the term visit. The system also enables subscribers to hear sites related to the current site. Suppose a caller is browsing any page on a particular VSite and desires to know what other similar sites are available on the network. As the user is browsing, the user can say go to related sites or press an equivalent key in the DTMF system.

In response, the directory module takes the caller to the category in which the site is categorized. The category information is then read to the user starting with the sites and the caller may then say categories to go to the listing of sub-categories for the particular category.

A content manager or administrative user may also like to modify the grammar of a category which is the set of key words identifying the available sub-categories. A content manager may log into the network, access a view of the directory that would contain the same elements as the standard user view plus a few extra controls. After browsing to a category, a list of the direct sub-categories appears. Alongside each category, a text box appears where a content manager can edit corresponding key words. The content manager may also like to modify the sound file associated with a category. The sound file may be used to read to a caller what categories or subcategories are available at the present category. To do so, a content manager may log into the network and access a view which contains a list of the categories to be edited. Content manager may press an upload button to upload a sound file that contains the audio to be read out indicting the contents of that particular category. Also, text to speech conversion can be provided to read out categories and sub-categories instead of using sound files if desired by the system.

As described in detail below, the system enables transactions to be processed through various VPages as well. As part of the system, a user may be prompted to provide information necessary to complete a transaction, such as a payment device. Given the need for security and on-line and over the phone transactions, the system may provide for the incorporation of various payment mechanisms within various VPages to enable subscribers to pay to complete transactions with the particular VPages or VSites through a third party payment processing means without having to provide credit card information or other specific payment identification. As such, the user systems 14 as shown in FIG. 39 may store payment information 3960. The payment module 3952 may be provided that cooperates with transaction processing module 44. Payment processing systems 3950 may be accessible over communications network 16 by the VNAP 12. In particular, upon reaching a particular VPage that requires payment information to complete a transaction, a subscriber 14, instead of providing credit card, electronic check or other on-line payment identifiers, may provide a specific unique identifier that is known by the payment processing mechanism. Payment module 3952 may then access payment processing system 3950 to obtain the payment information. Essentially, this provides a third-party intermediary to validate and verify payment information to minimize security problems.

Further, by allowing the user to provide less than all of the fields necessary to complete a transaction and storing the remaining fields of information at the payment processing system 3950, the user never transmits all of the information needed to complete the transaction. Therefore, for example, the credit card number is not transmitted by the user over the telephone to the VPage, but rather a username and password are provided. This minimizes opportunities for interception of the credit card information. The payment processing system 3950 may transmit the other fields for the transaction over a secure or private line to the payment module on the VPage system to thus reduce the possibility for interception of that information.

A third-party entity calling itself "Payment Helper" may set up a service to enable subscribers to the VPage network to register their credit card and other information and obtain a response a user name and password. This third-party vendor may also register with VNAP 12 to be authorized to provide payment. When a subscriber reaches a transaction processing module, the VPage may provide the option to pay via Payment Helper, in which case the subscriber is prompted to provide selected information, such as user name and password. As such, credit card information is not transmitted over the communication network in which the subscriber is communicating. The payment module 3952 may make a verification through the communication network to payment processing module 3950 to authorize the subscriber to make that payment. Payment is then made through the third-party payment processing system 3950 to the VPage recipient of the transaction or may be passed through such that VNAP 12 makes the payment and then receives reimbursement from payment processing system 3950. In addition, subscribers may open an account and maintain a balance of fluids with payment processing system 3950 out of which payment is made. Accordingly, no credit card is actually involved in any transaction, but rather funds are withdrawn out of the account maintained by the subscriber with the payment processing service. This embodiment is known as a telephone-system wallet. Other payment systems and method are described below.

One of the improvements provided herein is the provision of a VSite and VPage directory system to enable subscribers to locate VPages of interest. As part of the directory, the VNAP system 12 may charge a fee for placement of VPages or VSites within the directory. The fee may be a flat fee, may be based on a percentage of visitors to the network that select that particular VPage, may be based on location of the particular VPage within the category as presented, may be based on the type and number of keywords with which it is associated, may be a bid for placement scheme in which the greater amount that a particular VPage provider pays the higher the page will be placed in the VPage directory, or any combination of these and other fee arrangements. In another embodiment, content providers may be charged per link through from the content directory to their VPage. It is also possible that an exchange for being listed on the content directory, any links that result in transactions by the subscriber result in payment by the content provider of a percentage of the revenue to the content directory service. Accordingly, it is possible for the content directory service to be operated by a third party to encourage increased exposure and revenue generation for all participants in the system.

Figure 41:
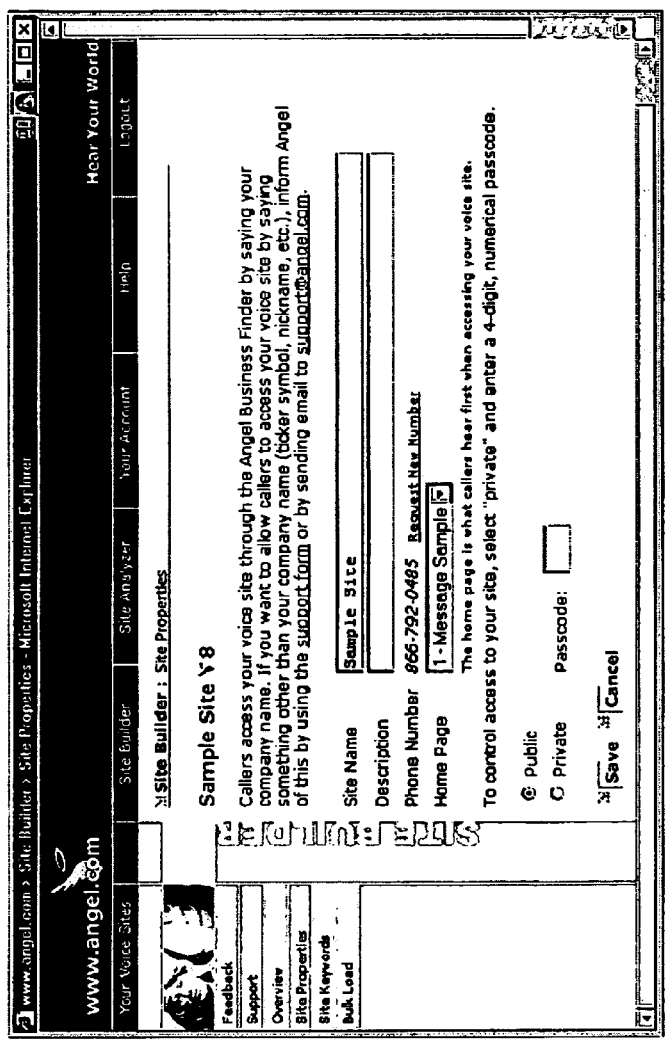
FIG. 41 depicts a view through which a user may specify site properties such as site name according to an embodiment of the present invention.
Figure 42:
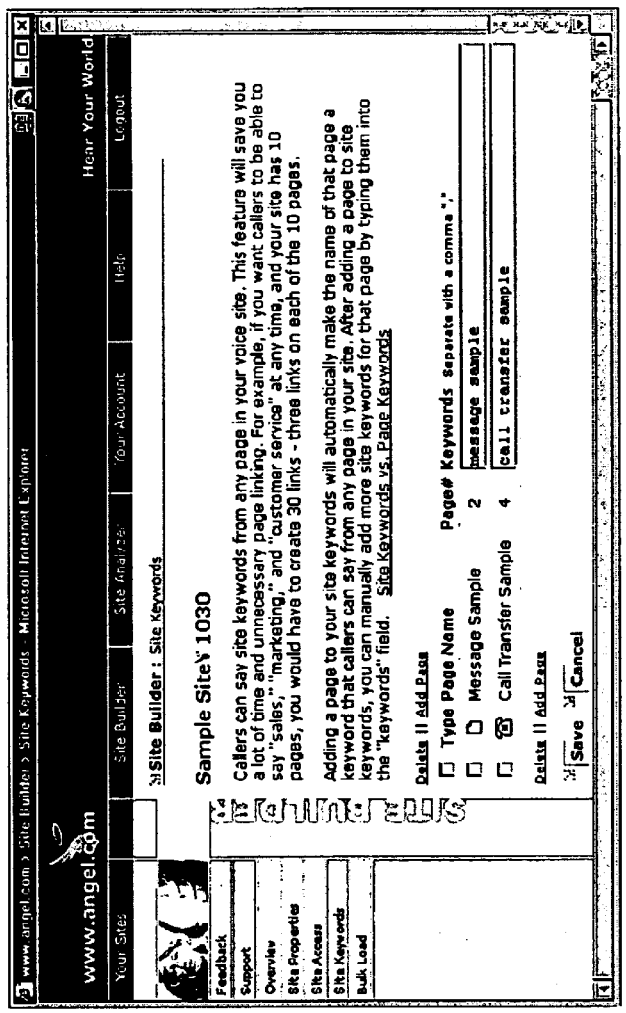
FIG. 42 depicts a view through which a user may specify site keywords for various voice pages in the site according to an embodiment of the present invention.

FIGS. 40–47 illustrate other examples of user interfaces that may be used to provide the functionality described above for creating VPages and managing VPages by a user. FIG. 40 may be used to create a new voice page, message page, question page or call transfer page, delete a voice page, edit a voice page or sort the voice pages by type, page name or page number. FIG. 41 may be used to edit the site name and description, change the home page of a VSite, request a phone number dedicated to a VSite, or toggle the Public/Private property (and define a passcode). FIG. 42 may be used to add site keywords (i.e., associate a voice page with one or several keywords). When a caller says the keyword within the VSite, the user will be automatically taken to the VPage specified. Through this page, the user may also delete a site keyword.

Figure 43:
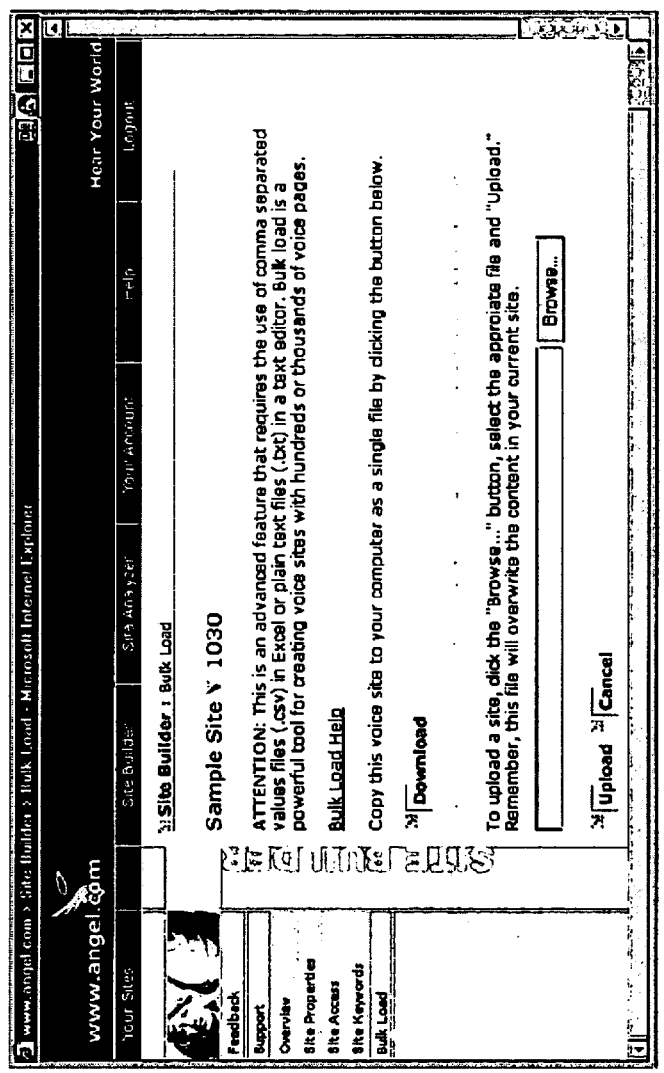
FIG. 43 depicts a view through which a user may bulk load content according to an embodiment of the present invention.
Figure 44:
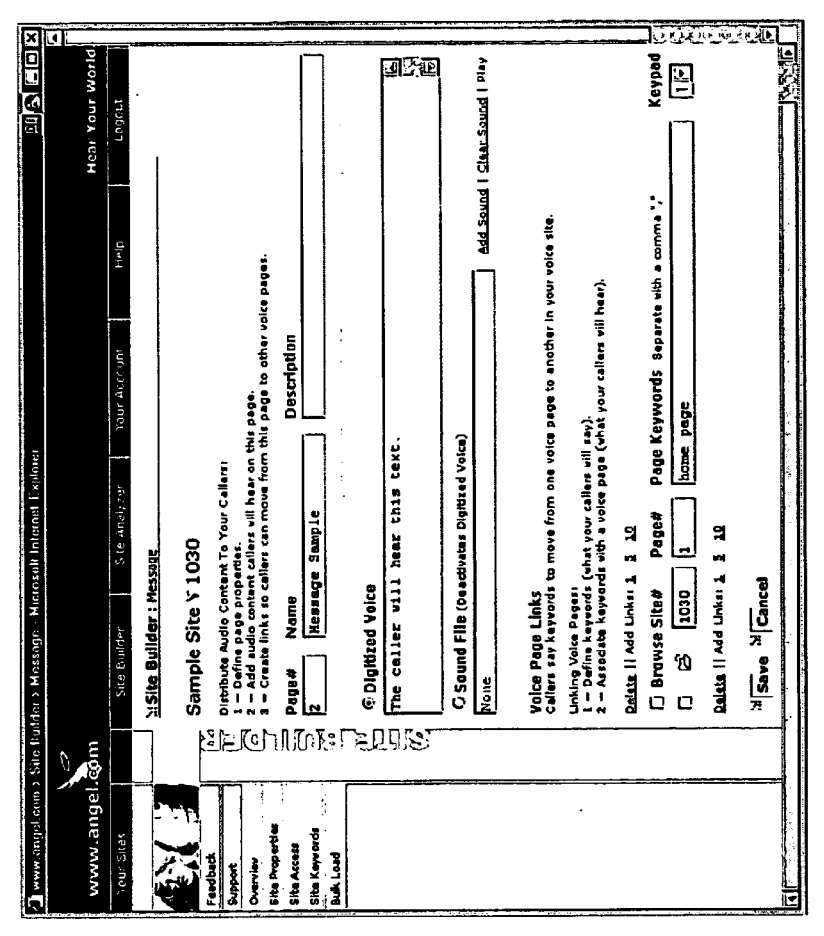

FIG. 43 may be used to download one of a user's voice sites in a .CSV file or upload the structure and content of a VSite from a .CSV file. FIG. 44 may be used to create content for a message type VPage, including updating the page number, page name and page description, updating the content of the page, modifying the digitized voice text (read by a text-to-speech engine to the caller), load another sound file, delete the current sound file, record a new message over the telephone, add links, delete links, and update links with new site number, page number and/or page keyword information.

Figure 45:
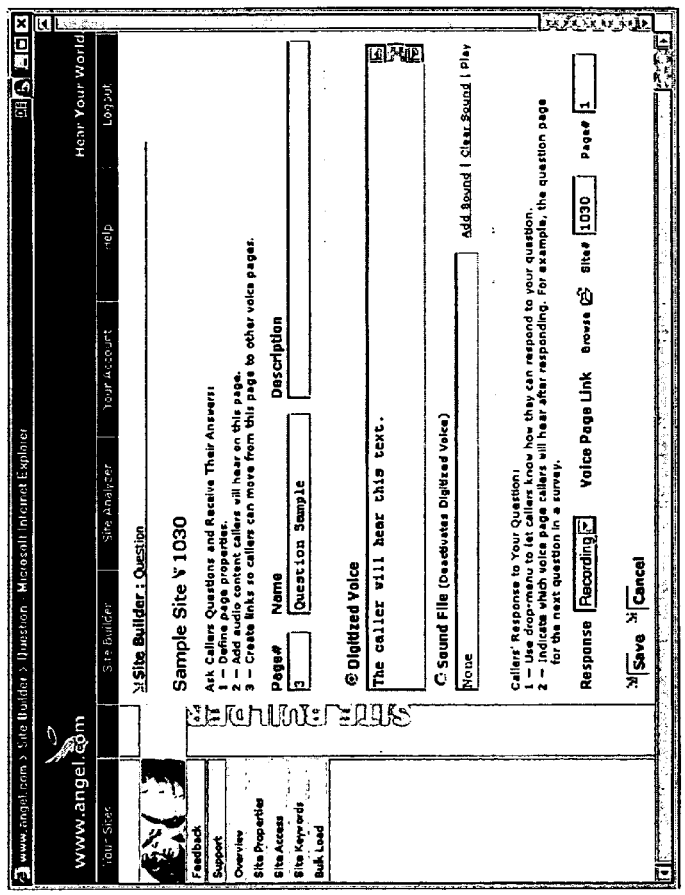
FIG. 45 depicts a view through which a user may create a question voice page according to an embodiment of the present invention.

FIG. 45 may be used to create a question type VPage, including updating the page number, page name and page description, updating the content of the page, modifying the digitized voice text, load another sound file, delete the current sound file, record a new message, select the type of response (recording, number, yes/no, date, time or currency), or define the automatic voice page link.

Figure 46:
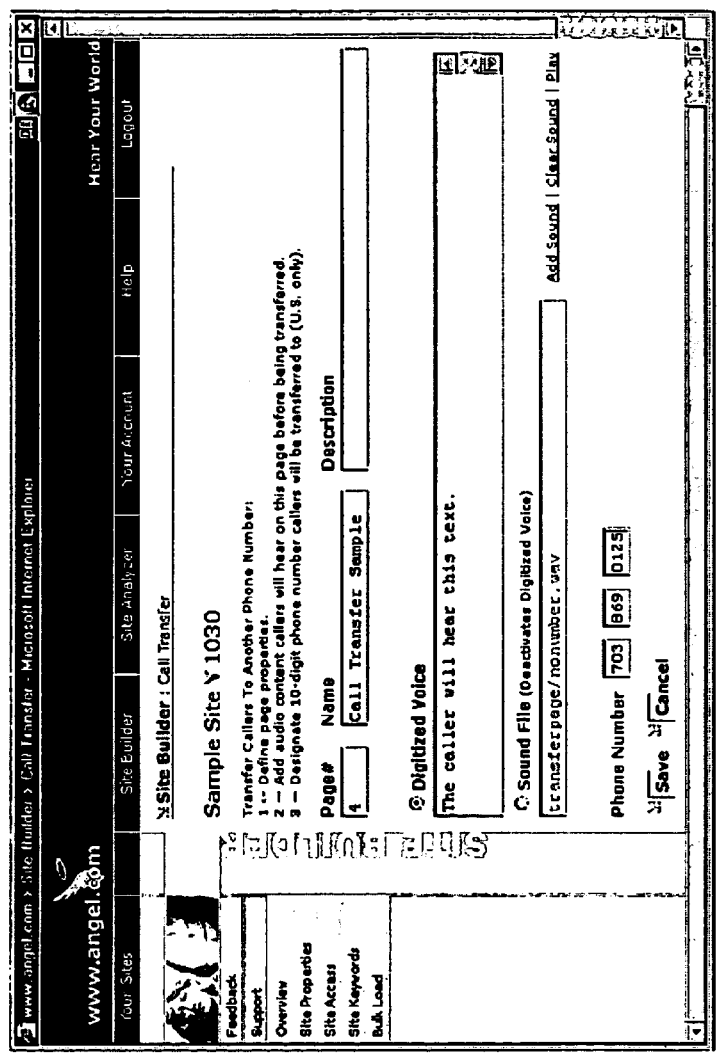
FIG. 46 depicts a view through which a user may create a call transfer voice page according to an embodiment of the present invention.

FIG. 46 may be used to create a call transfer VPage including updating the page number, page name and page description, updating the content of the page, modifying the digitized voice text, loading another sound file, deleting the current sound file, or defining the phone number to which the caller is to be transferred.

Figure 47:
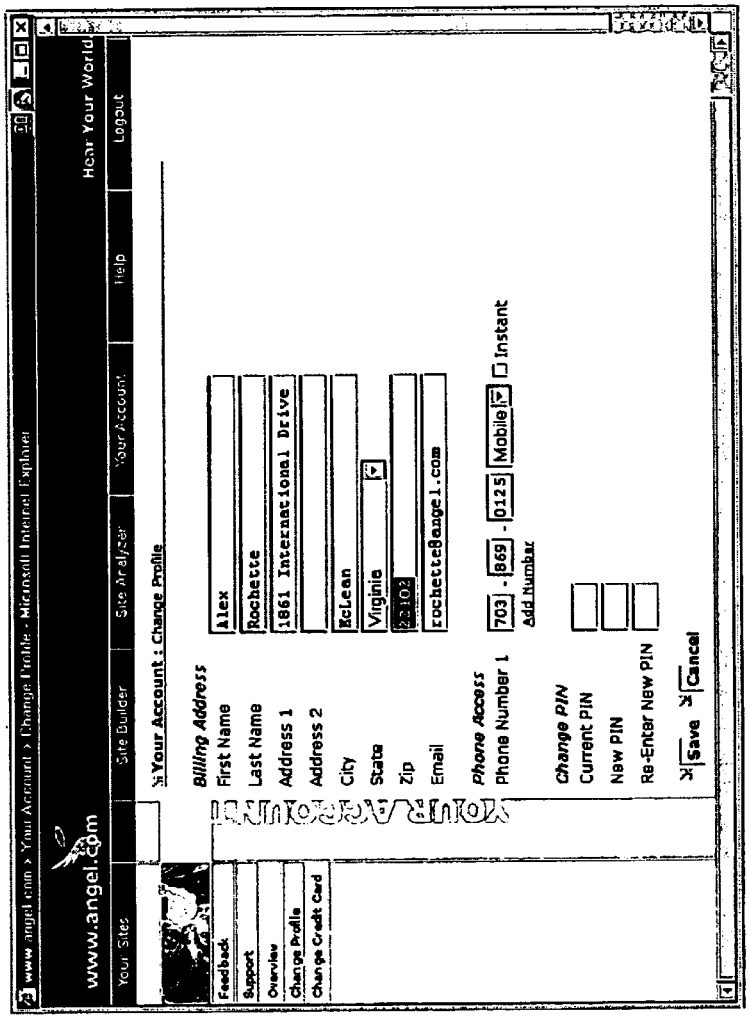
FIG. 47 depicts a view through which a user may change the user's profile on the system according to an embodiment of the present invention.

FIG. 47 may be used to update user profile information including name, billing address, email, phone access, and PIN, add phone numbers and select the instant property for each phone number.

These systems and methods described above may be used in a VCode system that provides access to voice content by entry of a VCode or VName. In one embodiment, a VCode comprises a VBook identifier portion and a VPage identifier portion separated by the asterisk and concluded by the pound character, such as 76484766426*2777223#.

VCodes may also be specified with alphanumeric strings, using the standard telephone system for mapping letters to digits (A, B, and C map to the number 2, D, E, F to 3, etc.). Thus the above VCode could be specified as:

SMITHSONIAN*AIRSPACE#

In this embodiment, the first field of a VCode—the VBook identifier—refers to the VBook. In this example, the VBook has VBook identifier 6484766426/SMITHSONIAN.

The second field of a VCode—the VPage identifier—refers to the specific VPage on the VBook. It may be a single numeric string, such as this above example of 24777223/AIRSPACE. It may also be a series of numeric strings—including even the empty string. Thus a VCode could resemble any of the following:

SMITHSONIAN#

SMITHSONIAN*AIRSPACE#

SMITHSONIAN*AIRSPACE*APOLLO13#

SMITHSONIAN*AIRSPACE*APOLLO13*STORE#

According to one embodiment of the invention, a VCode system 10 is provided. The VCode system 10 comprises one or more VNAPs 12 connectable to a plurality of users 14 over a communications network 16. Each VNAP 12 may comprise a plurality of VNAP databases 18. Additionally, VNAP 12 may connect over a communications network 20 to one or more VPage server systems 22 and a VCode registration system 24. Through VCode system 10, users 14 connect to the VNAP 12 to receive content corresponding to one or more selected VCodes. User 14 may utilize any type and combination of equipment that enables input of voice or other content and receipt of voice content, including telephones, wireless phones, personal digital assistants, and other devices. Communications network 16 may comprise a LAN, WAN, telephone network, a wireless phone network, a digital network, a cable network, a satellite communications network, a PCS network, the Internet, or other networks or combinations of networks that enable communications between users and a VNAP. VNAP 12 may deliver the content out of VNAP databases 18 or, based on the VCode, provide content from one or more of the VPage server systems 22.

VNAP database 18 may comprise any database capable of storing text, sound files or other content and may reside either locally within a VNAP 12 or externally over a connection of networks. VNAP database 18 may store content provider/source information to be able to track who is responsible for which VPages. That information may include name, address, contact information, listings of all VPages and Vbooks provided, VCodes corresponding thereto, account information for that provider and other such information. VNAP database 18 may also store user statistics in order to the VNAP to track usages by different users. Those statistics may comprise user identification, number of VPages accesses, identity of all VPages accessed, time of each access, transactions undertaken by that user, amount of transactions undertaken and all other information a VNAP or content provider may desire to acquire to better leverage and service its customers. Communications network 20 may comprise any suitable network similar to network 16 and may comprise the same network as network 16. VPage server systems 22 may comprise systems for retrieving one or more pages of content based on the VCodes or other input entered by the user. VCode registration system 24 may comprise a system for assigning VCodes to VPages.

According to one embodiment, VCode registration system 24 comprises a database system that indexes VPages by VCode, which as described above, comprises a unique combination of VBook identifier and VPage identifier portions. The VNAP system retrieves information from VCode registration system 24 to retrieve VPages. Each entry in the VCode registration system stores the source location of the content (e.g., URL, disk storage location, database, IP address, network path, etc.), permissions on who is allowed to view content, description of the voice content, billing information, resale information and the format of the content (e.g., TML, VoiceXML, WML). Other fields (metadata elements) may be provided that describe the content of the Vpage. These metadata elements can assist in indexing content by subject, or in conjunction with search engines. That metadata may include a description of the VPage and keywords to aid in using a search engine to locate the VPage.

For each VBook, a main VPage may be stored. Therefore, when a subscriber enters only the VBook identifier, then the main VPage is retrieved and the pages with different VPage identifiers for that VBook may be cached because it is likely that the subscriber may be accessing them. Therefore, the subscriber may enter the VBook identifier only once and may access all VPages in that VBook by entering only the VPage identifier portion. When the subscriber moves to another VBook, the cache may be cleared according to one embodiment.

According to another embodiment, it may be desired to provide multiple VCodes for the same VPage. For example, different content providers may actually "sell" the same VPage and therefore desire to have a separate VCode for that VPage. To handle VCode aliasing, each VPage may be assigned a VPage ID. The relationship between VPage ID and corresponding VPage may be one-to-one (whereas the VCode-to-VPage relationship may be many to one). In this embodiment, the VCode registration system 24 comprises a VPage database indexed by VPage ID and a VCode lookup table that indexes VCodes to VPage IDs.

Also, the VCode registration system 24 may utilize the two-portion VCode structure in indexing the database. In this case, VPage IDs are replaced with Book VPage IDs and Indicator VPage IDs. In this situation, the relationships VBook:Book VPage ID and VPage Indicator:Indicator VPage ID are each "one to many." Lookup tables provide mapping of these values. A main lookup table provides an index by a primary key comprising at least the Book VPage ID and Indicator VPage ID. In this case, the VBook may be independently aliased from the VPage Indicator (and the VPage Indicator independently of the VBook). This embodiment allows for a voice content provider to have multiple VBooks without having to explicitly alias each VCode (or multiple VPage Indicators without having to explicitly alias each VCode).

In the case of VNames, ASR-specific grammar information or possibly a specification of the VCode's location in a hierarchical structure may be used to index VNames to VCodes/VPage IDs.

In one embodiment, the VBook may be assigned by VCode registration system 24 and the Voice content provider is free to choose any VPage identifier naming scheme that satisfies the above format. This gives voice content providers the ability to structure their available voice content in their own hierarchical manner.

A voice content provider (VCP) company may want a number of VCode prefixes to map to its site. For instance the Smithsonian Institution may want the above SMITHSONIAN (easy-to-remember) as well as the easy-to-type 44SMI. In this case, multiple numeric strings (76484766426 and 44765) would map to the same voice content provider in VCode registration system 24. Further, a VCP may choose to have a number of VPage Indicator values map to the same VPage on its site. Thus SMITHSONIAN*AIRSPACE# and SMITHSONIAN*AIR# might both map to the same content.

Figure 7:
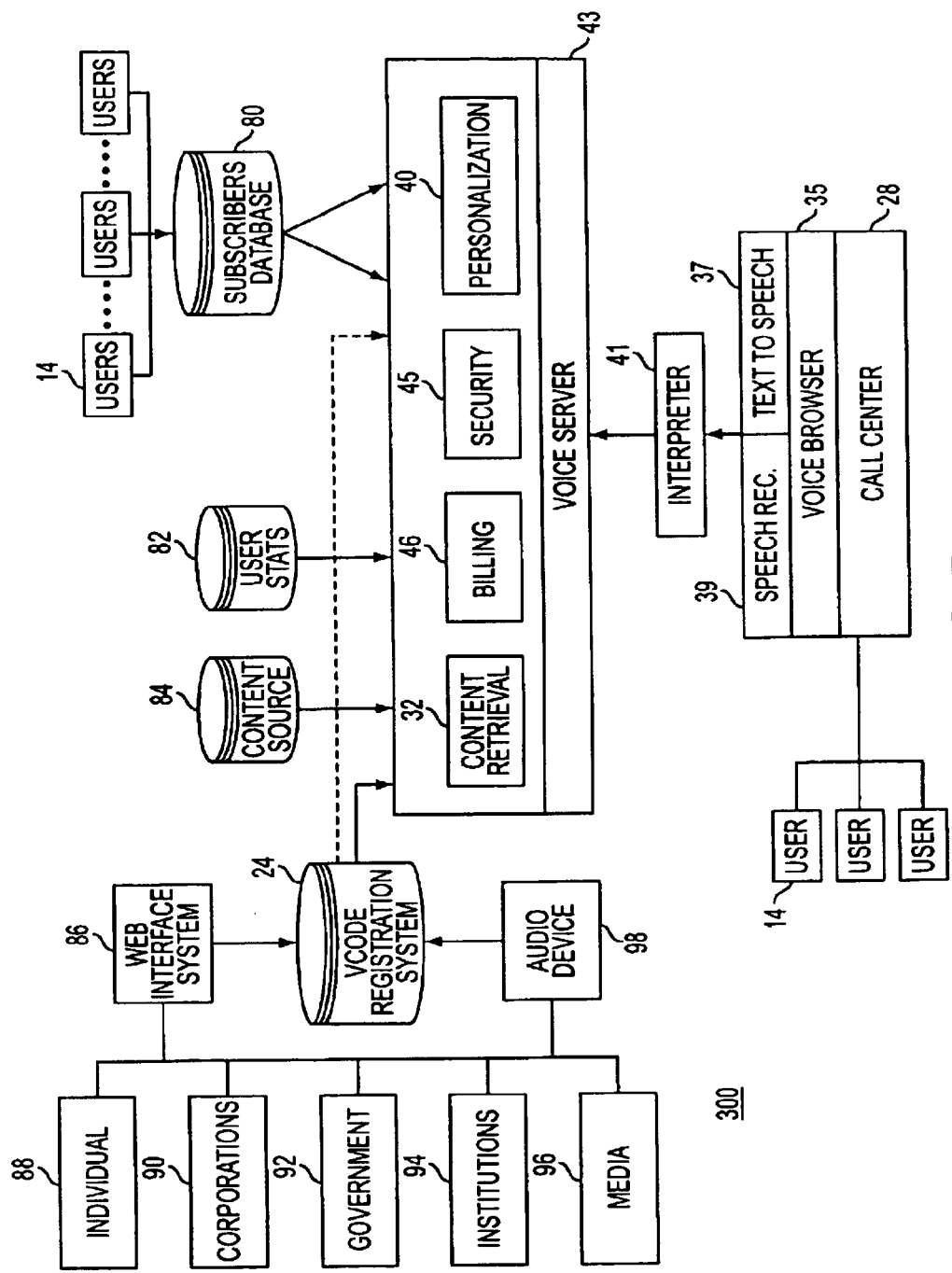
FIG. 7 depicts a schematic diagram of a VCode system according to another embodiment of the present invention.

A more detailed description of the contents of VNAP 12 may be understood with reference to FIG. 2 and FIG. 7. First, a user registers with the VNAP and accordingly a VNAP registration/subscription module 47 is provided. VNAP 12 may also comprise a user pre-registration and personalization module 47 that enables users to contact VNAP and establish an account for billing and personalization purposes. To pre-register, the user may input name, address, contact information, payment mechanism information, preferences, demographic information, language, etc. Other types of information requested during registration may be input and stored as well. The VNAP may assign the user with a registration number that may be used to access VPages over the VNAP 12. Further, the user may personalize how services are to be billed, may input payment information for use in transaction processing, and may select personalization features for delivery of voice content, including specification of information for use by voice personalization module 40. User preregistration and personalization module 47 may also be known as a subscription module 47 herein and these terms are meant to be interchangeable.

Figure 8:
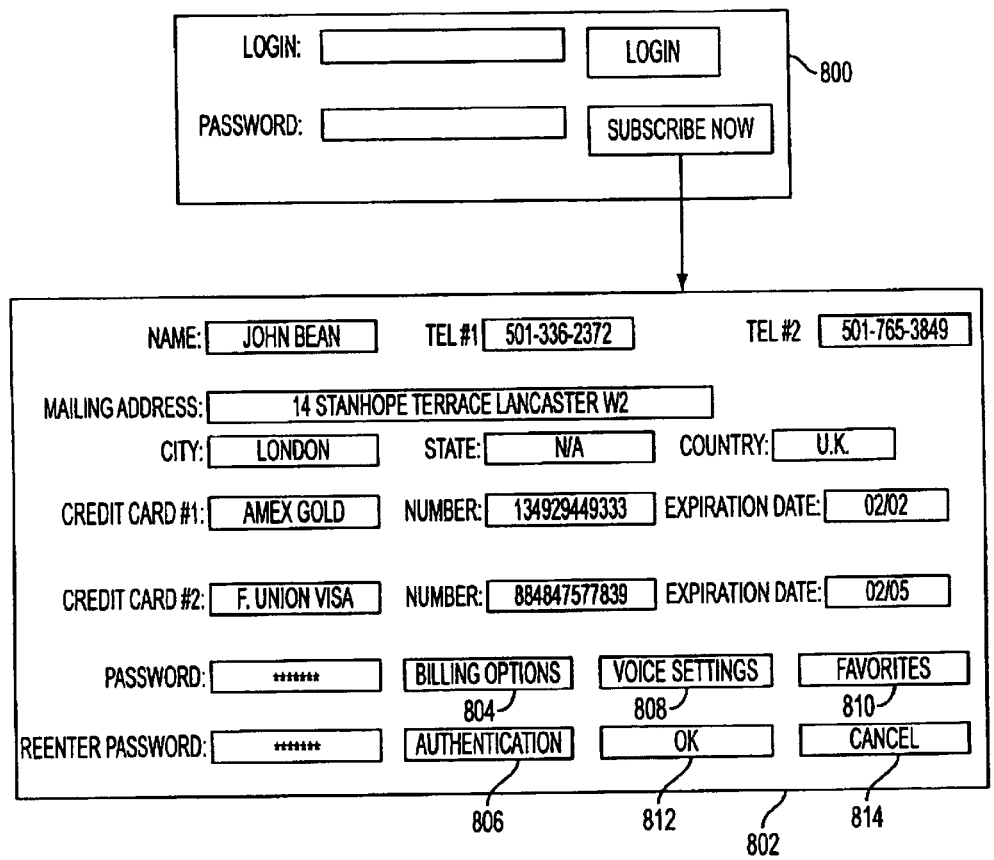
FIG. 8 depicts an example of a subscription graphical user interface according to an embodiment of the present invention.

According to one embodiment of the present invention, subscription module 47 may provide a web subscription interface to enable potential subscribers to connect over the worldwide web in order to sign up for VPage services. FIG. 8 depicts embodiments of graphical user interfaces that may be presented as part of a web interface to users in order to subscribe to the VNAP system and modify their subscription as well. A first screen 800 may be automatically presented upon logging into the web interface. This screen may provide a log in and password fields to enable existing subscribers to log in and change their registration or personalization information. If a user is not already a subscriber, then a subscribe now button may be provided to enable a potential subscriber to participate in an online subscription process. Upon selecting the subscribe now button, a subscription interface 802 may be presented to the user. Subscription interface 802 may request a number of different types of information about the subscriber in order to more effectively personalize the voice content provided by the VNAP system.

According to one embodiment, as depicted in FIG. 8, the subscriber's name, telephone numbers, mailing address, credit card information and passwords may be requested. Specifically, multiple credit card information may be input to enable the user to later on choose which of a plurality of credit cards to which to charge transaction fees encountered upon utilizing the system. Further, a password may be requested for authentication as described in detail below. By choosing a password, the user may better protect access to its VNAP account information and charges to that account. Specifically, in addition to using the telephone numbers provided for caller identification, the VNAP system may authenticate the user through requesting that the user input the password chosen during the subscription process. Additionally, subscription interface 802 may provide a plurality of buttons to enable the user to move to different interfaces to input additional information, cancel the subscription, or accept the subscription. Subscription interface 802 may comprise a billing options button 804, an authentication button 806, a voice settings button 808, a favorites button 810, an OK button 812, and a cancel button 814. Billing options button 804 may be selected by the user to access the graphical user interface that enables the user to alter the billing options for his subscription to the VNAP system. For example, the subscriber may be provided the option of buying a credit plan which provides a cheaper per credit rate.

Voice settings button 808 may be provided to enable the subscriber to modify the voice settings for the voice output for the VNAP system. These settings may, for example, modify the output of the text-to-speech (TTS) engine. The settings therefore may apply to voice output from text-based files and, according to one embodiment, not to pre-stored audio files. According to another embodiment, the settings may apply to all audio output.

Modifications are helpful because, for example, the user may want to customize the tone, speed, volume, language, gender, etc. of the voice that generates the output. A favorites button 810 may also be provided that upon selection enables the subscriber to input a list of favorite VPages for easy access to those VPages. The favorites page may comprise a listing of VPages, VCodes and aliases for those VPages (e.g., a user may use "my newspaper" for the Washington Post VPage).

The subscription may also comprise a dynamic entry point to the current location of the user using GPS technology in a mobile phone. When a caller calls into the system, the system authenticates the user by caller id, determines if the user is calling from a mobile phone and identifies where the user is calling from. From this point on, the user may ask questions and the responses may be personalized to the user's location (e.g., where am I? What restaurants are nearby?).

Also, an authentication button 806 may be provided that upon selection presents a graphical user interface to enable the user to select the level of authentication desired for their use of the VNAP system. The default level of authentication may be caller identification using the telephone numbers provided in the subscription interface. Also, a user may desire to use address, credit card or other information to verify the identity of the user. Using caller identification alone allows anyone who gets a hold of a phone and calls the VNAP system to use the personal settings of the phone owner. Using additional levels of authentication, however, provide greater security to the subscriber to prevent misuse of the VNAP system. If additional levels of authentication are input in the subscription phase, the VNAP system requests that information during log in each time the user enters the network. Password based authentication mode is another option. The user selects a password through the subscription interface and that password may be requested each time the user enters the network. Also, users may request voice print identification as another level of authentication. In this embodiment, the user records a voice print through the subscription interface, and that voice print is compared to the user's voice when the user logs onto the network for accessing the VNAP system.

Once all of these settings are selected, the user may select OK button 812. Alternatively, if the user wishes to cancel the changes or inputs entered by the subscriber, then cancel button 814 might be selected. Once all of the settings are selected and the OK button 812 is entered, the customer is notified that the subscription is over, and that access to the VNAP system will be provided within a predetermined amount of time. At that time, the subscriber may access the VNAP system. The next time the subscriber visits the subscriber interface, he or she may log in using the log in name and password to make modifications to the subscription. The subscription process described is extremely simplified for all users, since no hardware or software set ups are required. A user may visit the VNAP web page only once, unless he or she intends to be a content provider and/or unless he or she wants to make changes to the subscriber profile. In allowing users to manage administrative options, this user administration site provides them with a simple and intuitive GUI. This site may greet users with a main page asking registered users to log in and inviting guests to register. Registered users who log in are presented with the main menu and guests who elect to register are presented with the registration page.

The main menu allows the following links: My Profile, My Billing, My Preferences, and My Content.

"My Profile" brings up the Profile Administrator. According to one embodiment, this section may allow users to: View/set/change Full Name, View/set/change Nickname, View/set/change Address(es), View/set/change Phone number(s), View/set/change Email(s), etc. "My Billing" brings up the Billing Administrator. It allows users to set and change billing options. "My Preferences" links users to a page that allows users to change their TTS settings preferences (male/female, speed, pitch, etc.). "My Content" may provide links to subscriber-provided content in the VNAP system to enable a user to create, modify, or delete content provided on the system.

As depicted in FIG. 2, VNAP 12 may also comprise a plurality of modules to enable delivery of content to users based on the input of VCodes corresponding to the content. Specifically, VNAP 12 may comprise a call center 26 for receiving input of VCodes and delivery of content.

Access to the call center 28 may be through a predetermined phone number or communications protocol on a voice-enabled device as described above in the summary. A VCode identifier module 28 may be provided for determining the VCode input by the user. VCode identifier module 28 may utilize an indexed database of VCodes and corresponding VPages that it may access directly or over a network, and/or may utilize a VCode resolution system 30 that may be external to VNAP 12 to assist VCode identifier module 28 in determining the identity and location of the VPage corresponding to the VCode entered. VNAP 12 may also comprise a VPage retrieval system 32 for retrieving a VPage corresponding to the VCode entered by the user either from VNAP database 18 or over communications network 20 to one or more of the VPages servers 22. VCode resolution module 30 may communicate with VPage registration system 24 to access an up-to-date database of VCodes and corresponding VPages and return that information to the VCode identifier module 28.

VCode resolution module 30 may retrieve VPages that are not in a local VPage registry. VCode resolution module 30 may also periodically update the local VPage registry to make sure that it is up-to-date. To expedite delivery of VPages, VPage retrieval system 32 may also retrieve all VPages from the selected VBook and store those VPages in cache for subsequent delivery. For example, if the VCode input by the user relates to the Smithsonian Monet's Water Lillies, it may be desirable for the VPage retrieval system 32 to retrieve all Smithsonian VPages and store them in cache since it is likely that this user will request additional Smithsonian VPages. By storing these VPages in cache, the user's wait time is significantly reduced.

Upon retrieval of the VPage corresponding to the VCode entered, a VPage execution module 34 may be provided for executing the content of the VPage. Execution of the content may include playing the content, scanning the VPage for certain tags or markers to include other VPage information, generate call menus and other tasks. VPage execution module 34 may coordinate with a VPage menu module 36 that is provided within VNAP 12. VPage menu module 36 presents, receives and interprets menu options presented in a VPage. VPage menu module 36 may comprise a TML interpretation module that utilizes TML/VoiceXML or other voice-based XML file formats as the VPages to understand the menus that are to be presented to the user to enable the user to maneuver within the system, as described in the Appendix hereto. VPage menu module 36 may also comprise a VoiceXML interpretation module, a Nuance Grammar or Speech Works specification language module or a Java Speech grammar format module. VPage menu module 36 may interpret predefined menu options and determine which of the options to execute based on choices selected by the user from a choice interpretation module 42, as described below.

VNAP 12 may also comprise a voice output generation module 38 for outputting voice signals. Voice output generation module 38 may play voice files, may comprise a text-to-voice conversion module for "reading" text files as voice output or any other type of module for taking a data file and generating voice output to be directed by input output module 26 to the appropriate user. Optionally, a voice personalization module 40 may be provided that enables a user to select personalized features for the voice content. Personalization features may include tone, pitch, language, speed, gender, volume, accent, and other voice options that a user may desire to make the information more understandable or desirable.

Voice personalization module 40 modifies how voice output generation module 38 generates voice content to correspond to the user's desired choices. The voice personalization features may be set by a user upon subscribing and automatically applied when that user logs into the system.

Personalization module 40 retrieves information from subscriber database once he logs onto the VNAP. In doing so, the caller does not need to specify his information at any point during the session. If he is filling out a form or running a transaction, his pre-fetched information is placed where necessary. Personalization module 40 also may present the user with a portal VPage, allowing the user quick access to the content they frequently access. Personalization module 40 also may access the user's bookmarks or customized applications stored in the subscriber database 80. Also, if VPages store user specific information, then personalization module 40 may retrieve that information. Personalization module 40 may also allow users to modify speech output settings as described above.

VNAP 12 may also comprise a choice interpretation module 42 that may be used to interpret responses from users, such as those based on menu options. Choice interpretation module 42 cooperates with VPage menu module 36 and call center 26 to enable VNAP 12 to respond to user requests based on menu options presented within a VPage. For example, if the menu provided by the VPage includes five options, choice interpretation module 42 may determine which of the five options to execute based on the; input received through call center 26 from the user. If the user presses the number 1 on the telephony device, then choice interpretation module 42 generates a signal that indicates to VPage menu module 36 to execute choice 1. Choice interpretation module 42 may comprise a more complicated system as well. Various call menu technologies generally are known and can be used. The user may also be able to respond with voice-based choices. Choice interpretation module 42 then uses voice-to-text conversion, natural language interpretation and/or artificial intelligence to determine which of the available menu options the user desires, as described in greater detail below with reference to FIG. 17. Other systems for interpreting and executing user menu choices may also be used for choice interpretation module 42. One of the choices available to a user from any VPage may be to select another VPage. A user may do so by inputting the VCode (including verbally saying the VName corresponding to the VCode) for the content desired. If the VPage desired is from the same VBook as the present VPage that the user is receiving, then the user may only input the VPage identifier from the VCode or speak the VPage portion of the VName (e.g., Monet's Water Lillies) to receive that desired VPage.

Additionally, a transaction processing module 44 may be provided for processing transactions presented in a VPage. Transactions should be understood in a broad sense to include purchase of goods, request for services, making or changing reservations, requesting information, and any other type of transaction that may be performed by a telephone or other information exchange system. Additionally, a transaction processing module 44 may be provided within VPage server system 22 as described in detail below. Transaction processing module 44 may cooperate with transaction processing systems 13 to process various transactions.

VNAP 12 may also comprise a billing module 46 for monitoring user's access to various VPages and enabling VNAP 12 to allocate fees received from the user to system participants including VNAPs, content providers, VPages, VCode display hosts, transaction processors, and others. Billing module 46 may be used to record the time a user logs into the VNAP 12, to record times when users access new VPages, to record when users perform transactions, and other types of information that may be used for determining how to allocate fees received from the user for accessing the VNAP.

Billing module 46 may compute time spent and VPages accessed on the VNAP for each VPage. In one embodiment, it receives a credit value for the VPage as specified by the content provider and calculates the charges on a minutely basis throughout the caller's session. This information may be stored in the user statistics database 82 and/or VNAP database 18. Billing module 36 may track the following information. For each call, it may track time of day/day of week, call duration, call origin, VPages visited, etc. For each VPage, it may track "hit" frequency, revenue generated, demographics, etc. It may also track the advertisements presented, transactions performed, and other information.

Authentication/Security module 45 authenticates users that dial into the VNAP, as described above, and may also provide for network security. Authentication may be set either by the user or by the voice content provider. For example, a content provider may impose an authentication mode for visitors viewing his VPage. In this situation, in one embodiment, the more extensive of the two settings is applied as the valid authentication mode. For instance, Jack selects default caller id authentication. One of his favorite VPages, Ticket Master, however, imposes the password based authentication mode. Every time Jack dials into Ticket Master's VPage, he is prompted for his subscriber login and password. For other pages, which do not impose anything other than the default authentication, Jack retrieves them without an extra authentication process. Conversely if Jack had selected password-based authentication, he is prompted for a password at each VPage regardless of whether the VPage is default authentication or not. This way Jack not only prevents others from abusing his personal information during transactions but also ensures that they do not waste his credits by listening to content in the network.

Also, authentication module 45 may prevent attacks from the telephone network, LAN, Internet or other access points. Further, authentication module 45 may disconnect a user after a predetermined period of inactivity.

VNAP 12 may communicate with one or more content providers 70 for the receipt of information or other voice content to be included in VPages offered by that VNAP. Content providers may deliver information to a VNAP in the manner described below with reference to FIGS. 3 and 5.

Figure 3:
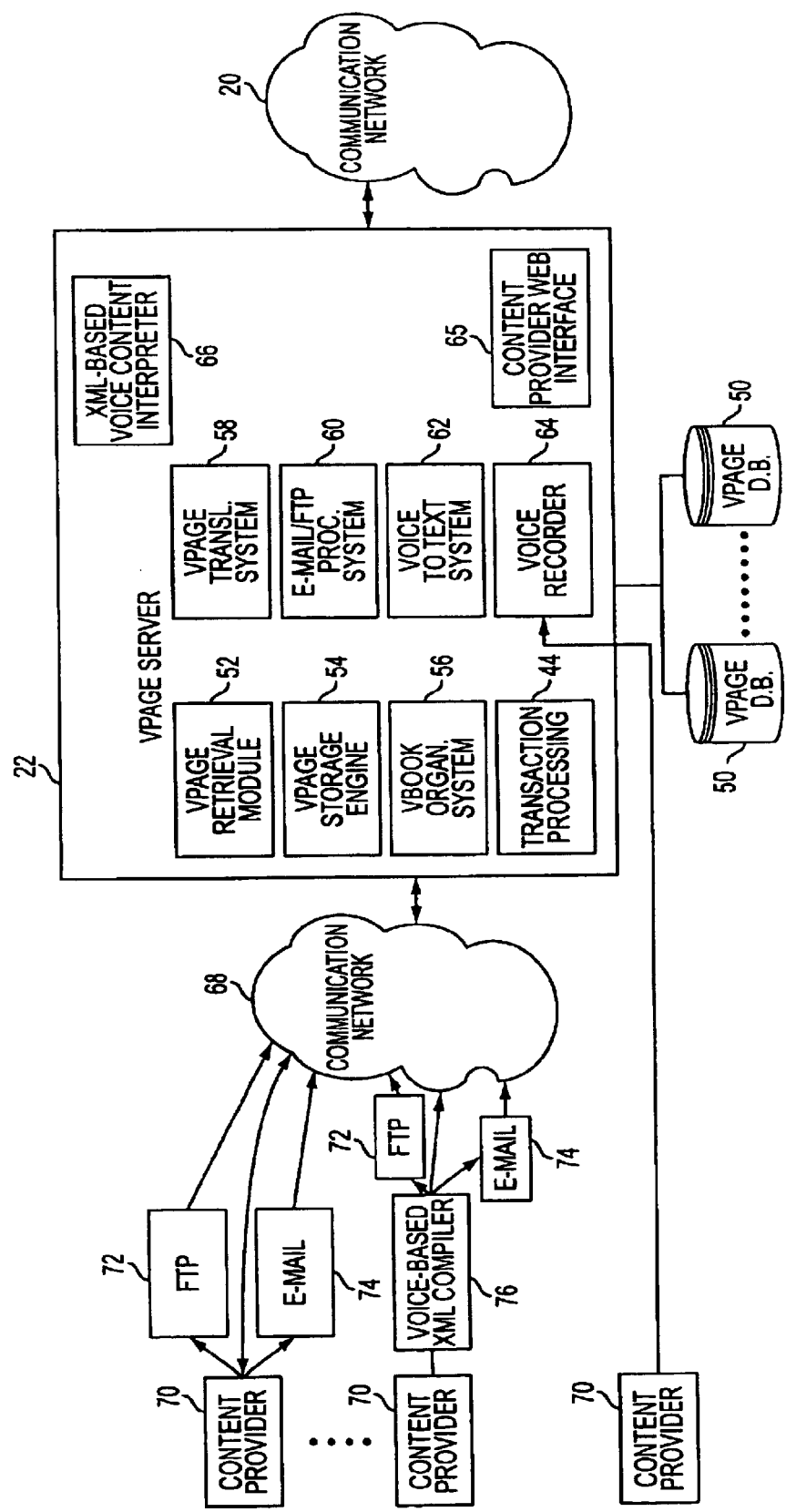
FIG. 3 depicts a system for downloading content to VPage server systems according to an embodiment of the invention.

FIG. 3 depicts a system for enabling content providers to provide content to VPage server systems 22. As mentioned above, VPage server system 22 may comprise a transaction processing module 44. Additionally, VPage server may comprise a VPage retrieval module 52 for accessing VPage databases 50 to retrieve VPages that are requested from the VPage server 22. Additionally, VPage server 22 may comprise a VPage storage engine 54 for receiving information and storing it in VPage database 50. A VPage organizational module 56 may also be provided to track and organize the various VPages within the VBooks hosted by VPage server system 22 and to organize the various VBooks maintained by VPage server system 22.

VPage translation system 58 may be provided for the purpose of translating text-based VPage data that is stored in VPage database 50 into voice communications. Additionally, an e-mail/FTP processing system 60 may be provided for receiving information via e-mail or FTP and storing that information through VPage storage engine 54 into VPage database 50. Voice-to-text system 62 may be provided by VPage server 22 to enable content providers to call in to VPage server system 22 and directly record voice content and store the content in the VPage database as text. A voice recorder 64 may be provided to record voice information and store it directly as a sound file in VPage database 50 or may pass voice files to voice-to-text system 62 to convert the voice files to text for storage in the database. XML-based voice content interpreter 66 may be provided for compiling, creating and interpreting XML-based voice content VPages, such as TML, VoiceXML, WML or others. As described in detail below, TML is a mark-up language based on XML. TML stands for Telecaster Markup Language which is a proprietary language of Microstrategy Incorporated. A detailed description of TML and how it operates is incorporated as an Appendix to this application. A plurality of content providers 70 may provide content to a VNAP 12. Content providers may provide voice content to be included in VPages to the VPage server 22 from a plurality of different mechanisms. Such mechanisms include using an FTP server 72, electronic mail 74, hand delivery or a TML compiler 76 that then transfers TML files via either FTP, e-mail or a hand delivery (i.e., via disk) to the VPage server 22 to be stored on a VPage database 50. Content providers 70 may provide files in sound, text or other format through FTP 72, e-mail 74, or TML compiler 76. Each of these files may be provided over a network 68. Network 68 may include a network similar to networks 16 and 20 and may comprise the same network as networks 16 and/or 20.

VPage server 22 may also comprise a content provider web interface 65 that enables content providers to be able to input VPage content into the system. Specifically, a web base interface may be provided to enable content providers to be able to specify various information about a VPage that they are providing to the network. That information may include the name of the VPage, the format that the VPage is in, the method of charging and selecting whether or not that content may be resold to another VPage. According to one embodiment, a web interface may be provided that first presents a user with one or more of the following options: to modify a subscription profile; to modify an existing VPage; create a new VPage; order labels and brochures for a VPage; review statistics regarding the use of one or more VPages provided by that voice content provider; and review account status with the VNAP. Corresponding interfaces for each of these options may be provided to enable the content provider to effectuate one of those options. The statistics review GUI may display to the voice content provider the number of users, time spent by users, and other relevant statistics. This may comprise a set of reports given by a data mining tool, such as MicroStrategy Web, offered by the assignee of the present invention, and the analysis given is limited only by the type of data seen. For instance, it may be possible to show a VCP what other pages users who frequent their pages go to, and demographics of users who see their pages.

FIG. 10 depicts an embodiment of another embodiment of a content creation tool with a graphical user interface system that may be provided to enable a content provider to create a new VPage or modify an existing VPage. FIG. 10(*a*) depicts a screen 1002 for VPage configuration entry. Screen 1002 provides a name field 1004, a format field 1006, a selection box 1008 that enables the content provider to enable a permanent charge, a credit permanent entry box 1009, a selection box 1010 that enables the content provider to select whether to enable resale, a resale rate entry box 1011, a visitor authentication box 1012 and innexed box 1014. Name entry field 1004 may be provided to enable the content provider to select a name for the particular VPage. The name selected may be the VName, for example. Ideally, content providers name the page intelligently to enable users of the system to be able to retrieve that VPage by simply pronouncing the VName. Accordingly, the VName selected ideally should be one that is easily pronounceable by a user through speech recognition technology.

In the embodiment of FIG. 10(*a*), the content provider here, for example, the content manager for the Smithsonian, desires to create a VPage for the Van Gogh sunflowers painting. Accordingly, the Smithsonian manager decides to name this particular VPage sunflowers and inputs that into name field 1004. The particular page being created here may be a VML type of page, and accordingly, the manager may input VML in the format field 1006. Further, the manager may decide to enable a permanent charge for the use of this page in order to generate revenue for the Smithsonian Museum. Accordingly, box 1008 may be selected as depicted in FIG. 10(*a*). Also, the manager may select to input two as the credits per minute charge for accessing this VPage in the field 1009. Here, the Smithsonian manager may decide not to enable resale and accordingly may not select 1010.

Visitor authentication button 1012 may be provided to enable to content provider to select the level of authentication required in order to access this VPage configuration page. A content provider may desire higher levels of security to protect the consumer and the content provider. For example, a VPage may contain a link to transactions where the content provider is using credit card numbers of the user. In that case, the content provider may want to authenticate the caller to make sure the transactions are secure.

Specifically, the content provider may be able to select between different levels of authentication in order to protect the security of the page. One level of authentication may involve caller identification whereby a user desiring to access this VPage is authenticated based on caller id. Also, an identification number and password (e.g., a personal identification number or PIN) may be assigned, either to a series of VPages or to each individual VPage. Accordingly, in order to access the VPage configuration for a particular VPage, a user may be requested to input user identification and password in order to access the VPage configuration. Also, voice print authentication may also be utilized if desired to require that the user authenticate his identity by speaking through a microphone to the VPage configuration site before retrieving a particular VPage. For example, one authentication method may comprise assigning each subscriber a registered phone number (e.g., a mobile phone number). If the user calls the VNAP from the registered phone number, the VNAP asks for a PIN to start a session. If the user calls from a different phone number, then the user is prompted to input the registered phone number and PIN before entering a session. Other methods of authentication may also be provided to enable the content provider to select the level of authentication that that content provider feels comfortable with in controlling the VPage content and transaction data related to a particular VPage or VBook.

Figure 12:
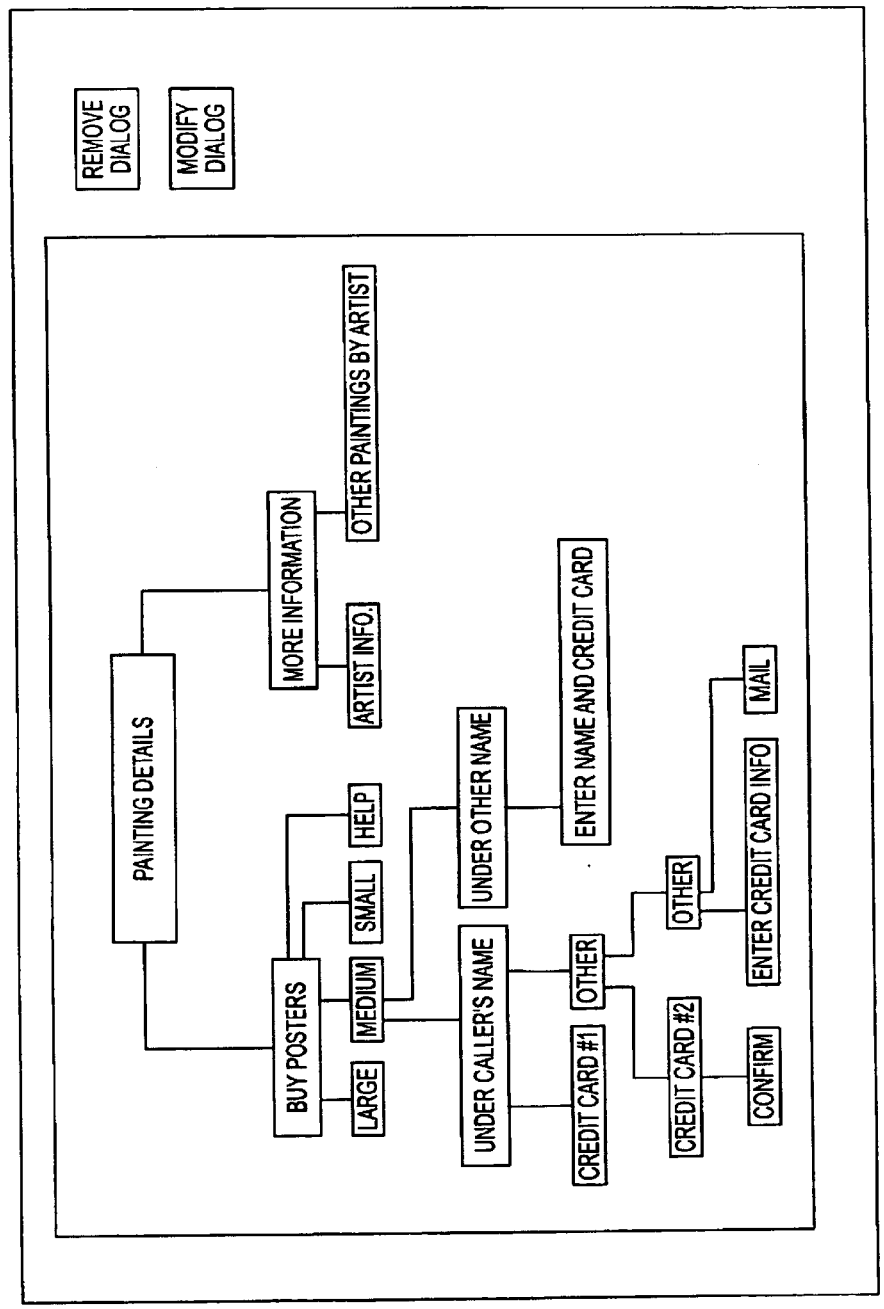
FIG. 12 depicts a screen display of a graphical user interface for reviewing the tree structure of a VBook according to an embodiment of the present invention.
Figure 13:
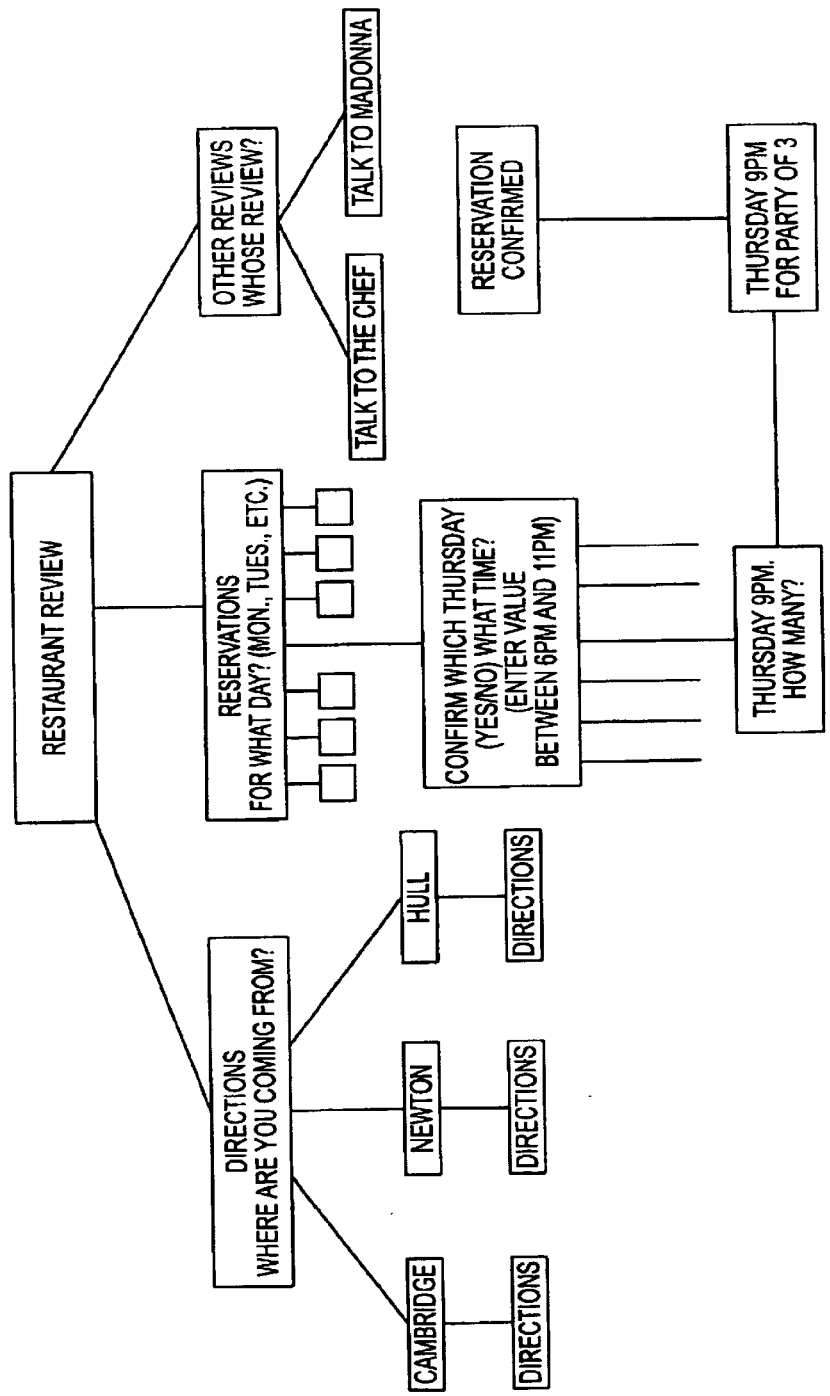
FIG. 13 depicts an example of a tree structure for VPages according to an embodiment of the present invention.

Once the content provider has established the VPage configuration as desired, next button 1014 may be selected to move to structure page 1020 as depicted in FIG. 10(*b*). Structure page 1020 displays a graphical representation of a dialog tree structure. This page enables content providers to create a tree of dialogues. According to one embodiment of the present invention, a dialog may be a basic unit of content in any given VPage. When a content provider gets to the structure page the first time, there is only one dialog waiting to be modified. The content provider may then select that dialog and hit the modify dialog button 1024 in structure page 1020. When multiple dialogues have been created, the user may remove dialogues by selecting remove dialog button 1026 after highlighting or otherwise selecting the desired dialog to delete. Examples of dialog tree structures are depicted in FIGS. 12 and 13 as described in more detail below.

When the content provider selects the modified dialog button 1024, a dialog page 1028 may be presented to the content provider. The dialog page may be provided to enable the content provider to specify various settings for each particular dialog within the VPage. According to one embodiment, dialog page 1028 may comprise a dialog name field 1030, an add child button 1032, a dialog type field 1034, a record audio button 1038, a hear audio button 1036, a write text button 1040, a content location entry field 1042, a child listing area 1044, a link listing area 1046, an enable dialog security selection button 1048.

Each dialog may be given a separate name to enable the user to understand the flow of dialogues within a particular VPage. In the example of FIG. 10(b), a Smithsonian content provider has selected details as the name of the first dialog to which any user is presented when selecting the VPage for the Smithsonian sunflowers page. In dialog type field 1034, the content provider may select the type of dialog. The dialog types may include text or audio format. Here, the user has selected a text field and therefore may press button right text 1040 in order to create text or may specify the location of a file in content location field 1042.

If the user desires to add a child to a particular dialog box, then the content provider may depress add child button 1032 and may be presented with an additional dialog page for the new dialog being created. If the dialog type is an audio format, the user may either record audio by depressing button 1038 or hear audio by depressing hear audio button 1036. Record audio button 1038 enables for the recording or modification of audio clips using the web interface provider.

According to one embodiment, by depressing this button, the system initiates a telephone call to the content provider to enable the content provider to make changes via the telephone. The content provider then may record the audio by speaking into the telephone where it is recorded by an audio recordation system provided by the system. Alternatively, or in addition thereto, a microphone may be provided to enable the user to record audio over the internet directly to the dialog creation website. In another embodiment, content may be created by the content provider providing the URL of an existing HTML page (along with certain parameters) whereby the module may then convert it to VoiceXML. The conversion application determines the number and nature of the parameters passed to it. For example, minimal parameters would include whether the VPage must accept touch tone input, perform voice recognition, or both.

Child listing 1044 may be provided to list the names of all children of this particular dialog. By selecting any of the children within this field, the user may be able to see the dialog page for that particular dialog and modify those dialogues accordingly. In this field, the name of the child is presented as well as the DTMF (touch tone codes) and voice codes that may be used to move to that particular dialog. For example, here, to move from the details dialog to the "buy posters" child, the user may either depress the one key on the touchtone telephone or may say the word poster through the telephone and the bi posters dialog will be initiated. Similarly, the more information dialog may be presented by the user either depressing the two button on the touch tone telephone or by saying the word more.

A link listing 1046 is also provided that comprises a listing of all of the different VPages to which a particular subscriber may transfer from this particular VPage without requiring entry of the full VCode. Here, the Smithsonian director may desire to input a listing to every other VPage provided by that particular museum. An example is depicted in FIG. 10(b) where the paintings for the Water Lilies Harvest, and Metamorphosis are provided with the VCodes that transfer to those particular VPages and the VCodes that could be used to transfer those particular VPages.

An example of the final tree structure for dialogues generated by this particular Smithsonian manger may be depicted in FIG. 12. As depicted in FIG. 12, a screen may be presented that shows a depiction of the tree structure and provides removed dialog and modified dialog buttons to enable the content provider to be able to add or modify the existing tree structure.

Figure 9:
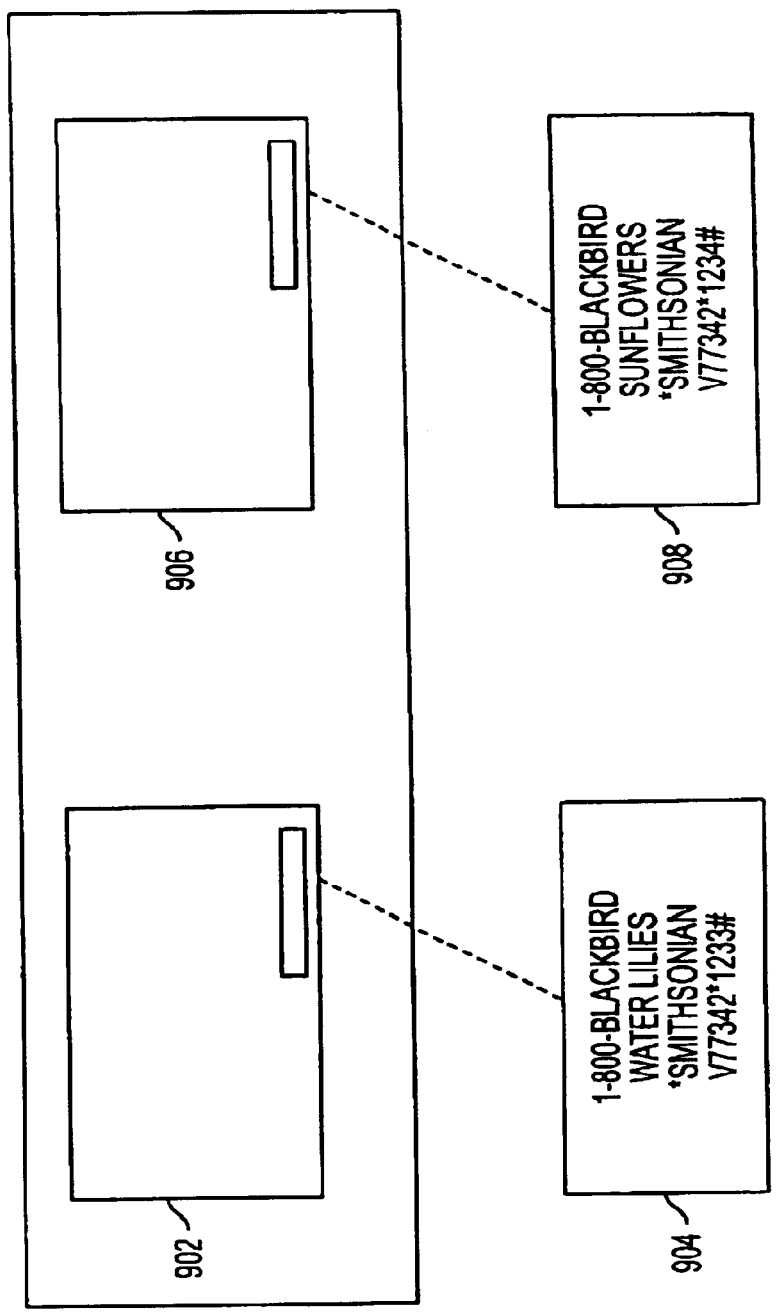
FIG. 9 depicts an example of VCode placement on an object of interest according to an embodiment of the present invention.
Figure 11:
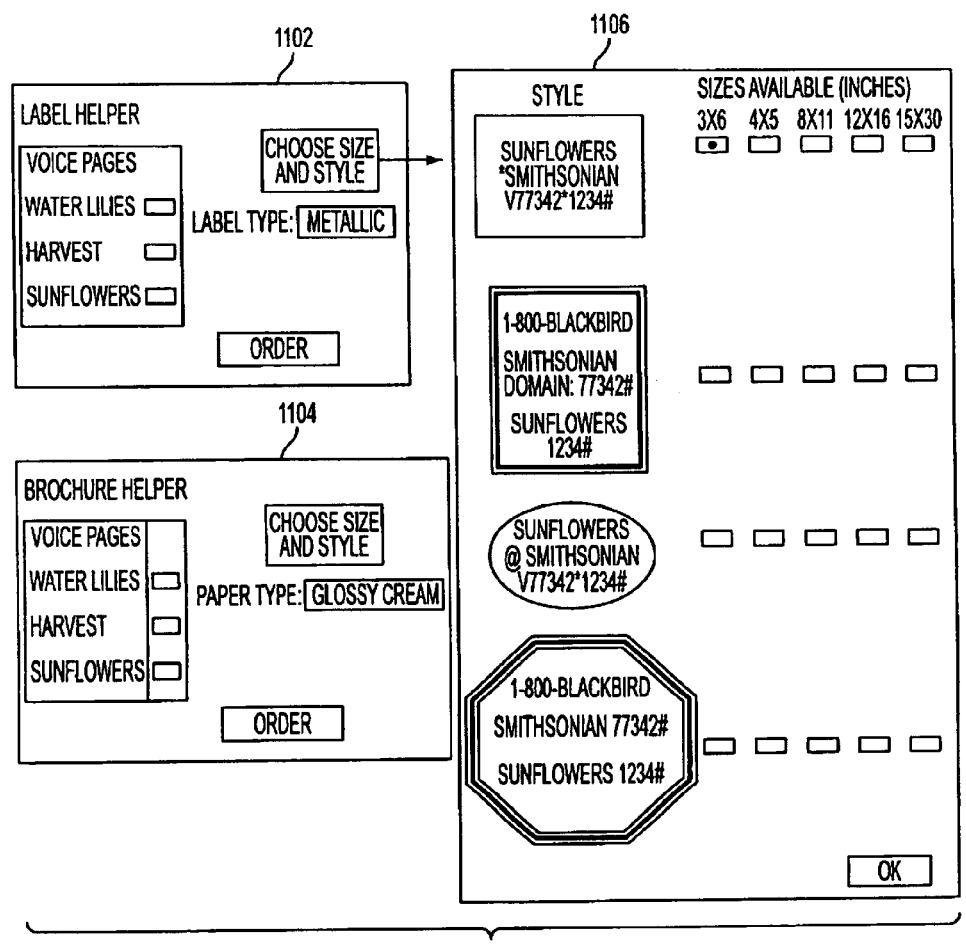
FIG. 11 depicts example screen displays from a graphical user interface for ordering brochures and labels corresponding to VPage displays according to an embodiment of the present invention.

As part of the content creating process, content creation module 65 may also enable a content provider to be able to create brochures and labels. The brochures and labels may be distributed or placed so as to indicate the VCode or VName for a particular object with which that content is associated. FIG. 9 depicts an example of a collection of paintings 902 and 906 with VCode labels 904 and 908 displayed in association with those paintings. As depicted in FIG. 9, the VCode label may comprise the telephone number to access the VNAP system 12, the VName of the particular VPage associated with the painting, the name of the content provider, and the VCode which comprises, in this embodiment, a code corresponding to the content provider, separated by an asterisk, from the code associated with the particular VPage in question, followed by the pound sign. In order to create these labels automatically, a label and brochure selection graphical user interface may be provided. In a first screen, the user may be asked to select whether he wishes to generate a label, or a brochure. A label helper 1102 or a brochure helper 1104 may then be provided to the content provider. Label helper 1102 enables the user to select which VPages for which they would like to order a label, choose the size and style and label type and then depress a simple key to order those labels. The order would be processed using the billing information provided by the content provider when the content provider signed up with this particular VNAP to provide content to users. Various styles and sizes may be depicted in a graphical user interface 1106 to enable the content provider to more readily understand what is to be provided in the particular label being ordered. These labels may then be displayed in association with an object about which the VPage provides content. As shown in FIG. 11, various styles for VCode labels may be provided with differing formats for the content. In each label, the number to access the VNAP, the content provider and name of the particular VPage and the VCode may all be depicted in various formats.

A brochure may be a logical grouping of VCodes and names put together in order to provide further temporal and spatial flexibility and information retrieval. A brochure handed over to patrons of the museum, for example, enables the user to listen to the content not only as the user is walking through the gallery, but also after the user leaves the gallery. The brochure thus serves as a take home cyber guide.

Content providers may also modify VPages through interaction with content provider web interface 65 and its affiliated telephone content provider interface. In order to modify audio content, for example, a content provider may enter the system by dialing into an administrator privileges phone number for the VNAP and accessing all VPages for that particular content provider. For example, suppose that all of the posters for a particular painting in the museum are sold out but there are still a lot of mugs left in stock. The content provider may want to change the "buy posters" content to "buy mugs" for that particular painting to encourage mug purchasers. The content provider may dial the VCode, enter administrator log in and password and then change dialogues on the fly using the telephone interface. For example here, the system may ask the administrator "would you like to modify the details dialog?" Upon saying no, the system may ask "would you like to modify the information or posters dialog?" (following down the tree structure until the content provider has reached the particular dialog that they wish to change). Here, having reached the poster's dialog, the content provider may say "posters" at which the system may respond "You may start recording after the tone." Then the content provider may speak into the telephone and record the saying "buy more mugs." Also, that user may also effect a change to the transaction processing module to sell mugs rather than posters.

This interaction illustrates how a content provider may travel through the tree structure and modify the dialog to be changed. According to one embodiment, the content provider may not change the tree structure on the phone, although that may be possible as well. If the voice content provider cannot change the tree structure on the phone, that content provider may use the web interface to add or modify dialogues. Here, rather than deleting or changing the tree structure, the content provider is merely substituting one dialog for another without affecting the overall tree structure. In that way, the content provider is provided the ability to change content over the telephone to serve their users in a more timely and efficient way by encouraging frequent updates.

Although various modules have been described herein, it should be understood that each module may be provided as several modules and that modules may be combined. Additional functionality and/or modules may be provided without departing from the scope of the invention. The operation of each of these modules will be better understood in reference to the method of operation described below with respect to FIGS. 4 through 6.

Figure 4:
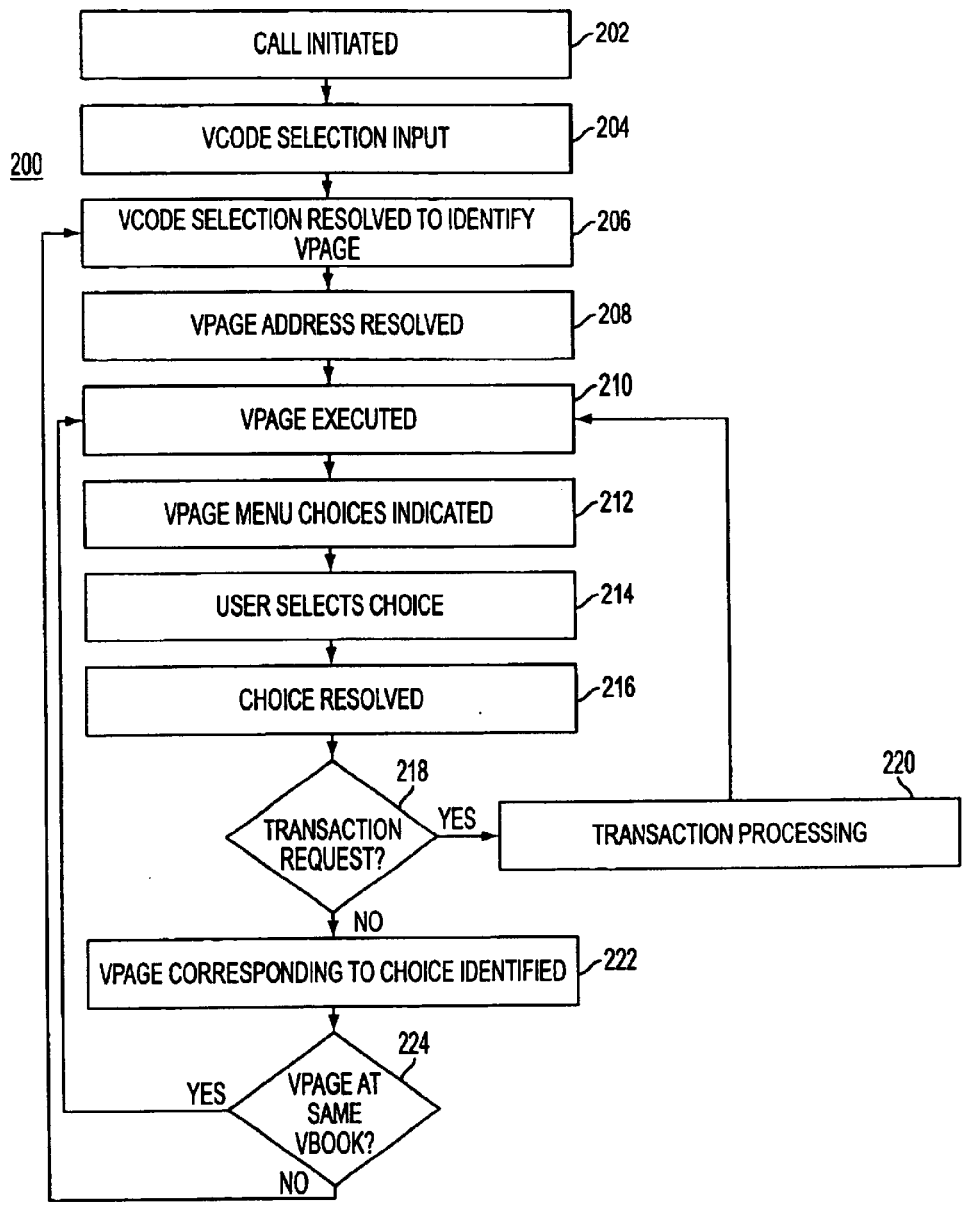
FIG. 4 depicts a schematic diagram of a method of operation of a VCode system according to an embodiment of the invention.

One method of operation of the VCode system may be understood with respect to method 200 depicted in FIG. 4. One embodiment of a process of operation of the present system begins when the user connects using a telephony device of a user system 14 through a communications network 16 to a VNAP 12 (step 202). The VNAP 12 prompts the user for a VCode.

The user enters the VCode or other input (step 204). The system resolves the VCode or input selection (step 206) to identify the identify and location of the VPage associated with that VCode or other input. According to one embodiment, the VCode identifier module 28 may be employed to determine the location of the VPage, or an external system, such as VCode resolution system 30, may be accessed to determine the location of a VPage. Once the identity and location of the VPage is determined, the VPage is retrieved (step 208). In step 210, the VPage is then executed. Specifically, VPage retrieval module 32 retrieves the VPage, and passes the VPage along to VPage execution module 34. VPage execution module 34 may then generate the voice output to the user using voice output generator 38 and voice personalization module 40, if desired, and the voice is then delivered using call center 26. Upon execution of the VPage, VPage menu choices may be indicated in step 212 using VPage menu module 36 which cooperates with voice output generator 38 and call center 26.

The menu options within the VPage may be indicated to the user in a number of ways. A listing of the various options may be presented in audio format, or as discussed above, natural language, speech recognition, and artificial intelligence agents may be utilized to allow the user to indicate the desired choice, and then VPage menu module 36 may determine the best fit from the menu choices presented to the user. In either event, the user is prompted to enter a choice in response to the VPage. In step 214, the user inputs a choice, which is received by call center 26 and passed to choice interpretation module 42. Choice interpretation module 42 and VPage menu module 36 then resolve the choice in step 216 to determine what action the user desires. In step 218, it is determined whether that choice is a transaction request or not. If the request is a transaction request, then in step 220, transaction processing takes place and either returns the user back to the VPage or concludes and signs the user off of the system. If the choice is not a transaction request, then in step 222, the VPage corresponding to the choice is identified and then in step 224, it is determined whether the VPage is at the same server or a different server. If the VPage is on the same server, then control returns to step 210, and the selected VPage is executed. If the VPage is at a different server, then control returns to step 206 and the VCode is resolved. This process continues until the user decides to exit the system.

FIG. 7 depicts a VNAP system 300 according to another embodiment of the present invention. In this embodiment, VNAP system 300 comprises a plurality of users 14 that connect to a call center 28. Call center 28 connects to a voice browser 35 that is operates in conjunction with a speech recognition module 39 and a text-to-speech (TTS) module 37. The voice browser 35 then passes information received to a interpreter 41 which communicates parsed inputs from a user to a voice server 43 that provides a plurality of modules. Voice server 35 serves voice content from content source 84 that has been provided from individuals 88, corporations 90, government entities 92, institutions 94 and/or media 96 through either a web interface system 86 or other input devices 98. A VCode registration system 24 is provided to assign VCodes to all VPages in the content source 84. The system also provides a user statistical database 82 and a subscription database 80. Users 14 may connect to a subscription interface, such as module 47, to input their information into subscription database 80.

Specifically, the system leverages a subscriber database that stores information for each subscriber to the VNAP system. Information received from the subscriber during subscription as well as usage information may be stored in the subscriber database. When a subscriber enters the VNAP system, the information in the subscription database is accessed and used during the session. Information may include subscriber name, user nickname, one or more telephone numbers (with categorization of type and/or function (e.g., home/business and fax/pager/mobile/land line, etc.)), one or more mailing addresses (with categorization of type (e.g., home, work, etc.)), one or more e-mail addresses, other contact information, credit cards (with type category such as Visa, Diner's Club, American Express, etc.), voice settings (e.g., gender, speed, tone, pitch, language, volume, accent, etc.), a list of favorites, user billing options and authentication settings (PIN, voiceprint, valid Caller ID numbers, etc.).

In addition, the subscription database may comprise information about what information is made public for a particular subscriber or group of subscribers. For each record, the user may mark an entry as being "public," "reveal on confirm," "reveal on authorize," or "private," for example. Values marked "public" may be visible to all voice content providers. Values marked "reveal on confirm" or "reveal on authorize" may be visible to individual voice content providers only upon user confirmation or authentication (respectively). Values marked "private" may be hidden to all voice content providers.

Also, some fields may always be private for the security of the system. For example, the VNAP may not want to allow even content providers to have access to credit card information, or at the very least may make that information "reveal on confirm" so the subscriber knows when that information is being provided to a content provider. Other values we may restrict entirely to "private" only (such as authentication settings). In a "reveal on confirm" situation, a VPage that desires to access the information may send a request to a confirmation module that requests confirmation from the subscriber prior to releasing the information from the subscription database to the VPage.

A user statistics database 82 may be provided. This database may be stored with subscriber database 80, may be part of the same database, or may be stored separately. This database collects information about how each subscriber uses the VNAP system including information about the number of VPages accessed, the identify of VPages accessed, the hours spent on the network for each VPage per user and also stores related billing information. This database is updated frequently so it creates multiple rows at each session when users move between VPages. User statistics database 82 cooperates with billing module 46 in order to properly charge users for accessing the system. User statistics database 82 may also store information so voice content providers may perform data mining on the information to better understand how to more effectively generate revenue. For example, by determining what VPages are hit at what times and what kinds of users hit them, the voice content provider may be better able to target his advertising. If, for example, a VPage related to a particular television show is used mostly by women in their middle thirties, then the content provider may include advertisements in the VPage that are suited to that demographic. Based on these findings, advertising schemes for content providers may be improved immensely.

When it is billing time, the contents of this database are grouped by distinct users and billing statements are generated by billing module 46 through use of billing information stored for subscribers in the subscription database 80. Similarly when the payments are received, this time billing information is grouped by content providers and split properly by billing module 46.

Figure 18:
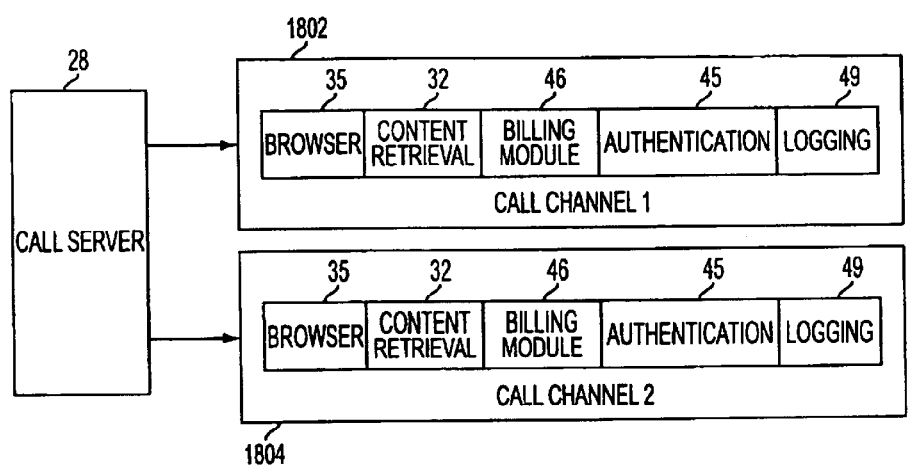
FIG. 18 depicts a call server system according to an embodiment of the present invention.

Voice server 43 may comprise content retrieval modules 32, billing modules 46, security/authentication modules 45 and a personalization module 40, among others. In general, as depicted in FIG. 18, a call center 28 (or call server) may initiate a different thread 1802/1804 for each incoming call. That thread 1802/1804 may comprise an instance of a voice browser 35 (including speech recognition module 39, text to speech module 37 and interpreter 41), and a voice server (including content retrieval module 32, billing module 46, security/authentication module 45 and logging module 49).

With this design, the system does not have need for a complex thread manager, and communication between modules happen in the thread's stack and memory space. In this embodiment, voice browser 35 communicates directly with voice server 43 which in turn communicates with other modules in the thread. With this model, load balancing is simplified. These modules may all reside on different machines, or on the same machine. In one possible scenario, voice browser 35 announces to voice server 43 that it is ready, and voice server 43 decides that it should talk to the authentication module 45 on Machine X, personalization module 40 on Machine 1, and content retrieval module 32 on Machine *. In a preferred embodiment, each of the modules is thus a separate object with single points of entry that do not depend on any shared "global" values to communicate with one another. By leveraging existing technologies, such as COM and DCOM, the locations of these modules is relatively flexible.

While voice browser 35 manages state transitions between dialogs, voice server 43 handles centralized tasks that do not require the information as to which dialog in the VPage the caller moves to. Centralized tasks may include personalization, authentication, content retrieval and billing.

Figure 16:
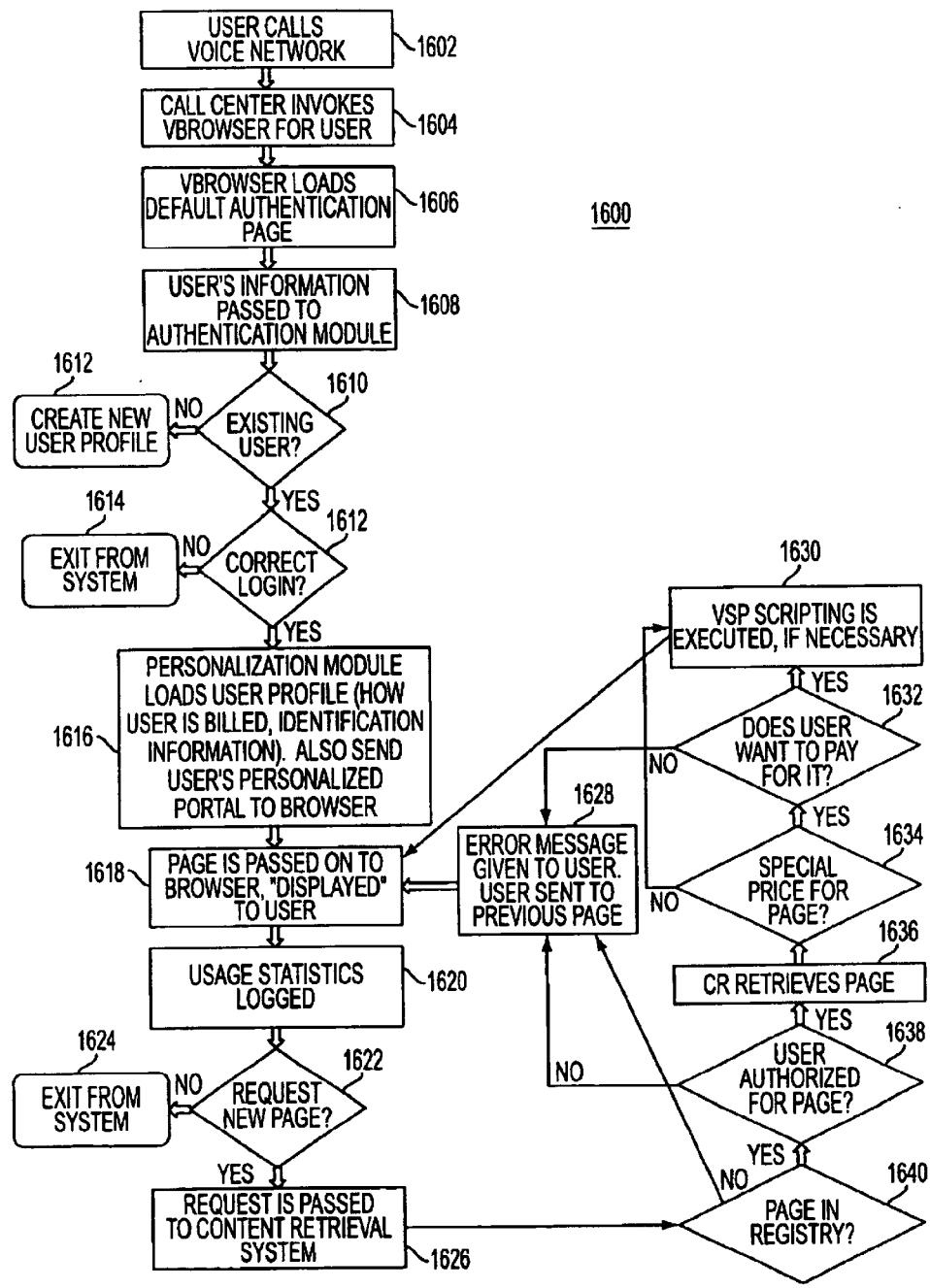
FIG. 16 depicts a flow diagram of call processing according to an embodiment of the present invention.

The functionality and relationship between these modules is provided in more detail below. An overview of the functions provided by these modules is provided with respect to FIG. 16. FIG. 16 depicts a method 1600 of operation of the embodiment of FIG. 7. In this system, in step 1602, the user calls the VNAP and the call center 28 receives the call. In step 1604, the call center 28 invokes the voice browser 35. In doing so, a browser manager provides a channel identification to the call center to identify the channel of the call. Next, in step 1606, the voice browser 35 loads a default authentication page, and "displays" it to user, where the user is prompted for login and password to authenticate the user. In step 1608, the user's information is passed to authentication module 45 which determines in step 1610 whether the user is a current user. If not, then the user is prompted in step 1612 to create a new user profile, as described herein. If the user is a current user, then the authentication module 45 determines whether the user's login and password are correct. If not, then the system, in step 1614 exits.

If so, then in step 1616, the personalization module 40 loads the user profile, including information about how the user is billed, identification information, etc. The voice browser also stores the user's information in its session information for later use. In step 1618, the VPage requested by the user is provided by the call center 28 to the voice browser 35 and displayed to the user. In step 1620, usage statistics regarding the retrieval are logged in the user statistics database 82. In step 1622, the user may request a new page. If not, the in step 1624, the user exits the system.

If a new page is requested, then in step 1626, the user request is passed to a content retrieval system (here, voice server 43). If the VPage requested in the VPage registration system (in step 1640), then in step 1638, the authorization module determines whether the user is authorized for that page. If not, then an error message is generated in step 1628 and the user is returned to the previous page. If so, then the content retrieval retrieves the VPage in step 1636. Next, the system determines whether there is a special price or authorization necessary to access the desired VPage (e.g., more than one credit for the VPage or a separate subscription required). If not, then VNAP scripting is executed if necessary to generate the VPage (step 1630) and the VPage is passed to the voice browser and displayed to the user (step 1618). Scripting includes substitution of personalized values for the particular user into the VPage. If the user does not desire to pay (determined in step 1632), then the error message is generated (step 1628).

Call center 28 in this embodiment may cooperate with the voice browser 35, a speech recognition module 39 and a text to speech module 37. Voice browser 35 acts as the interface between the caller and the voice server 43. It tracks information flow during the caller's session by accepting caller requests, interpreting them, passing them onto the server and returning the relevant VPages to the user.

Voice browser 35 interfaces with call center 28 to handle ITS (text to speech) processing through interaction with TTS module 37. It also determines the voice content that is desired (such as determining the VCode or VName requested). Voice browser 35 thus translates voice input into specific instructions that the appropriate TTS engine understands. It may also pre-fetch certain VPages based on certain criteria. Also, if a VPage presents menu options, voice browser 35 generates spoken text to present to the user to choose from. Voice browser 35 also transfer control to different segments of a VPage depending on what menu options the user picks.

On the input side, voice browser 35 deals with DTMF (touch tones) and spoken words, by interacting with an Automated Speech Recognition (ASR) platform to get back spoken words as inputs as described in detail below. In general, however, ASR relies on grammars and voice browser 35 interacts with ASR to track the scope of grammars by switching grammars and adding and removing words from the grammar. Voice browser 35 may also be responsible for receiving input to complete variables presented to users based on pre-stored variable options. Variables, like grammars have a scope. For variables, this scope is tied closely to a namespace. Voice browser 35 manages variables across separate namespaces and keeps track of when a namespace has gone out of scope, to prevent the list of variables from keeping around data that is no longer relevant.

For each menu option created in a VPage dialog, content providers assign a transition command to allow the user to move from the parent dialog to the child dialog. Voice browser 35 interprets inputs from the user to effectuate those transition commands as well. Transition commands along with voice names and voice codes constitute the inputs into the Voice Browser. Voice browser also keeps track of what inputs are globally available and what inputs are local.

Also, voice browser 35 handles standard control flow options, such as conditional execution (typically an if statement), and transfer of control. Therefore, voice browser 35 may comprise an expression evaluator to evaluate the truth of conditional statements, and the ability to transfer the user to appropriate points within a page, and outside to other pages. In order to leverage existing, widely used technologies, such as CGI and HTTP, voice browser 35 may send the variables it has collected to a site with either the POST or GET http methods.

Additionally, voice browser 35 may make calls to outside functionality, in other words, use some form of RPC, such as the SOAP protocol, for example.

Voice browser 35 may interact with a speech recognition module 39, such as an automated speech recognition (ASR) platform, to interpret inputs from the user via voice commands. In one embodiment, the ASR utilizes grammars that limit the number of possible choices that are recognized. Every input received by the VNAP system is matched to the elements of a grammar to see if it is a legitimate reply. At least two types of grammars may be used—static and dynamic grammars. Static grammars are the most basic elements of a speech recognition application. They establish the framework for how a given voice input should be processed. During a dialog, if the only legitimate transition command is a date, a date grammar is provided to match the caller's response and assign a meaning to it.

Dynamic grammars are created on-the-fly. A restaurant's menu may have many static items for static grammars, but may also have specials for which dynamic grammars are used. When a user wants to order the special, his speech input may be checked against the dynamically created grammar.

Figure 17:
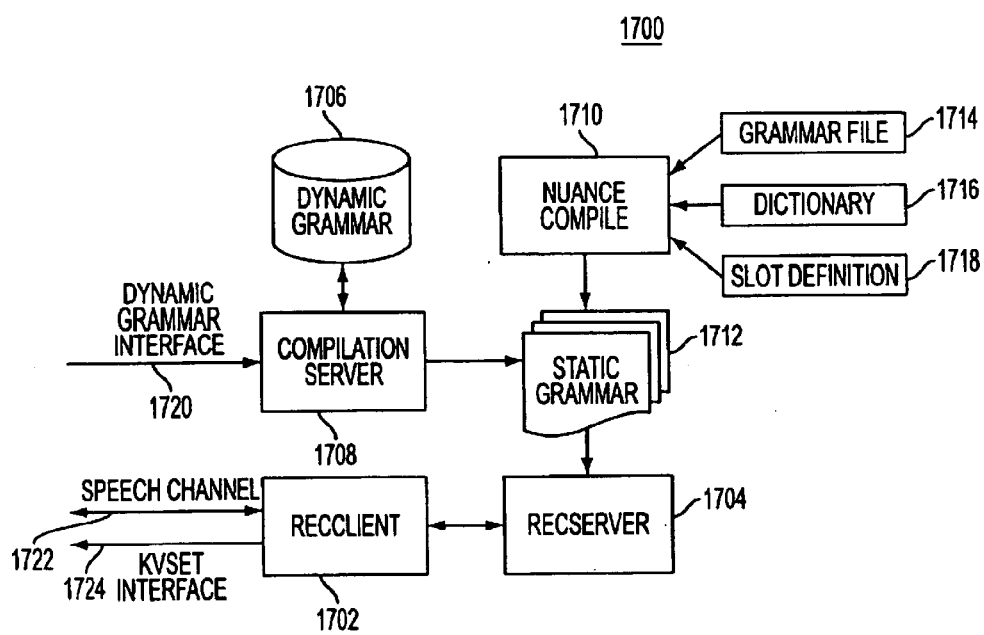
FIG. 17 depicts an embodiment of speech recognition modules according to an embodiment of the present invention.

According to one embodiment an ASR system as depicted in FIG. 17 may be used. A Nuance Communications or Speech Works system may be used, for example. The ASR 1700 comprises a RecClient 1702, a RecServer 1704, a dynamic grammar repository 1706, a compilation server 1708, a compiler 1710, static grammar 1712, grammar files 1714, dictionary files 1716, and slot definition files 1718. Also, a dynamic grammar interface 1720 may be provided. The RecClient 1702 outputs a speech channel 1722 and a KVSet Interface 1724.

A grammar file 1714 comprises a text file (e.g., written in Nuance Grammar Specification Language or called Java Speech Grammar Format) that contains information about what words are recognized by the application and what values to return. A Nuance Grammar Specification Language specification may be used to create this file.

Dictionary 1716 may comprise a set of words in a given language and their associated pronunciations. Slot definition 1718 may comprise a text file that specifies the slots/variables that may be filled by sentence processing. Compiler 1710 comprises a onetime executable that takes the grammar file, the dictionary, and the slot definitions and compiles it into a static grammar file 1712 that may be utilized by the RecServer 1704. The static grammar file may contain pre-defined places where dynamic word/words may be inserted at run-time.

Dynamic grammar repository 1706 may comprise a file system or relational database that holds compiled dynamic grammar phrases for insertion into the static grammar. Compilation server 1708 may comprise a server process that takes grammar fragments and compiles them into binaries that are stored in the database. Typically each dynamic words take 40–60 bytes of storage. RecServer 1704 takes the compiled static grammar 1712 and user input and converts it into a RecResult.

RecClient 1702 is a process through which the speech channel interfaces with a RecServer. Multiple RecCients may be running on different machines across the network. The operation of these elements may be according to Nuance Communications specifications and modified for the particular VPages and content output by the VNAP.

Voice browser 35 also cooperates with a text-to-speech module 37. Text-based voice content may be passed from a VPage to this module along with personalized speech settings from personalization module 40 to convert text into speech and return the voice content back to voice browser 35 for delivery to the user. Such content is preferably delivered as a monaurel, sampled at 8 KHZ (telephony standard), with fidelity on the order of 8 hits per sample.

Content retrieval module 32 accesses VNAP database(s) 18 to retrieve a VPage and pass that to voice browser 35 to be presented to the user. Once a VPage is located, permissions are passed onto authentication module 45 and billing information specific to this page is passed onto billing module 46. The VPage is then retrieved from a source also specified in the VCode registration system 24. The content source may be from an internet source, a file server or a database. Also, when VPages reference a standard audio clip, the audio content may be retrieved directly from the network (direct network access) by this module. To speed up information retrieval, content retrieval module 32 may also cache frequently hit VPages. The cache may be searched before the VCode registration module 24 when retrieving a new page.

Through the use of the present system, voice and other content may be delivered on demand to users at the time they desire and in the manner in which they desire, without sitting at a computer.

To illustrate the process and use of this system, an example may be provided. In this example, a Mr. Bean desires to access a VNAP system in order to increase his enjoyment of the Smithsonian Institute's art gallery. As described above, Mr. Bean may have already subscribed to the VNAP service through a subscription interface module. And is now ready to take a cyber tour of the art gallery using a mobile telephone. As shown in FIG. 9, upon approaching a particular painting in the art gallery, Mr. Bean is provided the opportunity to contact the blackbird VNAP in order to receive information about the paintings in the gallery. Labels are placed at the bottom of each painting in the Smithsonian to enable the user to easily identify the VCode and VName for the particular painting.

Accordingly, the following sequence of events may represent an example of a dialog between Mr. Bean and the VNAP system (here called Blackbird).

1. Mr. Bean notices the labels on each of the paintings in the hall. He dials the 1800-BLACKBIRD number to enter the Blackbrid voice-network. This starts his session.

2. Mr. Bean enters the five-digit domain-code for the Smithsonian Art Gallery. (He could have just asked to be connected to the "Smithsonian Art Gallery.")

3. His personal cyber-guide on Blackbird welcomes Mr. Bean to the Gallery, asks him to specify his language preference and then instructs him to enter the item number (this is the same as the VPage identifier).

4. Mr. Bean enters the four-digit item code or says "Water Lilies."

5. Blackbird starts reciting the details on Monet's Water Lilies.

6. Due to static, he misses some of the information and requests Blackbird to "Rewind" and "Start" from any point he wants.

7. Blackbird finishes up with Monet's details.

Blackbird: Would you like to buy a poster of "Water Lilies?"

Mr. Bean: No.

8. When he walks over to Van Gogh's "Sunflowers," Mr. Bean decides he doesn't want to hear more about Monet and asks Blackbird to "Stop" and take him to "Sunflowers."

9. After listening to the explanation, Cyber-Guide prompts him again for a poster purchase.

Blackbird: Would you like to buy a poster of "Sunflowers?"

Mr. Bean: Yes.

Blackbird: Would you like a small, regular or large size poster? Say "help" if you want details on these sizes.

Mr. Bean: Large.

Blackbird: Will the poster be in the name of John Bean?

Mr. Bean: Yes.

Blackbird: Would you like to use your American Express Gold?

Mr. Bean: No.

Blackbird: Would you like to use your First Union Visa?

Mr. Bean: Yes.

Blackbird: Thank you very much for your transaction, Mr. Bean. You can pick up your poster from the Smithsonian Gift Shop on your way out. For mailing options, please say "MAIL" or press 1 now.

Mr. Bean: Continue.

Blackbird: Would you like to link to other museums in Washington D.C. that have the works of this artist?

Mr. Bean: Yes.

10. Mr. Bean navigates in different museums and finds out what paintings of this artist they have and obtains directions to the ones he is interested in.

Use of the system by Mr. Bean provides numerous advantages. Mr. Bean is able to get into the voice network by simply dialing a telephone number on his cell phone. There is no need for additional software or hardware to retrieve information. The connection process makes no assumption about Mr. Bean's background, other than the ability to dial and speak or input into the phone using the touch tone keys. The system is temporally and spatially flexible. He is able to access information at the right time and in the right place. As he walks by Monet's Water Lilies, he is listening to a cyberguide talk about this particular painting. The system does not require waiting time involved and information retrieval or obligations to be in a specific location. For example, requiring a room with a computer and a network jack. Further, the system is responsive to Mr. Bean's inputs for more information or to purchase items relating to the painting. He is able to manipulate the session, make requests, and receive real time response that is typical of human interactions. He is also able to stop and restart the audio information flow, as well as rewinding to hear specific points again. Words like stop, rewind, and skip are parts of a global command suite that is activated in every VPage in the VNAP system. The customer is able to get even more value out of a cyberguide than he would from an actual tour guide by purchasing a poster. Conducting transactions is beyond the job description of an actual tour guide, who is responsible for walking visitors around and giving them detailed information on the items. By incorporating transactions in the job description of the cyber tourguide, the VNAP system adds value to the customer's experience.

The system is also personalized to the customer. At the point of transaction, the customer need not specify his name, his credit card number or his mailing address. This information has been provided as part of the subscription profile, which the user created when he subscribed to the VNAP system. The VNAP system recognizes and authenticates his cellular telephone number at the beginning of the session and retrieves his credit card information as he is purchasing the poster. At the subscription phase, the customer specified all credit cards to which purchases for VNAP products would be charged. During transaction processing, the customer is able to choose from the selected credit cards to make the purchase. Alternatively, or in addition thereto, the customer may input only one credit card, and all purchases using the VNAP system would be charged to that one credit card.

Content providers benefit from the system by being able to extend their content out to anyone who has access to a telephone. The content may be displayed in any language, any order and any pace to suit the needs of the visitor. This flexibility, along with the ease of use, increases the number of customers that the content provider can reach immensely. In order to achieve the same level of service with regular tour guides, as in our Smithsonian example, the Smithsonian would have to employ hundreds of people to serve each visitor personally which is a costly and redundant prospect. Content providers would benefit in various areas to generate revenues. In the Smithsonian example, the Smithsonian or a museum benefits by transitioning from using tour guides to cyber guides, thereby reducing or even eliminating the costs associated with tour guide personnel. Also, the museum may generate revenue by charging the visitor on a permanent or other time based or per page based basis. Also, the museum executes transactions through the cyber guide and asks visitors to pick them up from the gift shop. This has several implications. People who do not have time to go into the gift shop can order items on the voice network and get them mailed to their home address. And also, by attracting visitors into the gift shop for pickups, more revenue may be generated by the users having visited the gift shop and purchasing additional items. Further, the system is easy to deploy.

In order to create a VPage, the content provider creates a menu structure on the content creation interface and fills in the structure with audio or text content. Audio content can be displayed as it is and a text to speech engine may be used to convert text into voice. Modifications to the content may be made any time over the phone by individuals with administrator privileges for that particular content provider. In this way, the content provider may update content easily when a new item arrives or the information on an item becomes obsolete. The system of the present invention provides a mechanism of standardizing the service that content providers' visitors receive. Ordinarily the quality of service provided by tour guides, for example, may vary along time and among different tour guides. By offering the same cyber guide experience to all customers, the content provider ensures a more consistent customer experience thereby improving the changes for customer satisfaction.

Figure 5:
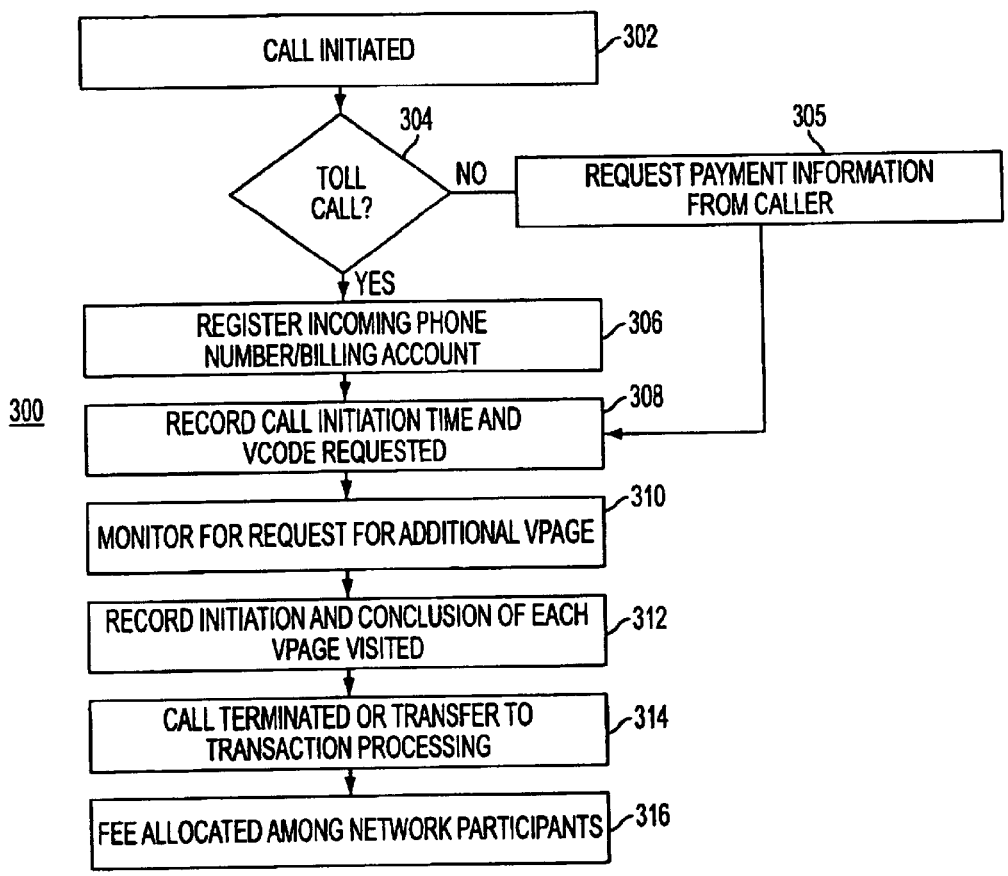
FIG. 5 depicts a schematic diagram of a method of allocating fees collected from users to content providers according to an embodiment of the invention.

A method of monitoring usage for billing purposes as method 300 is depicted in FIG. 5. In method 300, the first step is the initiation of the call in step 302. Once a call is initiated, VNAP system records the phone number through a phone number recognition system, or requests the entry of the phone number or account number from the user. If in step 304 it is determined that it was a toll call, then the processing continues to 306. If it is a toll call, the fees received by the VNAP may be based on the toll rate charged. If, however, the billing is to be set up through a credit card or other means of payment, then processing passes to step 305 to request payment information from the caller. Any method of providing payment over telephone that is acceptable within the area in which the system is operating may be used, including credit card, electronic checks, certificates, or an account through pre-registration system 47. If the call is a toll call, then in step 306, the incoming phone number and billing account are established and the time of the call is recorded in the database associated with the billing module. After processing in either step 305 or 306, in step 308, the call initiation time and the VCode requested are specified. The VCode is identified in order to identify and allocate the fees received amongst the various entities entitled to a portion of the fee, including the VNAPs, content providers and/or the VCode host sites. In step 310, the billing system monitors for the request of an additional VPage. And if such a page is input in step 312, the initiation time and conclusion time of each VPage visited are recorded. Next, in step 314, when the call is terminated or transferred to transaction processing, then the billing period is terminated. The time that the billing period is terminated is recorded in the database and then in step 316, the fee is allocated amongst the VPage owners visited, the VNAP, the VCode display hosts, and/or others according to a predetermined arrangement.

As discussed above, any number of billing and/or fee arrangements may be used to generate and distribute revenues amongst the various VCode participants within the system. For example, a flat fee may be paid to each of the VPages visited, a pro rata fee based on the period of time a user participates in the system may be provided, etc. Each VPage may then allocate the fees it receives to the various VPages referenced therein according to a predetermined schedule and each VPage may then accordingly allocate fees to each VPage it has participating within its menu system based on a predetermined schedule. As such, content providers are given an incentive to participate because they receive fees for visitation to their VPage. Further, various entities may host VCode displays. Such entities may receive a portion of fees. The subject about which content is posted may also receive fees based on access to content.

Also, content provider may assign fees (either dollars or units) for their VPages. The VNAP then receives either a fixed amount from VPage revenues or an amount at a fixed rate that is directly proportional to the revenues of the content provider.

Further, in all of the embodiments discussed, the fees charged/paid may vary according to various factors, including the time of day, the size of the VPage, the amount of data accessed within any VPage or VBook, or any other variable.

One example of how a content provider may generate revenue is provided with respect to FIG. 13. FIG. 13 depicts a dialog tree for a content provider (named Sue) for a voice-based restaurant guide. Sue is a recent college graduate, who has spent much time traveling in the East Coast and exploring different restaurants. To take advantage of her detailed restaurant evaluations, she develops a new business plan that involves putting her content online. She thinks that instead of buying a city-based guide for every single location, people might prefer to have a single source for restaurant consultation wherever they go. As a starting point, Sue picks Boston and develops content for restaurants in Boston. Sue subscribes to a VNAP system, such as one named the Blackbird system. She also acquires a VPage and VCode for "Sue's Restaurant Guide." Going through the content creation interface numerous times, Sue creates VPages for 40 different restaurants in Boston. For each VPage, Sue uses the dialog structure as depicted in FIG. 13. In addition to each restaurant VPage, Sue also creates a main VPage such that users can search restaurants by location, name, food type or cost. She organizes a separate dialog tree structure for these menu options. Sue chooses to charge 200 for each minute a user spends listening to her content. In order to facilitate content distribution, Sue orders two kinds of brochures: one main brochure that lists all the restaurants along with their VCodes and VNames as well as other regional brochures that list only the restaurants that correspond to a particular region. Once she is done designing and organizing her content in her VPages, Sue needs to distribute her content and make sure it reaches many users. Since Sue has not yet acquired a reliable reputation, she needs to distribute her content via third parties, which have acquired a solid reputation. Sue realizes that content distribution is as important as content creation to be successful on the VNAP. Sue hands out her brochures to travel agencies, travel guides, newspapers, magazines and local businesses. She also gets in touch with key VPage owners to acquire a link out of their VPages. To do all of these, Sue offers commission to some of these third parties. Various users start to find out about Sue's Online Restaurant Guide. Sue starts generating revenue. Once she has a consistent user base, Sue may choose to reduce or eliminate third party involvement partly and generate even more return. Sue starts the restaurant guide up in other cities and using different languages.

In this example, each subscriber may be subject to a credit-billing model. Each minute spent on a VPage by default may cost one credit, which is a direct payment to the Blackbird VNAP. With the default setting, content providers do not receive any income out of their VPages. The dollar value of one credit may be fixed, although subscribers who plan to purchase many credits at once may receive discounts for the credit rates.

Figure 14A:
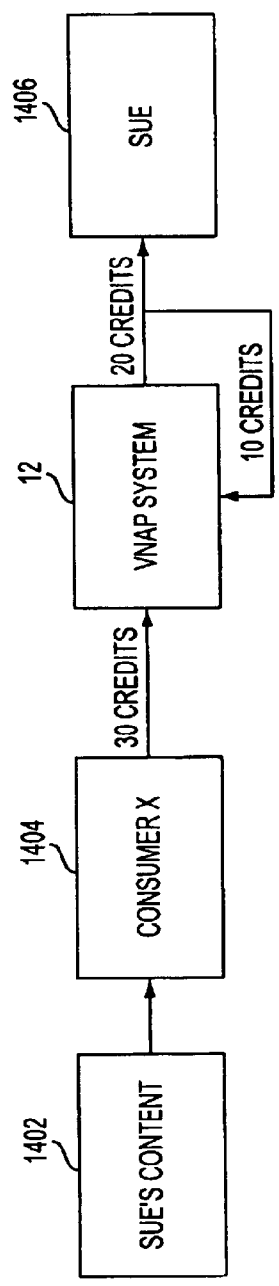
FIG. 14a depicts a flow diagram of revenue generation in VNAP system according to an embodiment of the present invention.

If content providers, like Sue, want to be compensated on a per minute basis, they declare their charge per unit to be more than one credit as described above with reference to FIG. 10(a). Subscribers may receive a single bill from Blackbird for the content they retrieve on the VNAP. The VNAP takes out its share that is equivalent to one credit per minute. The rest of the payment may be directed to the content provider. A payment example is depicted in FIG. 14(a).

If Sue is charging three credits per minute when Mr. X spends 10 minutes per pay period listening to Sue's restaurant evaluations, Mr. X is charged for 30 credits for Sue's content only. The VNAP system sets aside one third of this payment for network compensation and sends the rest to Sue. Thus, Sue's content 1402 is provided by the VNAP system 12 to consumer X, who pays the VNAP system 12 thirty (30) credits. The VNAP system 12 then pays Sue (1406) 20 credits and retains 10 credits. With the VNAP system 12 as the central billing mechanism, subscribed users receive one billing statement from that VNAP. The mechanical details are taken care of at this central billing unit so that content providers collect their shares every pay period without having to worry about billing details.

According to another embodiment, content providers may resell their VPages for use by other VPages. A content provider may agree to sell his content to another content provider. This is called content resale. A provider, who uses content that belongs to someone else, may share his revenues from that content with the original owner. The rate for sharing is specified by a content owner as he creates the VPage. Content that is duplicated with the permission of the owner is called derived content.

The VNAP system may hide the details of resale calculations from the content provider. Incorporation of the resale ability into the system does not change anything from the point of view of users or content providers. The VNAP's central billing unit may split the payment such that all derived content providers and content owners are compensated properly.

Figure 14B:
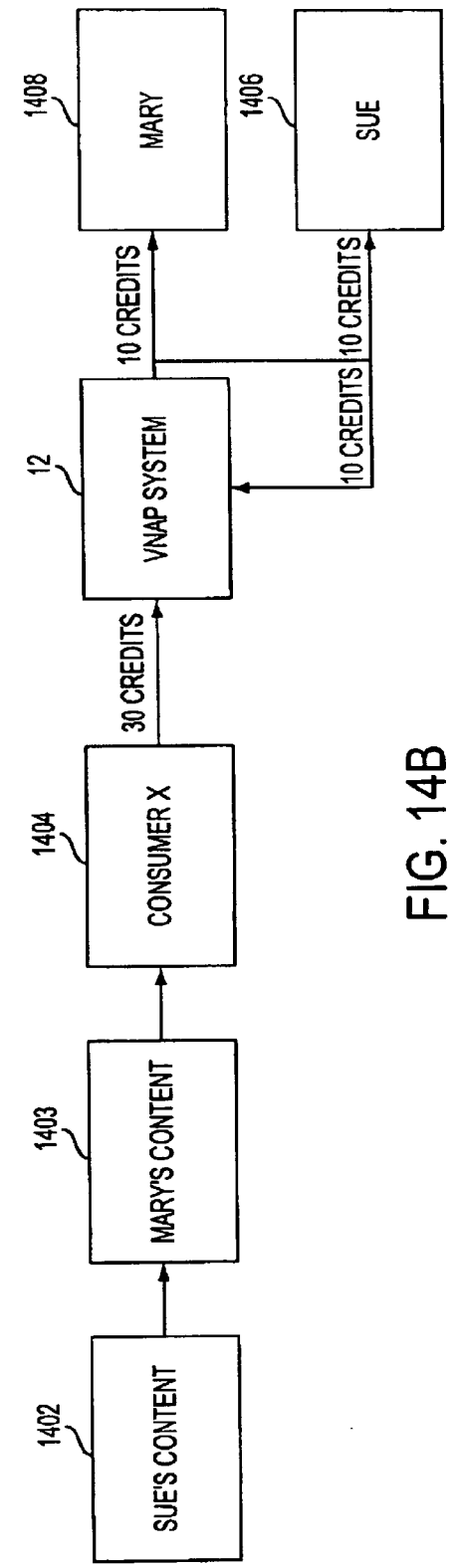
FIG. 14b depicts another embodiment of a flow diagram for revenue generation in a VNAP system according to the present invention.

In the example above, Sue may resell her content for additional revenue. Seeing how successful Sue has become with her Blackbird restaurant guide, Mary hopes to use part of Sue's content in her Blackbird hotel-guide for hotel restaurant evaluations. Sue agrees to do this only if she receives half the share, and she specifies her resale rate to be 50% for each of her VPages. Just like Sue, Mary charges users three credits per minute. This time of those thirty credits, 10 go to Blackbird, 10 goes to Sue as the original content owner, and the remaining 10 credits go to Mary as her revenue, as depicted in FIG. 14(b).

Figure 15:
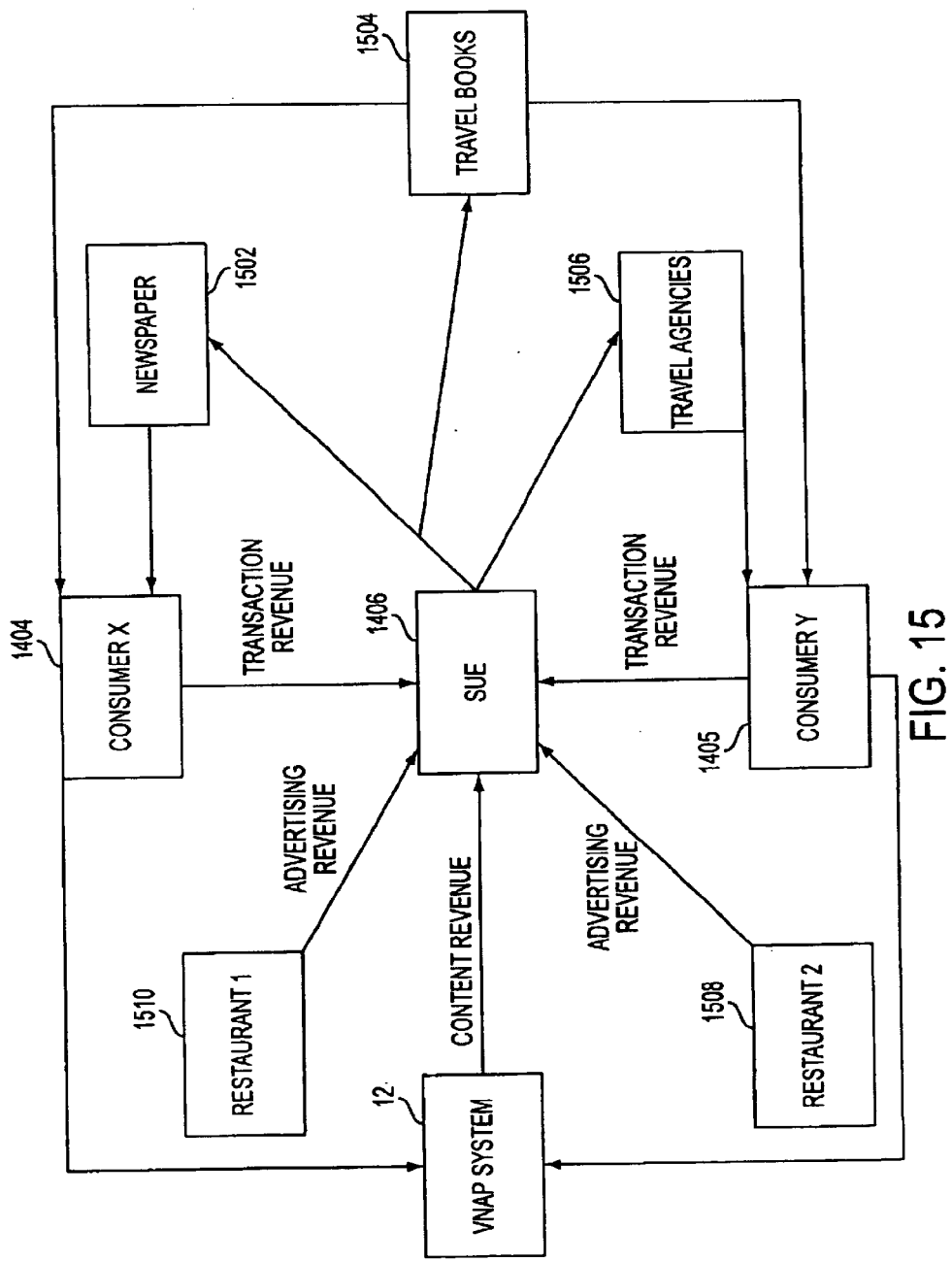
FIG. 15 depicts an overall flow diagram of revenue generation according to another embodiment of the present invention.

Accordingly, Sue's content 1402 feeds Mary's content 1403. Mary's content is provided to Consumer X 1404 who pays VNAP system 12 thirty (30) credits. VNAP system 12 pays Mary and Sue 10 credits and retains 10 credits. An overview of Sue's revenues and costs is depicted in FIG. 15.

Sue's costs consists of the commission she pays to third parties for distributing her content. Through these third parties Sue's content reaches her user base. Users make their payments to Blackbird for visiting Sue's VPage. Blackbird takes its share from the payment, adds derived content returns and sends Sue her content revenue. Sue also receives direct revenue from users through transactions and advertising revenue from restaurants.

In order to distribute her content, Sue used third parties such as travel agencies 1506, travel books 1504, newspapers and magazines 1502. The third party selection is solely based on what channels Sue thinks will best accommodate her content. Therefore, she may pick and agree on a commission rate for each distribution channel she is working with and may distribute parts of her total revenues to all the distribution channels. Content revenue is the amount the VNAP system 12 (here Blackbird) returns to the content provider. Content revenue is what is left after the network charges are taken out and the resale shares are added to the subscriber payments to Blackbird for Sue's VPages.

Revenues generated by conducting transactions with users are provided from customers 1404 and 1405. Sue may ask her users if they want to buy a written version of her restaurant guide. If they agree, she could directly charge her content users and mail them a copy of her booklet. The VNAP system 12 may have little or no involvement in this type of revenue flow.

When Sue makes reservations at restaurants for her users, she is helping restaurants generate revenue. For each reservation she makes, Sue may collect a share of the restaurant's profits, defined by a preset commission rate. The Blackbird infrastructure facilitates transaction revenue generation by providing interactive and personalized VNAP services. This revenue, from restaurants 1508 and 1510, may or may not be shared by VNAP system 12 according to various embodiments of the present invention.

According to another business model, users may access the VNAP free of charge. Revenue may be generated through advertising or by charging VPage providers to make their content available. As discussed above, VAds may be included in VPages and the system may generate revenue from these VAds. The Ads selected may be customized to the content generated in the VPage. The distribution of the advertising fee may take various forms. An advertising fee may be paid to the VNAP when the VNAP includes an advertisement in a VPage (even if it does not notify the content provider). Also, an advertisement may be paid to the voice content provider when that content provider selects to include an ad in its VPage. Ad revenue may also be shared when the VNAP acts as an advertising agent to match advertisers with content providers and the content provider agrees to include an ad in its VPage. Also, premium VPages may charge users a fee but general access to the system may be free. For example, a yellow pages site may provide directory lookups for free but charge the user for turn-by-turn directions. Additionally, the VNAP may charge both the users and the VPage providers. Other permutations of payment and receipt may also be provided amongst the various participants in the system.

Figure 6:
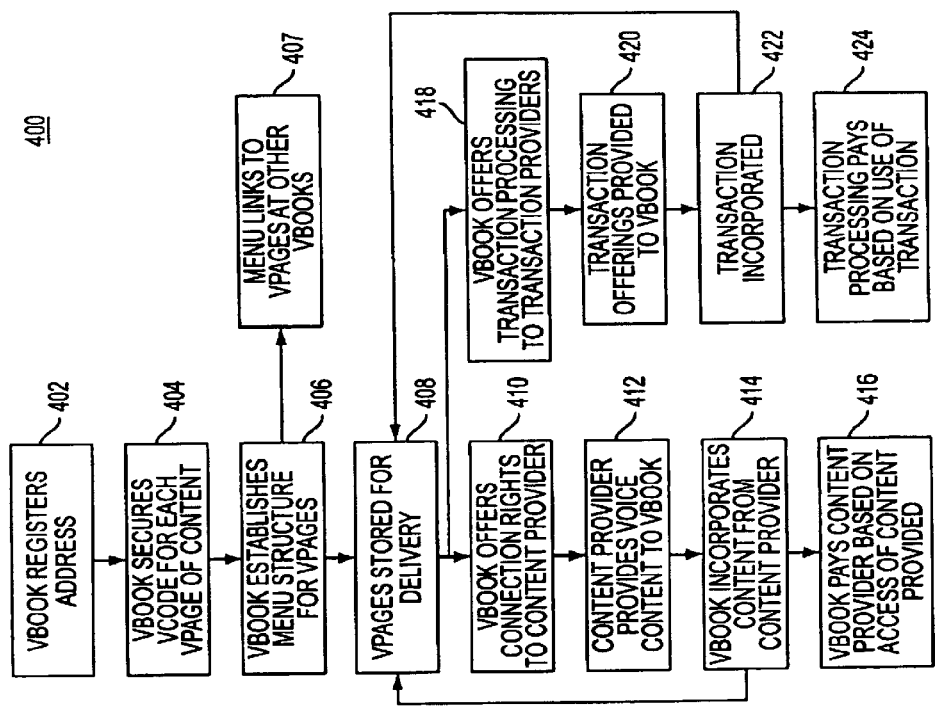
FIG. 6 depicts a schematic diagram of a method of providing content and transaction processing for VPages according to an embodiment of the invention.

FIG. 6 depicts a method for content providers to provide content to be included at one or more VPages and then provide it as VPages within the VCode system. In step 402, a content provider that desires to participate in the VCode system registers an address on communications network 20 for a VBook, i.e., one or more VPages. The address identifies the location within the network where VNAPs can locate and retrieve files from the particular content provider. VPage registration system 24 may be used to store a unique address for each VPage within the communications network. A uniform registration system may be provided throughout the VCode system to avoid duplication and other problems associated with having multiple registration systems. Also, multiple registration systems may be provided, however, a synchronization method may be utilized to ensure that unique addresses are issued by the various registration systems. For example, each VPage registration system may have a series number that it issues so that the number or address of the VPage never conflicts. In step 404, the VBook secures a VCode for each VPage contained in that VBook.

Next, in step 406, the VPage establishes a menu structure for the VPages to be operated by the VPage organization system 56. Specifically, each VPage may include a reference to one or more other VPages, some of which may be from that VPage, and others of which may be from another VPage. For the VPages within the VPage, an organizational structure may be established in order for the VPage to be able to locate and store the VPages in a quick and efficient manner. In step 407, the links to VPages at other sites may be recorded so that VPage may pass along the location of a referenced VPage at another location when a user selects an option addressing that VPage. In step 408, VPages containing voice content are stored in a database associated with the VPage for later delivery. Next, step 410 or step 418 is executed. In step 410, the VPage offers connection rights to content providers. As part of this process, content providers may contract for payment of fees for providing information based on the amount or per usage of the VPage by users. ID step 412, the content provider provides voice content to the VPage which in step 414 is incorporated into one or more VPages. The VPage then created is stored for delivery in step 408 and the cycle continues. Finally, in step 416, the VPage may pay the content provider based on the access of the content provided. Alternatively, in step 418, the VPage offers transaction processing to a bunch of transaction processors. In step 420, the transaction offerings are provided to the VPage and in step 422, the transactions are incorporated into one or more VPages which are then stored for delivery in step 408. Finally, in step 424, the transaction processing companies pay a fee back to the VContent provider and/or VNAP based on the usage of the transaction.

In one embodiment, a content provider may process transactions for a second transaction content provider. These two content providers may share the revenues generated by the transaction. For example, the Washington Post VPage may sell Yankees T-shirts to users as part of a Yankees VPage reporting on a recent game. The Post and one T-shirt seller may share the revenues from the sale of that T-shirt.

In one embodiment, transactions processed through the system of the present invention may use the credit card information in the user's profile. The system may also use any other form of payment specified by the user either in the user's profile or specified by the user on-line, including as bank account, electronic check, wire transfer or other payment. Additionally, as discussed above, the VNAP system may operate through charging credits for VPages. These credits may be purchased by the user for different amounts, for example, depending on the volume purchased. Fifty credits may cost twenty dollars whereas five hundred credits may only cost one hundred fifty dollars. In this embodiment, the credits may be used to complete a transaction as well. For example, a site may provide for movie ticket purchasing and the user may pay for the movie tickets using VNAP credits purchased from the VNAP system. The content providers and transaction processors are then paid based on the value of the credits received by the VNAP.

For the use of the system described, a business model based on sale of information for provision over a voice network is created. Users pay a VNAP who provides access to VPages with a vast amount of information that is deliverable on demand based upon the simple input of a VCode associated with a product, a service, a site, or any other object or thing about which a user may desire information. Further, because of the penetration in mobile phones throughout the world, users may access this system without requiring purchase of new equipment and therefore an improved system of information on demand as requested is provided.

Various examples of how this system may be used are provided below.

Figure 19:
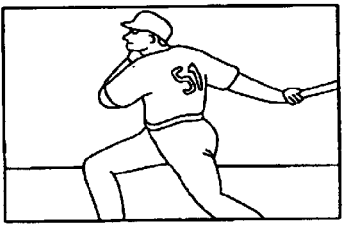
FIG. 19 depicts an example newspaper incorporating VCodes according to an embodiment of the present invention.

Jack is a subscribed Blackbird user. Blackbird services have become a part of his daily life due to the voice network incorporation into newspapers. Every morning, Jack skims through the Washington Post and pinpoints the articles that he needs more information about. A typical Washington Post page in this example may look like FIG. 19.

Jack missed the Yankees-Boston game and is ready to find out all the details. He connects to Blackbird and enters the VCode for the relevant article (V 38373-272). Once he dials this number, Jack is on the Washington Post VBook and to navigate between articles, he only needs to dial the three digit VPage identifier codes. The dialog between Jack and the VNAP system 12 may be as follows:

Blackbird: Would you like to replay important sections from the game or hear interviews?

Jack: Interviews.

Blackbird: Would you like to hear an interview with Bernie Williams?

Jack: Yes.

Upon this request Blackbird replays an interview recording with Bernie Williams. It is a five minute long interview and Jack just needed to hear the first three minutes.

Jack: Skip.

Blackbird: Would you like to buy a Yankees T-shirt or hear an interview with the Yankees Manager, Joe Torre?

Press 1 for a T-shirt. Press 2 for the interview.

Jack: I would like to buy a t-shirt please.

Blackbird: Would you like a blue, black or white t-shirt?

Jack: Blue.

Blackbird: Would you prefer short-sleeves or longsleeves?

Jack: Long-sleeves.

Blackbird: What size T-shirt would you like? Our sizes are small, medium, large and X-large.

Jack: Large.

Blackbird: Can I charge this to your Mastercard?

Jack: Yes.

Blackbird: Can I mail the T-shirt to your house or would you like it pick it up?

Jack: Mail to my house.

Blackbird: Thank you very much for your time. You will receive your T-shirt in a week.

Jack may reply to Blackbird in full sentences. The speech recognition technology described herein parses the sentence to identify words that are actual transition commands for different menu options. For instance, when Blackbird asks Jack whether he wants his T-shirt to be mailed or picked up, the answer is parsed to look for the word "mail" or "pick." If Jack had not used either of these words, Blackbird may rephrase the question by giving Jack the touch-tones for his options.

At this point, Jack may desire to move onto a different article. He dials 278 to connect to the information on "The Game."

Blackbird: Place a bet and win $1,000. Guess the scores for tonight's game between LA Lakers and Chicago Bulls.

Would you like to place a bet now?

Jack: No.

Blackbird: Would you like to get tickets for this game or connect to expert evaluations for both teams?

Jack: I would like to listen to evaluations.

Blackbird brings up fragments of interviews with sports columnists and coaches.

Jack hangs up and keeps looking through the Washington Post. If he calls Blackbird again, he will directly be connected to the Washington Post VBook. In one embodiment, the VNAP remembers the last VBook visited and connects to it in the next call so that connections that are cut off accidentally or temporarily return to where they were. The sports page scenario for Jack may be repeated with the business page, classifieds, etc. Jack may dial the stock market VCode to retrieve detailed information about specific companies or he can dial the VCode associated with a car sale in the classifieds to get more information from the car owner himself.

In this example, Jack benefits by receiving a wide variety of information at his own discretion. He can manipulate his own Washington Post experience the way he wants. Jack can conduct transactions through his newspaper without having to go to a shop. Jack is also able to retrieve real-time voice information like interviews, parts of games, concerts, etc.

The Washington benefits because it may not pay to provide VPage content. Washington Post may assign a minimal charge for extra information retrieval on the VNAP. This way it can generate additional revenues by attracting readers to the VPages using lotteries, live recordings, etc. The VNAP system enables Washington Post to carry out transactions. In most cases, Washington Post may be some other content provider's third party distribution channel. This way Washington Post may acquire parts of transaction revenues as well as referral fees for directing readers to specific VPages. (i.e., VPages of classified ad owners). Washington Post delivers more information without actually printing it. This allows better allocation of resources for audio content that is normally converted to text and placed on a shelf.

In another example, Jack wants to buy new speakers for his stereo. He is not very familiar with his options so he goes to Stereo Store to look around and make a selection. In Stereo Store, every item has a distinct VCode and a VName associated with it. Before items are sold, the VPage for each item gives customers the sales pitch and detailed information on what distinguishes this item from others in the market. Once the item is sold, content on the VPage is automatically updated to contain personalized setup and warranty information. Ultimately, the same VPage may serve the customer both pre and post sales.

When Jack arrives at Stereo Store, he is very confused due to the huge variety of speakers. Jack may just go up to a speaker and dial its VCode directly to retrieve the information specific to that speaker. Instead, he dials 43956 to connect to the Stereo Store domain.

The dialog for this example may be as follows:

Blackbird: Hello Jack. Welcome to Stereo Store! What type of product can I assist you with today?

Jack: Speakers.

Blackbird: Do you have a budget constraint?

Jack: Yes.

Blackbird: Enter the most you are planning to spend on speakers.

Jack: $700.

Blackbird: Do you prefer upright, bookshelf or surround system speakers?

Jack: Bookshelf.

Blackbird: Do you want a subwoofer?

Jack: Yes.

Blackbird: Do you want a built-in subwoofer or separate?

Jack: Built-in.

Blackbird: Our top three recommendations are Platinum Reference Speakers, Polkaudio R300 and Aerial 10T. Select one of these to locate them in Circuit city and retrieve information.

Jack: Polkaudio R300.

Blackbird: Polkaudio R300 is located in aisle three of the speakers section. Please say "Continue" when you find Polkaudio R300 and we will connect you to the info center for this speaker.

Jack finds the Polkaudio speakers. Now he asks Blackbird to continue. Blackbird links to the Polkaudio R300 VPage.

Blackbird: Welcome to the Polkaudio R300 Information Center. If you would like to have an engineer guide you about the technical details of the R300 speakers, press 1 or say "engineer" now. If you would like to talk to a customer who has used Polkaudio 300 before, press 2.

In this dialog, when Jack says "Continue," the domain page links to the Polkaudio R300 VPage. At this point, Jack may find out about all the product details on a level that he prefers. Talking to an engineer may give him the technical strengths and capabilities of the speaker. Talking to a previous customer may give him a more practical view.

After listening to his other options, Jack decides to buy the Polkaudio R300 Speakers. At this point Jack can either go up to the cashier to pay for his purchase or he can just pay for it on the phone through the VNAP system and setup a time for delivery. Jack may also do so on his way out, in his car or later.

If Jack has setup and configuration problems, he dials into the VNAP system. Now that this item is sold, the content is updated to include setup directions instead of sales information. It also includes links to other products that Jack purchased along with his speakers. The VPage, therefore, becomes a personal helper for Jack.

Jack can either go through the setup helper on the phone and setup his speakers or he can schedule a time so that a Stereo Store technician can come to his house and do it for him. If Jack has a specific question, he can leave a message and wait for a representative to call him back. If he forgot to buy a certain cable that is necessary for connections, he can order this piece. Jack can also navigate between different products that he has purchased. Stereo Store can design the content for its product pages such that the content answer most frequent customer questions.

The VNAP may also have VPages for service and warranty questions. If jack has problems with his speakers, Jack connects to his personalized Polkaudio VPage and inquires about the warranty. The dialog may be as follows:

Blackbird: Hello Jack. Your warranty has not expired yet. Are you having problems with your Polkaudio R300 Speakers?

Jack: Yes.

Blackbird: Would you like to troubleshoot online or would you like to get it repaired?

Jack: I would like to get it repaired.

Blackbird: Would you like someone to pick it up for an extra charge of $40?

Jack: No.

Blackbird: The nearest Stereo Store technical support offices around your house are 2345 Maple Drive and 3377 Randolph street. The one office close to work is 49 Lincoln Drive. Select one office.

Jack: 2345 Maple Drive.

Blackbird: Would you like to have directions to this office? Jack: No.

Blackbird: A technical support representative will call you from home or work within 24 hours to setup an appointment.

Therefore, the same VCode associated with the speakers helps Jack to make his choice at the point of purchase, go through setup at home and consult about warranty when the speakers are broken. This allows Jack to be a much more self-sufficient consumer. The domain page points Jack to the options that he is really interested in by narrowing down the speakers catalogue in light of Jack's conditions. This saves him the, time of going through all speakers before he hits one that he likes. After the sales, Jack receives personalized information allowing him to navigate between the products he purchased and pulling out the nearest tech support offices to home and work.

The store benefits because it is better able to standardize the quality of service to all customers. The store is able to increase revenue by charging for the service on the phone. By providing relevant links from personalized product VPages, Stereo Store may establish resale or referral alliances by other companies.

In another example, Jack is also subscribed to personalized and proactive intelligence agent, such as strategy.com provided by the assignee of this invention. He receives a scheduled service every morning that gives him the traffic updates on his way to work. Blackbird includes links to VPages of cab companies or pages that can dynamically generate new routes. Jack is in his car, when he receives a call from his proactive intelligence agent, which notifies him of a traffic jam on his way to work and tells him that he can connect to Blackbird to look into alternative roots. Jack dials into the local Blackbird traffic page. The dialog may be as follows:

Blackbird: Hello Jack. Currently, there is heavy traffic on Route 7 West due to an accident. Would you like to look into another way of getting to work?

Jack: Yes.

Blackbird: Take Route 66 from your house in Ballston to exit 64. Route 66 is moderately congested. Then take 495 North to Tysons Corner. 495 is clear. Then right on Route 7 East till Tycon Towers. Would you want to hear an alternative way?

Jack: No, thanks.

Blackbird: Would you like to find out more about the accident?

Jack: Yes.

Blackbird: A bus and cab were involved in the accident that took place at 8.05 am on Leesberg Pike. Two people were seriously injured. Congestion along 2 miles due to the accident.

Jack not only receives information about the traffic jam on his way to work but also a solution to this problem, namely another route that he can take to work as well as the details of the accident that caused the traffic jam. The ease of dynamic updates facilitates dynamic content maintenance and changes in links from the traffic VPage to a news VPage. This is a great example of how proactive and reactive intelligence systems leverage each other. If Jack had not heard from his proactive intelligence agent about the traffic jam, he would take his usual route without having to check for traffic in the VNAP system. Once he receives a warning, the VNAP system provides him with all the answers he needs.

The state traffic control provides the content that Jack accesses. Given a departure point and a destination, the content lists two or three pre-programmed routes that may be used to get from the departure point to the destination. These routes may comprise a combination of streets and highways that may take Jack from point A to point B. Since Jack already put in the information on his house and work locations during subscription, the traffic page automatically informs him on alternative routes along with the associated traffic parameters. The VNAP system enables the establishment of an absolutely efficient traffic system that allows drivers to change their routes before they enter a congestion zone. By providing this service to its citizens, the government or other traffic content provider secures the welfare of commuters and maximizes the safety and efficiency of traffic flow.

In another example, when Jack does his yearly health check up, he is given a VCode that he connects to within 24 hours to find out about the results of his tests as well as to set up an appointment with a doctor to discuss these results. The VNAP system includes links to different physician's VPages. Jack is not very happy about his cholesterol level and would like to see a cardiologist to understand the implications of this. He can hear reviews and biographies about all cardiologists on this page and setup an appointment by connecting to their VPages. This way Jack does not have to wait impatiently to pick the results up and depending on what part of the test results he is worried about, he can be introduced to all the cardiologists that belong to this particular hospital.

The VNAP system of the present invention thus provides for various types of interactions including: (1) non-personalized—static data—no transaction (Boy Scout leader example below); (2) non-personalized—static data—data transfer (Galileo restaurant example); (3) non-personalized—static data—transaction (National Museum of Natural History example); (4) personalized—static data—transaction (MoviePhone example); (5) personalized—dynamic data—no transaction (traffic updates example); and (6) personalized—dynamic data—transaction (stock quotes example). Examples of this type of interaction are provided below. Galileo restaurant example 1. User calls in to system and is authenticated.
2. User enters VCode associated with Galileo restaurant.
3. User presented with Galileo's main menu. Choices include: "about Galileo," "driving directions," "make a reservation," "sign the guest book." User selects "driving directions."
4. User is presented with three options: "from the northwest," "from the east," and "from Virginia." User selects "from Virginia."
5. User receives directions to 1110 21st St., NW, and is returned to the main menu. User selects "make a reservation."
6. User prompted to enter time. If space is available, his name and number is confirmed:
1. Will this be in the name of "Tiger Yu" or other?
2. Is your telephone "703-703-7030," "123-123-1234," or other?
7. Reservation confirmed; user returned to the main menu. User selects "sign the guest book."

8. System confirms name and address:
   1. Will this be in the name of "Tiger Yu" or other?
   2. User selects other; prompted to input a new name.
   3. Will this be at the address of "123 Route 123" or other?
   4. User selects other; prompted to input a new address.
9. Guest book signing confirmed; user returned to the main menu. User selects "about Galileo."
10. System begins to talk about Galileo, but user interrupts by entering in the VCode for Cornelius Talmage (see above).

Personal VPage Example:
1. User calls in to system and is authenticated.
2. User enters VCode associated with Cornelius Talmage
3. User presented with the Cornelius Talmage VPage main menu. Options include "contact Cornelius" and "what are his interests"
4. User subsequently navigates the static menu structure, learning more and more about Cornelius.
5. After hearing Cornelius' interests, the user hangs up.

National Museum of Natural History example
1. User calls in to system. Authentication is conducted.
2. User enters VCode associated with the Smithsonian Natural History Museum
3. User presented with main menu, instructed to either enter an exhibit number (from a sign in the museum; possibly a VCode) or choose from a (perhaps hierarchical) list. User elects "O. Orkin Insect Zoo, bumblebees" from the list of options.
4. User presented with the bumblebee exhibit menu. Options include "hear more about bumblebees" and "buy a book on bumblebees." User selects the former.
5. User hears about bumblebees for a minute or so. User looped back to the bumblebee menu. User selects to buy the book.
6. User presented with a transactional menu. After prompting for details such as quantity and shipping method, It confirms the name, credit card and shipping address:
   1. Will this be in the name of "Buck Swope?"
   2. Would you like to use credit card "First USA Visa," "American Express Optima," or "other?"
   3. Would you like to use shipping address "1705 Q St., NW," other shipping address, or pick the book up at the front?
7. The user has just bought a book about bumblebees.

MoviePhone example:
1. User calls in to system and is authenticated.
2. User enters VCode associated with MoviePhone.
3. User asked to browse by theater or title. User elects to browse by theater.
4. Usual ZIP code is confirmed: Would you like to use ZIP code "20037" or other?
5. User presented with a list of nearby theaters to select from. User selects "Cineplex Odeon Union Station 9."
6. User presented with a list of titles. User selects "The Mummy."
7. User presented with a list of showtimes. User selects "7:01 pm."
8. User asked how many tickets he or she would like to purchase, and selects "3."
9. It confirms the credit card: Would you like to use credit card "MBNA International MasterCard" or "other?"
10. The user has just bought tickets to The Mummy.

Traffic updates example.
1. User enters traffic VCode
2. As it is after noon, the system gives the personalized evening commute: "Hello, Mr. Sparkle. Interstate 66 is <congested>. US 50 is <heavy traffic>. Chain Bridge Road is <moderate traffic>. Frederick Scott Key Bridge is <clear>. Roosevelt Bridge is <heavy traffic>. Arlington Memorial Bridge is <moderate traffic>. Rock Creek Parkway is <clear>."
3. User is presented with options including "new road." User selects "new road."
4. ZIP code confirmed: Would you like to use "20007" or other?
5. Other is selected, and the user is prompted for a new zip code. User enters 20817.
6. User is presented with a list of possible roads: "Valid roads in your vicinity are: Beltway, Clara Barton Parkway, Wisconsin Ave., Bethesda, Wisconsin Ave., DC, Connecticut Ave., Beltway Area, Connecticut Ave., DC."
7. User selects Beltway, and hears "<moderate traffic>".

Stock Quotes example:
1. User is connected to system (has already authenticated himself and is browsing other audio content).
2. User interrupts and enters the VCode for Yahoo! finance.
3. Yahoo! finance greets user with his personalized page: "Hello, Tiger! MicroStrategy, Incorporated is up 51¾ to 93¼. Leftorium Enterprises is down 7½ to 42. Your overall portfolio is up 0.78%."
4. Options presented to the user include "team more about MicroStrategy, Incorporated," "learn more about Leftorium Enterprises," "get another quote," and "buy stock." User selects "get another quote."
5. User prompted for input. In some manner (DTMF, ASR), he or she enters "T."
6. User receives quote for AT&T: "AT&T is up 4 to 9½."
7. Options presented include "learn more about AT&T," "get a new quote," or "go back to your personalized profile." User selects "learn more."
8. User receives a detailed synopsis of AT&T's stock—highs, lows, 52- and 26-week trends, dividend yields, price/earnings ratios—everything from the cracks and vents of money analysis. Options to learn more follow, including "hear about AT&T according to Bob Smith" and "hear more about AT&T according to Merrill Lynch."
9. User selects to hear more according to ML, and is taken via link to voice content on ML's site.
10. User becomes bored with all the financial mumbo-jumbo and uses the "back" command.
11. User back on the Yahoo! finance AT&T Vpage. One more "back" and he's at his personalized stock welcome page.
12. This time the user selects "buy stock."
13. The user is prompted for the ticker symbol, and enters "T."
14. The system asks if the user might want to learn more before making the buy. As the user knows all he needs to, he bypasses this and goes straight to the transaction page.
15. A variety of options are presented: "buy common stock," "put option," or "call option."

16. User selects the basic "buy common stock" and gets the standard transactional questions/prompts:
    Quantity?
    the $15 transaction charge ok?
    Shall we use your "America's Choice" or "Plutonium" card?

Other examples of how VCodes may be used are as follows. Exit signs on the interstate may have a VCode associated therewith. A user desiring to find out information about what hotels, restaurants, gas stations and other places of interest exist at a particular exit may call the VNAP and input the VCode associated with the exit to find out such information. It may enable advanced ordering of food at restaurants along the exit to expedite the user's travels while on the road. It may enable a user to check availability and price of hotel rooms at that exit and make a reservation during the same phone call.

Additionally, an on line voice auction could be conducted using the invention by assigning each good within the auction site a VCode and enabling the user to bid on a particular auction piece using the VCode. The user could either be viewing the auction pieces on line through the internet, could be actually present at the auction or watching the auction via television.

Additionally, VCodes may be assigned based on country or language as well so that users to the Washington Monument VCode, for example, there may be one code for Japanese, one code for English, one code for Spanish, one code for French, and another code for German.

The VCodes associated with these and other examples could be placed on the object of interest, near the object of interest, could be published about the object of interest, or displayed by a host through any means so that users can associate the VCode with a object, subject or location about which they may want to obtain information. For example, in the Washington Monument example, a user desiring to find out what restaurants are located near the Washington Monument is more likely to be willing to pay for information when the user is at the Washington Monument. Accordingly, a sign near the Washington Monument may advertise the VNAP and list the VCode associated with the Washington Monument. The user could then use a telephone or a mobile phone to call the number, input the VCode and find out what restaurants are nearby. The timeliness of that information makes the information significantly more valuable because it is delivered on demand at the located desired and in the manner requested. In these and other cases the VNAP may charge the restaurant (or other entity that posts information) for advertising its existence instead of fee sharing. On other instances, a VNAP may offer such advertisement for free to the restaurant to encourage the restaurant to post information to the VNAP's VCode system.

This technology permits the VNAP to create a powerful new business model whereby the VNAP permits others to create information that is "controlled" by the VNAP, so that the VNAP may charge users for access to information or other content. In some cases the VNAP may share a portion of the revenue or in other cases, the VNAP may actually charge the entity that posts the information. The VNAP can generate additional revenue by permitting VAds, by linking users to other VNAPs or VPages, by processing transactions or taking a percentage of transactions that result from its system even if processed by another transaction processor. Additionally, the VNAP can collect transaction data and historical use data pertaining to users who access the VCodes system. This data can be mined and used to create other value to the VNAP in other ways. The VNAP (or designated organization) can charge a registration fee for content providers to register a VCode. The VNAP can charge users a subscription fee for some or all content and attempt to obtain additional revenue from subscribers through premium VCode services and transactions. Numerous other business advantages and possibilities will be readily available.

Other embodiments and uses of the invention will be apparent to those skilled in the art from consideration of the specification and practice of the invention disclosed herein. The specification and examples should be considered exemplary only.

What is claimed is:

1. A content creation system for enabling content providers to create voice pages with audio files included for use in a network for voice page delivery through which subscribers request a voice page and a voice page server system delivers the voice page audibly to the subscriber, the content creation system comprising:

a voice page selection module that enables a content provider to select a voice page in which an audio file is to be included, the audio file comprising audio content that is audibly delivered to the subscriber with the voice page;

an audio file selection module that enables the content provider to select an audio file to be included in the selected voice page; and an audio file transfer module that transfers the selected audio file from the content creation system to a voice page server system for inclusion in the selected voice page by a voice page generation module at the voice page server system, the voice page generation module serving to generate a voice page with the audio file included.

2. The content creation system of claim 1 wherein the voice page generation module comprises a play module that enables the content provider to play the audio file to determine how it sounds.

3. The content creation system of claim 1 wherein the audio file is incorporated as content in a memo type of voice page.

4. The content creation system of claim 1 wherein the audio file is incorporated as a message associated with a link.

5. The content creation system of claim 1 wherein the audio file is incorporated as a message to be played upon selection of an option to a link.

6. The content creation system of claim 1 wherein the audio file is incorporated as a question in a voice page.

7. The content creation system of claim 1 wherein the sound file is received in a predetermined format.

8. The content creation system of claim 1 wherein the sound file is received in a first format and converted to a predetermined format prior to inclusion in a voice page.

9. A content creation system for enabling content providers to create voice pages with audio files included for use in a network for voice page delivery through which subscribers request a voice page and a voice Page server system delivers the voice page audibly to the subscriber, the content creation system comprising:

a voice pare selection module that enables a content provider to select a voice page in which an audio file is to be included:

an audio file selection module that enables the content provider to select an audio file to be included in the selected voice page; and an audio file transfer module that transfers the selected audio file from the content creation system to a voice page server system for inclusion in the selected voice page by a voice page generation module at the voice page server system, the voice page generation module serving to generate a voice page with the audio file included:

wherein the voice page generation module generates an XML-based voice page from inputs received; and wherein the audio file is incorporated with tags designated for audio output.

10. A content provider system for enabling content providers to create voice pages with audio files included for use in a network for voice page delivery through which subscribers request a voice page and a voice page server system delivers the voice page audibly to the subscriber, the content provider system comprising:

voice page selection means for enabling a content provider to select a voice page in which an audio file is to be include the audio file comprising audio content that is audibly delivered to the subscriber with the voice page;

audio file selection means for enabling the content provider to select an audio file to be included in the selected voice page; and audio file transfer means for transferring the selected audio file from the content provider system to a voice page server system for inclusion in the selected voice page by a voice page generation module at the voice page server system.

11. The content provider system of claim 10 wherein the voice page generation module comprises a play module that enables the content provider to play the audio file to determine how it sounds.

12. The content provider system of claim 10 wherein the audio file is incorporated as content in a memo type of voice page.

13. The content provider system of claim 10 wherein the audio file is incorporated as a message associated with a link.

14. The content provider system of claim 10 wherein the audio file is incorporated as a message to be played upon selection of an option to a link.

15. The content provider system of claim 10 wherein the audio file is incorporated as a question in a voice page.

16. The content provider system of claim 10 wherein the sound file is transferred in a predetermined format.

17. The content provider system of claim 10 wherein the sound file is transferred in a first format different from a predetermined format; and wherein the voice page server system converts the sound file to the predetermined format.

18. The content provider system of claim 10 wherein the content provider system comprises a telephony device.

19. The content provider system of claim 10 wherein the content provider system comprises a web-based system.

20. The content provider system of claim 10 wherein the content provider system comprises a PDA system.

21. A content provider system for enabling content providers to create voice pages with audio files included for use in a network for voice page delivery through which subscribers request a voice page and a voice page server system delivers the voice page audibly to the subscriber, the content provider system comprising:

voice page selection means for enabling a content provider to select a voice page in which an audio file is to be included:

audio file selection means for enabling the content provider to select an audio file to be included in the selected voice page; and audio file transfer means for transferring the selected audio file from the content provider system to a voice page server system for inclusion in the selected voice Page by a voice page generation module at the voice page server system wherein the voice page generation module generates an XML-based voice page from inputs received; and wherein the audio file is incorporated with tags designated for audio output.

22. A method for enabling content providers to create voice pages with audio files included for use in a network for voice page delivery through which subscribers request a voice page and a voice page server system delivers the voice page audibly to the subscriber, the method comprising the steps of:

enabling a content provider to select a voice page in which an audio file is to be included, the audio file comprising audio content that is audibly delivered to the subscriber with the voice page;

enabling the content provider to select an audio file to be included in the selected voice page; and transferring the selected audio file from the content provider system to a voice page server system for inclusion in the selected voice page by a voice page generation module at the voice page server system.

23. The method of claim 22 further comprising the step of playing the audio sound file to determine how it sounds.

24. The method of claim 22 wherein the audio file is incorporated as content in a memo type of voice page.

25. The method of claim 22 wherein the audio file is incorporated as a message associated with a link.

26. The method of claim 22 wherein the audio file is incorporated as a message to be played upon selection of an option to a link.

27. The method of claim 22 wherein the audio file is incorporated as a question in a voice page.

28. The method of claim 22 wherein the sound file is transferred in a predetermined format.

29. The method of claim 22 wherein the sound file is transferred in a first format different from a predetermined format; and wherein the voice page server system converts the sound file to the predetermined format.

30. A method for enabling content providers to create voice pages with audio files included for use in a network for voice page delivery through which subscribers request a voice page and a voice page server system delivers the voice page audibly to the subscriber, the method comprising the steps of:

enabling a content provider to select a voice page in which an audio file is to be included;

enabling the content provider to select an audio file to be included in the selected voice page;

transferring the selected audio file from the content provider system to a voice page server system for inclusion in the selected voice page by a voice page generation module at the voice page server system; and generating an XML-based voice page from inputs received; and incorporating the audio file with tags designated for audio output.

* * * * *